United States Patent
Koizumi et al.

(10) Patent No.: US 8,727,879 B2
(45) Date of Patent: May 20, 2014

(54) VIDEO GAME WITH DUAL MOTION CONTROLLERS

(75) Inventors: Yoshiaki Koizumi, Kyoto (JP); Takeshi Hayakawa, Kyoto (JP); Norihiro Aoyagi, Kyoto (JP); Seiki Ishihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/103,137

(22) Filed: May 9, 2011

(65) Prior Publication Data

US 2011/0212781 A1     Sep. 1, 2011

Related U.S. Application Data

(62) Division of application No. 11/790,893, filed on Apr. 27, 2007, now Pat. No. 8,535,155.

(30) Foreign Application Priority Data

Jan. 5, 2006  (JP) .................................. 2006-127384

(51) Int. Cl.
*A63F 9/24* (2006.01)

(52) U.S. Cl.
USPC ............ 463/36; 463/6; 463/7; 463/8; 463/37; 463/38; 345/156; 345/157; 345/161

(58) Field of Classification Search
CPC .......................... A63F 13/06; A63F 2300/105
USPC .............. 463/6–8, 36–38; 345/156–158, 161
See application file for complete search history.

(56) References Cited

U.S. PATENT DOCUMENTS

| | | | |
|---|---|---|---|
| 4,839,838 A | 6/1989 | LaBiche et al. | |
| 5,128,671 A | 7/1992 | Thomas, Jr. | |
| 5,453,758 A | 9/1995 | Sato | |
| 5,704,837 A * | 1/1998 | Iwasaki et al. | 463/38 |
| 5,864,333 A * | 1/1999 | O'Heir | 345/157 |

(Continued)

FOREIGN PATENT DOCUMENTS

| | | |
|---|---|---|
| EP | 1 025 885 A1 | 8/2000 |
| EP | 1 205 885 | 8/2000 |

(Continued)

OTHER PUBLICATIONS

Extended European Search Report mailed Jun. 22, 2012 in European Application No. 12162286.4 (4 pages).

(Continued)

*Primary Examiner* — Lawrence Galka
(74) *Attorney, Agent, or Firm* — Nixon & Vanderhye P.C.

(57) ABSTRACT

An inclination of a first unit is detected based on an output from a first acceleration sensor provided in a first unit of a controller, and an inclination of a second unit is detected based on an output from a second acceleration sensor provided in a second unit separate from the first unit. A difference between the inclinations of the first unit and the second unit is detected, and game control is performed using the detected difference. Thus, with a game apparatus using a plurality of acceleration sensors or a plurality of sensors capable of detecting a motion or a posture, a dynamic play is made possible with a high degree of freedom of motion and an intuitive motion input is realized.

9 Claims, 52 Drawing Sheets

(56) References Cited

U.S. PATENT DOCUMENTS

| | | | |
|---|---|---|---|
| 6,183,365 B1 * | 2/2001 | Tonomura et al. | 463/36 |
| 6,524,186 B2 * | 2/2003 | Takatsuka et al. | 463/37 |
| 7,331,856 B1 * | 2/2008 | Nakamura et al. | 463/7 |
| 7,596,767 B2 | 9/2009 | Wilson | |
| 2002/0065121 A1 * | 5/2002 | Fukunaga et al. | 463/8 |
| 2005/0024360 A1 | 2/2005 | Abe et al. | |
| 2005/0119036 A1 | 6/2005 | Albanna et al. | |
| 2006/0038890 A1 | 2/2006 | MacIntosh et al. | |
| 2007/0005215 A1 | 1/2007 | Nishioka | |

FOREIGN PATENT DOCUMENTS

| | | |
|---|---|---|
| EP | 1 228 794 A2 | 8/2002 |
| JP | 6-277363 | 10/1994 |
| JP | 7-213745 A | 8/1995 |
| JP | 7-219703 | 8/1995 |
| JP | 10-21000 | 1/1998 |
| JP | 2001-56743 A | 2/2001 |
| JP | 2001-170358 | 6/2001 |
| JP | 2001-232056 A | 8/2001 |
| JP | 2002-153673 | 5/2002 |
| JP | 2002-336547 A | 11/2002 |
| JP | 2004-184351 | 7/2004 |
| JP | 2004-252730 A | 9/2004 |
| WO | WO 97/12357 A1 | 4/1997 |
| WO | 00/63874 | 10/2000 |

OTHER PUBLICATIONS

Extended European Search Report mailed Jul. 2, 2012 in European Application No. 12162367.2 (7 pages).

Extended European Search Report mailed Jul. 4, 2012 in European Application No. 12162287.2 (4 pages).

Midway Games Inc., "Gauntlet: Legends, Manual," Aug. 31, 1999 & Moby Games: "Gauntlet: Legends for Nintendo 64," 23 pages.

Extended European Search Report mailed Apr. 26, 2011 in European Application No. 07008800.0.

US 2002/0018582 A1, 02/2002, Hagiwara et al. (withdrawn)

* cited by examiner

F I G. 2
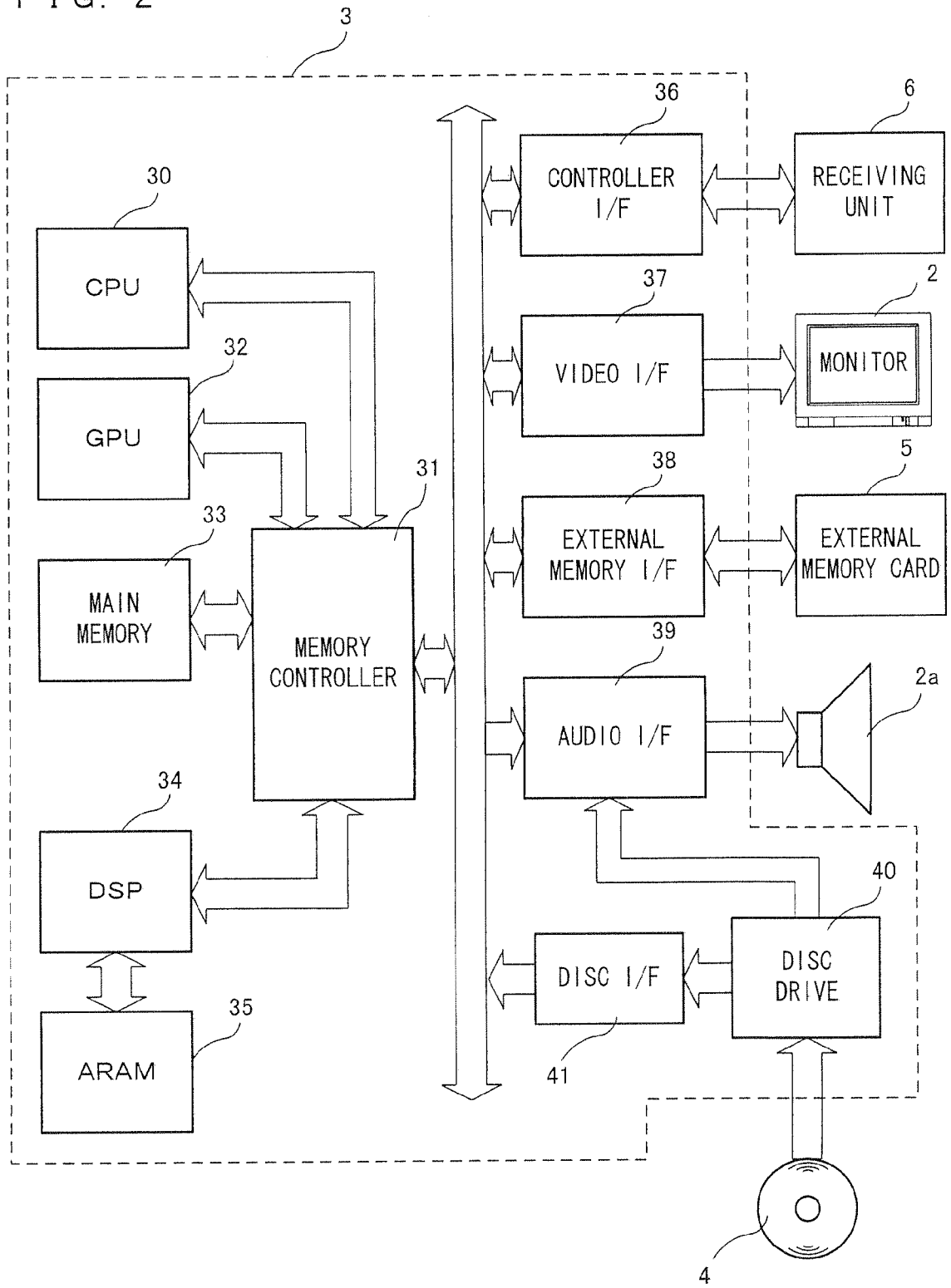

F I G. 7
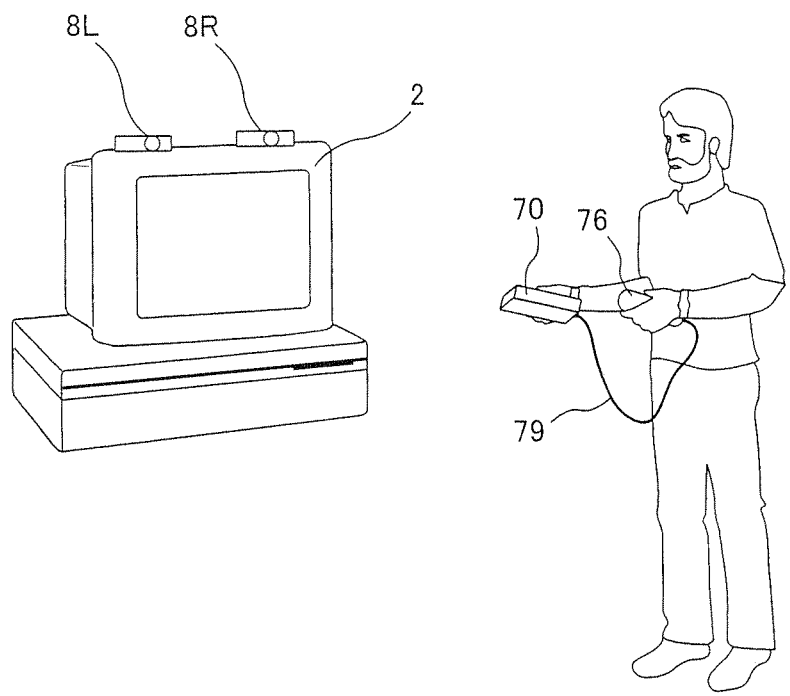

FIG. 38

| | |
|---|---|
| ONE UNIT IS SWUNG OBLIQUELY RIGHTWARD AND FARTHER FROM THE PLAYER | SLIGHTLY ACCELERATE RIGHT-FORWARD  |
| ONE UNIT IS SWUNG OBLIQUELY LEFTWARD AND CLOSER TO THE PLAYER | SLIGHTLY ACCELERATE LEFT-REARWARD  |
| BOTH UNITS ARE SWUNG OBLIQUELY RIGHTWARD AND FARTHER FROM THE PLAYER | LARGELY ACCELERATE RIGHT-FORWARD 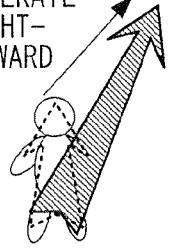 |
| ONE UNIT IS SWUNG RIGHTWARD AND THE OTHER UNIT IS SWUNG FARTHER FROM THE PLAYER | SLIGHTLY ACCELERATE RIGHT-FORWARD 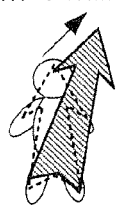 |
| TWO UNITS ARE SWUNG IN OPPOSITE DIRECTIONS | STOP  |

FIG. 47
| FIRST STEP (DIRECTION INSTRUCTION OPERATION) | SECOND STEP (TRIGGER OPERATION) |
|---|---|
| SWING HORIZONTALLY 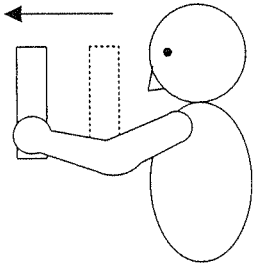 | SWING VERTICALLY DOWNWARD 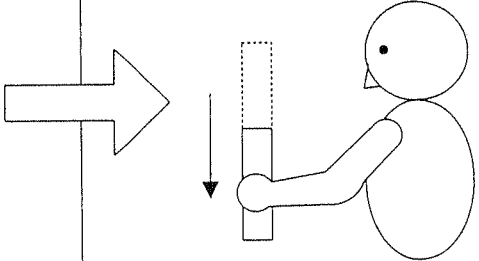 |
| OUTPUTS IN X AXIS DIRECTION AND Z AXIS DIRECTION ARE CHANGED | OUTPUT IN Y AXIS DIRECTION IS CHANGED |

VIDEO GAME WITH DUAL MOTION CONTROLLERS

CROSS-REFERENCES TO RELATED APPLICATIONS

This application is a divisional of U.S. application Ser. No. 11/790,893, filed Apr. 27, 2007, which claims the benefit of Japanese Patent Application No. 2006-127384, filed on May 1, 2006, each of which is incorporated herein in its entirety.

BACKGROUND OF THE INVENTION

1. Field of the Technology

The technology presented herein relates to a game program and a game apparatus for executing game control by a plurality of acceleration sensors or a plurality of sensors capable of detecting a motion or a posture.

2. Description of the Background Art

Japanese Laid-Open Patent Publication No. 10-21000 (hereinafter, referred to as "patent document 1") discloses providing two acceleration sensors (for measuring accelerations along different axes or for measuring a straight line and a rotation) in one housing.

Japanese Laid-Open Patent Publication No. 2002-153673 (hereinafter, referred to as "patent document 2") discloses a technology for performing different game inputs using two acceleration sensors.

Japanese Laid-Open Patent Publication No. 6-277363 (hereinafter, referred to as "patent document 3") discloses a technology for using two levers as controllers.

Japanese Laid-Open Patent Publication No. 2001-170358 (hereinafter, referred to as "patent document 4") discloses a technology for setting a neutral position.

The technology disclosed in patent document 1 has a problem in that the motions of both hands of the player are fixed, and thus the freedom of motion of the player during the game play is limited (the player cannot perform a dynamic play).

The technology disclosed in patent document 2 merely allows separate inputs made using two acceleration sensors to be used for the game as independent inputs, which does not provide the game operation with any entertainment.

The technology disclosed in patent document 3 has a problem in that the freedom of motion of the player during the game play is limited.

The technology disclosed in patent document 4 is regarding one sensor and is not for setting a neutral position in a system including a plurality of sensors.

None of these technologies effectively uses the motion in a plurality of directions detected by a sensor.

The present technology is provided for solving at least one of the above-described problems.

SUMMARY

Therefore, a feature of the present invention is at least one of the following.

(1) To provide a game program and a game apparatus for, when executing game control during a game by a plurality of acceleration sensors or a plurality of sensors capable of detecting a motion or a posture, allowing the player to make a dynamic game input operation with a high degree of freedom of motion;

(2) To provide a game program and a game apparatus for allowing appropriate setting of a neutral position when executing game control by a plurality of sensors; and (3) To provide a game program and a game apparatus which effectively use a plurality of directions detected by a plurality of sensors capable of detecting a motion.

The present technology has the following features to attain the above. The reference numerals in parentheses in this section of the specification indicate the correspondence with the embodiments described later for easier understanding of the present technology, and do not limit the present technology in any way.

A computer-readable storage medium according to one embodiment has stored thereon a game program for executing game control using an output from a first sensor (701) which is an acceleration sensor or a gyrosensor provided in a first housing (71) and an output from a second sensor (761) which is an acceleration sensor or a gyrosensor provided in a second housing (77) separate from the first housing. The game program causes a computer (30) of a game apparatus (3) to function as:

first posture detection means for detecting a posture of the first housing based on an output from the first sensor (S104);

second posture detection means for detecting a posture of the second housing based on an output from the second sensor (S108);

posture difference detection means for detecting a difference between the posture of the first housing detected by the first posture detection means and the posture of the second housing detected by the second posture detection means (S116); and game control means for executing game control using the difference detected by the posture difference detection means (S118).

Owing to the above-described structure, the player can freely move both of his/her hands during the play. Therefore, a dynamic play is made possible with a high degree of freedom of motion. Since the control is executed by a posture difference, an intuitive motion input is allowed.

The game program may further cause the computer to function as posture average detection means for detecting an average of the posture of the first housing detected by the first posture detection means and the posture of the second housing detected by the second posture detection means (S124); and the game control means may execute the game control using both the difference detected by the posture difference detection means and the average detected by the posture average detection means (S126).

Owing to the above-described structure, the player can perform the game control freely with the motion of both hands.

For example, a first motion of a game object may be controlled based on the difference, and a second motion of the game object may be controlled based on the average. The "posture difference" may be, for example, a difference in the angle of rotation around a predetermined axis or a difference in the angle of rotation around a respective axis.

The game control means may comprise first motion control means for controlling a first motion of a game object using the difference detected by the posture difference detection means (S118); and the game program may further cause the computer to function as second motion control means for controlling a second motion of the game object based on an output from a switch provided in the first housing or the second housing (S164).

Owing to the above-described structure, the degree of freedom of posture during the play is improved.

The first sensor usable for detecting the posture of the first housing and the second sensor usable for detecting the posture of the second housing may be acceleration sensors;

the first posture detection means may detect an inclination of the first housing, and the second posture detection means may detect an inclination of the second housing;

the first posture detection means may comprise first housing state determination means for determining whether or not the first housing is in a still state based on an output from the first sensor (S156);

when the first housing state determination means determines that the first housing is in a still state, the first posture detection means may output the inclination of the first housing detected based on the output from the first sensor as a valid detection result (S158);

the second posture detection means may comprise second housing state determination means for determining whether or not the second housing is in a still state based on an output from the second sensor (S156); and when the second housing state determination means determines that the second housing is in a still state, the second posture detection means may output the inclination of the second housing detected based on the output from the second sensor as a valid detection result (S158).

Owing to the above-described structure, a sensor output due to an inadvertent motion during the play can be eliminated with certainty.

The housing state determination means determines that the housing is in a still state when, for example, the magnitude of the output vector from the acceleration sensor substantially matches the magnitude of the output vector obtained when the acceleration sensor detects only the gravity (with some extent of a tolerable error).

Only when the first housing state determination means determines that the first housing is in a still state and also the second housing state determination means determines that the second housing is in a still state, the game control means may execute the game control using the difference detected by the posture difference detection means.

A computer-readable storage medium according to another embodiment has stored thereon a game program for executing game processing using an output from a first sensor (701) which is an acceleration sensor or a gyrosensor provided in a first housing (71) and an output from a second sensor (761) which is an acceleration sensor or a gyrosensor provided in a second housing (77) separate from the first housing. The game program causes a computer (30) of a game apparatus (3) to function as:

direction determination means for determining a direction of a game control vector based on an output from the first sensor (S410);

magnitude determination means for determining a magnitude of the game control vector based on an output from the second sensor (S414); and game control means for executing game control using the game control vector, the direction and the magnitude of which are determined by the direction determination means and the magnitude determination means (S418).

Owing to the above-described structure, the player can freely move both of his/her hands during the play. Therefore, a dynamic play is made possible with a high degree of freedom of motion.

A computer-readable storage medium according to still another embodiment has stored thereon a game program for executing game processing using an output from a first sensor (701) provided in a first housing (71) and capable of detecting a motion and an output from a second sensor (761) provided in a second housing (77) separate from the first housing and capable of detecting a motion. The game program causes a computer (30) of a game apparatus (3) to function as:

first motion operation detection means for detecting a motion of the first housing based on an output from the first sensor (S236);

second motion operation detection means for detecting a motion of the second housing based on an output from the second sensor (S250);

simultaneous input detection means for detecting, based on the detection results of the first motion operation detection means and the second motion operation detection means, whether or not a motion of the second housing was detected within a simultaneous input acceptance time period which is counted from a timing determined in relation with the detection of a motion of the first housing (S254); and game control means for executing first game processing when the simultaneous input detection means detects that the motion of the second housing was detected within the simultaneous input acceptance time period after the motion of the first housing was detected (S256).

Owing to the above-described structure, the simultaneous motion operations can be used for the game input (with a timing difference between the simultaneous motion operations being tolerated).

The simultaneous input acceptance time period is a predetermined time period which is counted from a timing determined in relation with the detection of the motion of the first housing, and may be fixed or variable in accordance with the state or level of the game. The "timing which is determined in relation with the detection of the motion" is a predetermined timing during an input of a motion which is a target of detection; and is, for example, a time point at which such a motion was detected or a predetermined time point during such a motion to be detected (e.g., the start point or the end point of such a motion or a predetermined intermediate point during such a motion).

The first game processing may be executed as follows. The simultaneous input detection means detects, based on the detection results of the first motion operation detection means and the second motion operation detection means, whether or not a motion of the first housing was detected within a simultaneous input acceptance time period after the motion of the second housing was detected. When the simultaneous input detection means detects that a motion of the first housing was detected within such a time period, the game control means executes the first game processing.

When the simultaneous input detection means does not detect that a motion of the second housing was detected within the simultaneous input acceptance time period after the motion of the first housing was detected by the first motion operation detection means, the game control means may execute second game processing which is different from the first game processing (S216).

Owing to the above-described structure, the simultaneous motion operations and also a motion operation of one operation unit may be used for the game input.

When the simultaneous input detection means does not detect that a motion of the first housing was detected within the simultaneous input acceptance time period after the motion of the second housing was detected by the second motion operation detection means, the game control means may execute third game processing which is different from the first game processing or the second game processing.

The game control means may execute the first game processing when the simultaneous input detection means detects that a motion of the second housing was detected within the simultaneous input acceptance time period, and may execute the second game processing at a time point when the simultaneous input acceptance time period passes without the simultaneous input detection means detecting that a motion of the second housing was detected within the simultaneous input acceptance time period.

The first motion operation detection means may not newly detect a motion of the first housing until an acceptance prohibition time period passes after a timing determined in relation with the detection of the motion of the first housing; and the second motion operation detection means may not newly detect a motion input of the second housing until the acceptance prohibition time period passes after the motion of the second housing was detected.

Owing to the above-described structure, the problem is avoided that once a motion input operation is performed, inputs are continuously made for a while.

The acceptance prohibition time period is a predetermined time period which is counted from a timing determined in relation with the detection of the motion of the housing, and may be fixed or variable in accordance with the state or level of the game.

Neither the first motion operation detection means nor the second motion operation detection means may newly detect a motion of the first housing or the second housing until a post-simultaneous input acceptance prohibition time period passes after a timing determined in relation with the detection, by the simultaneous input detection means, of simultaneous inputs which means that within a predetermined time period after a motion of one of the first housing and the second housing was detected, a motion of the other was detected.

Owing to the above-described structure, when neither operation unit can make an input, the timing for permitting the re-start of the input is matched.

The post-simultaneous input acceptance prohibition time period is a predetermined time period which is counted from a timing determined in relation with the detection of simultaneous inputs by the simultaneous input detection means, and may be fixed or variable in accordance with the state or level of the game. The post-simultaneous input acceptance prohibition time period may be the same as, or longer than, the acceptance prohibition time period. The "timing determined in relation with the detection of simultaneous inputs" is a predetermined timing during simultaneous inputs as a target of detection; and is, for example, a time point at which such simultaneous inputs were detected or a predetermined time point during such simultaneous inputs to be detected (e.g., the start point or the end point of such simultaneous inputs or a predetermined intermediate point during such simultaneous inputs).

A computer-readable storage medium according to still another embodiment has stored thereon a game program for executing game processing using an output from a first sensor (701) provided in a first housing (71) and capable of detecting a motion and an output from a second sensor (761) provided in a second housing (77) separate from the first housing and capable of detecting a motion. The game program causes a computer (30) of a game apparatus (3) to function as:

first motion detection means for detecting a motion and a strength thereof of the first housing based on an output from the first sensor (S236);

second motion detection means for detecting a motion and a strength thereof of the second housing based on an output from the second sensor (S250);

simultaneous input detection means for detecting, based on the detection results of the first motion detection means and the second motion detection means, whether or not a motion of the second housing was detected within a simultaneous input acceptance time period which is counted from a timing determined in relation with the detection of a motion of the first housing (S254); and game control means for, when the simultaneous input detection means detects that a motion of the second housing was detected within the simultaneous input acceptance time period which is counted from the timing determined in relation with the detection of the motion of the first housing, executing first game processing using the strength of the motion of the first housing detected by the first motion detection means and the strength of the motion of the second housing detected by the second motion detection means (S256).

Owing to the above-described structure, the simultaneous motion operations and the magnitudes of the motions can be used for the game input (with a timing difference between the simultaneous motion operations being tolerated).

The first game processing may be executed as follows. The simultaneous input detection means detects, based on the detection results of the first motion detection means and the second motion detection means, whether or not a motion of the first housing was detected within a simultaneous input acceptance time period after a timing determined in relation with the detection of the motion of the second housing. When the simultaneous input detection means detects that a motion of the first housing was detected within such a simultaneous input acceptance time period, the game control means executes the first game processing using the strength of the motion of the first housing detected by the first motion detection means and the strength of the motion of the second housing detected by the second motion detection means.

A computer-readable storage medium according to still another embodiment has stored thereon a game program for executing game processing using an output from a first sensor (701) provided in a first housing (71) and capable of detecting a motion and an output from a second sensor (761) provided in a second housing (77) separate from the first housing and capable of detecting a motion. The game program causes a computer (30) of a game apparatus (3) to function as:

first motion operation detection means for detecting a motion of the first housing based on an output from the first sensor (S302);

second motion operation detection means for detecting a motion of the second housing based on an output from the second sensor (S318);

simultaneous input detection means for, when a motion operation on the first housing was performed, detecting whether or not a motion operation on the second housing was performed within a predetermined time period before the motion operation on the first housing, based on the detection results of the first motion operation detection means and the second motion operation detection means (S312); and game control means for, (a) when the simultaneous input detection means detects that a motion operation on the second housing was performed within the predetermined time period before the motion operation on the first housing, causing a game object to perform a first motion; and (b) when the simultaneous input detection means does not detect that a motion operation on the second housing is performed within the predetermined time period before the motion operation on the first housing, causing a game object to perform a second motion which is different from the first motion (S314, S316).

Owing to the above-described structure, the simultaneous motion operations can be used for the game input (with a timing difference between the simultaneous motion operations being tolerated).

The first motion, the second motion or a third motion may be executed as follows. When a motion operation on the second housing is performed, the simultaneous input detection means detects whether or not a motion operation on the first housing was performed within a predetermined time period before the motion operation of the second housing, based on the detection results of the first motion operation detection means and the second motion operation detection means. When the simultaneous input detection means detects that the motion operation on the first housing was performed, the game control means causes the game object to perform the first motion. When the simultaneous input detection means does not detect that the motion operation on the first housing was performed, the game control means causes the game object to perform the third motion. Alternatively, each time the first motion operation detection means or the second motion operation detection means detects a motion of the first housing or the second housing, the simultaneous input detection means detects such a motion, so that the game control means causes the game object to perform the first motion, the second motion or the third motion.

A computer-readable storage medium according to still another embodiment has stored thereon a game program for executing game control using an output from a first sensor (701) provided in a first housing (71) and capable of detecting an inclination and an output from a second sensor (761) provided in a second housing (77) separate from the first housing and capable of detecting an inclination. The game program causes a computer (30) of a game apparatus (3) to function as:

reference value setting instruction detection means for detecting a reference value setting instruction from a player (S134);

reference value setting means for, when the reference value setting instruction detection means detects a reference value setting instruction, setting a first reference value and a second reference value based on an output value from the first sensor and/or an output value from the second sensor (S146);

first posture detection means for detecting a posture of the first housing based on an output value from the first sensor and the first reference value (S104, S112);

second posture detection means for detecting a posture of the second housing based on an output value from the second sensor and the second reference value (S108, S114);

posture difference detection means for detecting a difference between the posture of the first housing detected by the first posture detection means and the posture of the second housing detected by the second posture detection means (S116); and game control means for executing game control using the difference detected by the posture difference detection means (S118).

Owing to the above-described structure, the player can play the game while being in any posture using two inclination sensors.

The reference setting means may set the output value itself from the sensor as the reference value, or may set a result obtained by calculating an inclination value from the output value as the reference value. When the first reference value and the second reference value are the same, only one data may be stored.

The reference value setting means may set the first reference value and the second reference value at the same timing in accordance with the detection of a single reference value setting instruction by the reference value setting instruction detection means.

Owing to the above-described structure, it can be prevented that the same data is input as different data in error.

When the reference value setting instruction detection means detects the reference value setting instruction, the reference value setting means may set a value obtained by a predetermined calculation based on an output value from the first sensor and an output value from the second sensor, commonly as the first reference value and the second reference value.

Owing to the above-described structure, it can be prevented that the same data is input as different data in error.

The predetermined calculation is, for example, averaging. Weighting may be performed in accordance with, for example, the size or the shape of the first housing and the second housing, whether there is an operation section or not in each housing, or whether the respective housing is for the right hand or the left hand.

When the reference value setting instruction detection means detects the reference value setting instruction, the reference value setting means may set a value based on either an output value from the first sensor or an output value from the second sensor, commonly as the first reference value and the second reference value.

Owing to the above-described structure, it can be prevented that the same data is input as different data in error.

The first housing and/or the second housing includes a switch for allowing the player to input the reference value setting instruction; and when the reference value setting instruction detection means detects the reference value setting instruction, the reference value setting means may commonly set the first reference value and the second reference value based on an output value from either the first sensor or the second sensor which does not include the switch used for inputting the reference value setting instruction.

Owing to the above-described structure, the influence of the vibration of the housing which occurs when a button is pressed can be eliminated.

The reference value setting means may comprise reference value setting time difference detection means for, when the reference value setting instruction detection means detects the reference value setting instruction, determining whether or not a difference between the inclination of the first housing and the inclination of the second housing is within a predetermined range, based on an output value from the first sensor and an output value from the second sensor (S148); and the reference value setting means, (a) when the reference value setting time difference detection means determines that the difference is within the predetermined range, may set the first reference value and the second reference value respectively based on the output value from the first sensor and the output value from the second sensor; and (b) when the reference value setting time difference detection means determines that the difference is not within the predetermined range, may execute error processing.

Owing to the above-described structure, it can be prevented that the same data is input as different data in error.

A computer-readable storage medium according to still another embodiment has stored thereon a game program for executing game control using an output from a first sensor (701) which is an acceleration sensor or a gyrosensor provided in a first housing (71) and an output from a second sensor (761) which is an acceleration sensor or a gyrosensor provided in a second housing (77) separate from the first housing. The game program causes a computer (30) of a game apparatus (3) to function as:

posture control means for controlling a posture of a game object based on an output from the first sensor (S410); and movement control means for controlling a movement of the game object based on an output from the second sensor (S416).

A computer-readable storage medium according to still another embodiment has stored thereon a game program for executing game control using an output from a first sensor (701) provided in a first housing (71) and capable of detecting a motion in at least two axial directions and an output from a second sensor (761) provided in a second housing (77) separate from the first housing and capable of detecting a motion in at least two axial directions. The game program causes a computer (30) of a game apparatus (3) to function as:

first motion direction detection means for detecting a first motion direction representing a direction in which the first housing was moved based on an output from the first sensor (S542);

second motion direction detection means for detecting a second motion direction representing a direction in which the second housing was moved based on an output from the second sensor (S570);

synthesized direction determination means for determining a synthesized direction by synthesizing the first motion direction detected by the first motion direction detection means and the second motion direction detected by the second motion direction detection means (S552); and game control means for executing game control using the synthesized direction determined by the synthesized direction determination means (S554).

A computer-readable storage medium according to still another embodiment has stored thereon a game program for executing game processing using an output from a first sensor (701) provided in a first housing (71) for detecting a motion and an output from a second sensor (761) provided in a second housing (77) separate from the first housing for detecting a motion. The game program causes a computer (30) of a game apparatus (3) to function as:

first strength detection means for detecting a strength of a motion of the first housing based on an output from the first sensor (S542);

second strength detection means for detecting a strength of a motion of the second housing based on an output from the second sensor (S570);

synthesized strength determination means for determining a synthesized strength by synthesizing the strength of the motion of the first housing detected by the first strength detection means and the strength of the motion of the second housing detected by the second strength detection means (S552); and game control means for executing game control using the synthesized strength determined by the synthesized strength determination means (S554).

A computer-readable storage medium according to still another embodiment has stored thereon a game program for executing game control using an output from a first sensor (701) provided in a first housing (71) and capable of detecting a motion in at least two axial directions and an output from a second sensor (761) provided in a second housing (77) separate from the first housing and capable of detecting a motion in at least two axial directions. The game program causes a computer (30) of a game apparatus (3) to function as:

first motion direction detection means for detecting a first motion direction representing a direction in which the first housing was moved based on an output from the first sensor (S542);

second motion direction detection means for detecting a second motion direction representing a direction in which the second housing was moved based on an output from the second sensor (S570);

motion direction relationship determination means for determining whether or not the first motion direction detected by the first motion direction detection means and the second motion direction detected by the second motion direction detection means fulfill a predetermined relationship (S550); and game control means for, when the motion direction relationship determination means determines that the first motion direction and the second motion direction fulfill the predetermined relationship, executing game control based on the motion direction and/or a motion strength of at least one of the first housing and the second housing (S552).

The motion direction relationship determination means may determine whether or not the first motion direction and the second motion direction substantially match each other, may determine whether or not the first motion direction and the second motion direction are substantially opposite to each other, or may determine whether or not the first motion direction and the second motion direction make a predetermined angle. The motion direction relationship determination means may compare two-dimensional directions (components of predetermined two directions) or two-dimensional directions.

When the motion direction relationship determination means determines that the predetermined relationship is fulfilled, the game control means may execute the game control based on the motion direction of either the first housing or the second housing, or based on the motion directions of both the first housing and the second housing (for example, by performing a predetermined calculation such as addition, averaging or the like). The game control means may execute the game control based on the motion strength instead of the motion direction, or based both on the motion direction and the motion strength.

A computer-readable storage medium according to still another embodiment has stored thereon a game program for executing game control using an output from a first sensor (701) provided in a first housing (71) and capable of detecting a motion in at least two axial directions and an output from a second sensor (761) provided in a second housing (77) separate from the first housing and capable of detecting a motion in at least two axial directions. The game program causes a computer (30) of a game apparatus (3) to function as:

first motion operation detection means for detecting a motion of the first housing based on an output from the first sensor (S542);

second motion operation detection means for detecting a motion of the second housing based on an output from the second sensor (S570);

motion timing relationship determination means for determining, based on the detection results of the first motion operation detection means and the second motion operation detection means, whether or not a timing at which the motion of the first housing is detected and a timing at which the motion of the second housing is detected fulfill a predetermined relationship (S548); and game control means for, when the motion timing relationship determination means determines that the timing at which the motion of the first housing is detected and the timing at which the motion of the second housing is detected fulfill the predetermined relationship, executing game control based on a motion direction and/or a motion strength of at least one of the first housing and the second housing (S552).

The motion timing relationship determination means may determine, for example, whether or not the timing at which the motion of the first housing is detected and the timing at which the motion of the second housing is detected substantially match each other, or may determine whether or not these timings have a predetermined interval therebetween. When the motion timing relationship determination means determines that the predetermined relationship is fulfilled, the game control means may execute the game control based on the motion direction of either the first housing or the second housing, or based on the motion directions of both the first housing and the second housing (for example, by performing a predetermined calculation such as addition, averaging or the like). The game control means may execute the game control based on the motion strength instead of the motion direction, or based both on the motion direction and the motion strength.

The game control means may execute the game control based on the motion direction and/or the motion strength of both of the first housing and the second housing.

The game control means may execute the game control based on the motion direction and the motion strength of both of the first housing and the second housing.

A computer-readable storage medium according to still another embodiment has stored thereon a game program for executing game control using an output from a first sensor (701) provided in a first housing (71) and capable of detecting a motion in at least two axial directions and an output from a second sensor (761) provided in a second housing (77) separate from the first housing and capable of detecting a motion in at least two axial directions. The game program causes a computer (30) of a game apparatus (3) to function as:

first motion direction detection means for detecting a first motion direction representing a direction in which the first housing was moved based on an output from the first sensor (S542);

second motion direction detection means for detecting a second motion direction representing a direction in which the second housing was moved based on an output from the second sensor (S570);

motion direction relationship determination means for determining whether or not the first motion direction detected by the first motion direction detection means and the second motion direction detected by the second motion direction detection means fulfill a predetermined relationship (S550); and game control means for, when the motion direction relationship determination means determines that the first motion direction and the second motion fulfill the predetermined relationship, causing a game object to perform a specific motion (S554).

The motion direction relationship determination means may determine whether or not the first motion direction and the second motion direction substantially match each other, may determine whether or not the first motion direction and the second motion direction are substantially opposite to each other, or may determine whether or not the first motion direction and the second motion direction make a predetermined angle. The motion direction relationship determination means may determine which one of a plurality of relationship candidates is the relationship between the first motion direction and the second motion direction, and may determine one specific motion in accordance with the determination result.

A computer-readable storage medium according to still another embodiment of the present invention has stored thereon a game program for executing game control using an output from a first sensor (701) provided in a first housing (71) for detecting a motion and an output from a second sensor (761) provided in a second housing (77) separate from the first housing for detecting a motion. The game program causes a computer (30) of a game apparatus (3) to function as:

first motion operation detection means for detecting a motion and a strength thereof of the first housing based on an output from the first sensor (S236);

second motion operation detection means for detecting a motion and a strength thereof of the second housing based on an output from the second sensor (S250);

motion timing relationship determination means for determining, based on the detection results of the first motion operation detection means and the second motion operation detection means, whether or not a timing at which the motion of the first housing is detected and a timing at which the motion of the second housing is detected fulfill a predetermined relationship (S240); and game control means for, when the motion timing relationship determination means determines that the timing at which the motion of the first housing is detected and the timing at which the motion of the second housing is detected fulfill the predetermined relationship, causing a game object to perform a specific motion (S242).

A computer-readable storage medium according to still another embodiment has stored thereon a game program for executing game control using an output from a first sensor (701) provided in a first housing (71) and capable of detecting a motion in at least two axial directions and an output from a second sensor (761) provided in a second housing (77) separate from the first housing and capable of detecting a motion in at least two axial directions. The game program causes a computer (30) of a game apparatus (3) to function as:

first motion direction detection means for detecting a first motion direction representing a direction in which the first housing was moved based on an output from the first sensor (S748);

second motion direction detection means for detecting a second motion direction representing a direction in which the second housing was moved based on an output from the second sensor (S782); and game control means for, when the first motion direction detected by the first motion direction detection means is in a first range and the second motion direction detected by the second motion direction detection means is in a second range, executing game control based on the first motion direction and the second motion direction (S752, S786, S758).

The first range and the second range may not overlap or partially overlap, but do not completely overlap.

A computer-readable storage medium according to still another embodiment has stored thereon a game program for executing game control using an output from a first sensor (701) provided in a first housing (71) and capable of detecting a motion or a posture and an output from a second sensor (761) provided in a second housing (77) separate from the first housing and capable of detecting a motion or a posture. The game program causes a computer (30) of a game apparatus (3) to function as:

first game control means for executing first game processing based on an output from the first sensor (S410);

second game control means for executing second game processing based on an output from the second sensor (S416); and reference sensor exchange means for changing the sensor referred to by the first game control means for executing the first game processing from the first sensor to the second sensor, and for changing the sensor referred to by the second game control means for executing the second game processing from the second sensor to the first sensor, in accordance with an instruction of a player (S404).

A computer-readable storage medium according to still another embodiment has stored thereon a game program for executing game control using an output from a sensor (701) at least capable of detecting a motion in two axial directions of a first axis direction and a second axis direction. The game program causes a computer (30) of a game apparatus (3) to function as:

motion detection means for detecting a motion in the first axis direction of the sensor (S742); and game control means for, when the motion detection means detects a motion in the first axis direction, executing game processing based on an output from the sensor in the second axis direction at a time point or during a time period which is determined in relation with the detection of the motion (S718).

The "time point or time period which is determined in relation with the detection of the motion" may be (1) or (2) below. In order to keep the continuity between the motion input in the first axis direction and the motion input in the second axis direction, it is preferable that such a time point or time period is within a predetermined time period from a predetermined time point during the motion input in the first axis direction.

(1) A time point or time period which is determined based on a predetermined time point during the motion input in the first axis direction as a target of detection (the "predetermined time point during the motion input in the first axis direction as a target of detection" is a time point when the motion input in the first axis direction was detected, the start point or the end point of the motion input, a predetermined intermediate time point during the motion input, etc.).

(2) A predetermined time point or a predetermined time period during a motion in the second axis direction when the motion in the second axis direction is detected during the time period determined based on the predetermine time point during the motion input in the first axis direction as the target of detection.

The time point or time period in (1) above may be the following.

(a) A time point which is the same as a predetermined time point during the motion input in the first axis direction (hereinafter, such a predetermined time point will be referred to as "first time point");

(b) A time point before the first time point by a predetermined time period;

(c) A time point after the first time point by a predetermined time period;

(d) A time period of: the time point before the first time point by a predetermine time period—the first time period;

(e) A time period of: the first time point—the time point after the first time point by a predetermine time period;

(f) A time period of: the time point before the first time point by a first time period—the time point before the first time point by a second time period (first time period>second time period);

(g) A time period of: the time point after the first time point by a first time period—the time point after the first time point by a second time period (first time period<second time period); and (h) A time period of: the time point before the first time point by a first time period—the time point after the first time point by a second time period.

The time point or time period in (2) may be determined as follows. When detecting a "swing motion", the motion detection means detects whether or not a swing in the second axis direction is detected at the time point or during a time period represented by (a) through (h). When such a swing is detected, the "time point or time period in (2) may be:

a time period of the swing in the second axis direction, i.e., from the swing start until the swing end [acceleration rise→maximum→0→acceleration detection in the opposite direction→maximum in the opposite direction→0]; or a part thereof [e.g., a time period of: acceleration rise→maximum→0; or a time period of: acceleration detection in the opposite direction→maximum in the opposite direction→0].

In the case where the "time point or time period which is determined in relation with the detection of the motion" is a time point or time period before the first time point, the input is to be made as follows: after an input in the second axis direction is made, an input in the first axis direction is made, to validate the input in the second axis direction (even when an input in the second axis direction is made, such an input is not validated unless an input in the first axis direction is made thereafter). In the case where the "time point or time period which is determined in relation with the detection of the motion" is a time point or time period after the first time point, the input is to be made as follows: after an input in the first axis direction is made, an input in the second axis direction is accepted (even when an input in the second axis direction is made, such an input is not validated unless an input in the first axis direction is made beforehand). In the case where the "time point or time period which is determined in relation with the detection of the motion" is a time period crossing the first time point, the input is to be made as follows: an input in the second axis direction is made while making an input in the first axis direction to indicate that the input in the second axis direction is valid (unless an input in the second axis direction is made while making an input in the first axis direction, the input in the second axis direction is not validated).

The expression "executing game processing based on an output from the sensor in the second axis direction" may mean the following. In the case where the game processing is executed based on an output from the sensor in the second axis direction during a time period which is determined in relation with the detection of the motion, a sum/average (including a weighted average)/maximum value/integral of the outputs in the second axis direction during that time period are used, or a difference between the continuous outputs during that time period is used.

A computer-readable storage medium according to still another embodiment has stored thereon a game program for executing game control using an output from a sensor (701) capable of detecting a motion in three axial directions of a first axis direction, a second axis direction and a third axis direction. The game program causes a computer (30) of a game apparatus (3) to function as:

motion detection means for detecting a motion in the first axis direction of the sensor (S742); and game control means for, when the motion detection means detects a motion in the first axis direction, executing game control using a direction represented by an output from the sensor in the second axis direction and an output from the sensor in the third axis direction at a time point or during a time period which is determined based on the time point when the motion was detected (S718).

When the motion detection means detects a motion in the first axis direction, the game control means may execute game control using an output from the sensor in the second axis direction at a time point or during a time period which is determined based on the time point when the motion was detected, and also using a magnitude of an output from the sensor in the first axis direction regarding the motion in the first axis direction.

When the motion detection means detects a motion in the first axis direction, the game control means may detect whether or not there is a motion in the second axis direction at a time point or during a time period which is determined based on the time point when the motion in the first axis direction was detected (S750); and when the motion in the second axis direction is detected, may execute game control using an output in the second axis direction.

The "sensor capable of detecting a posture" may be an acceleration sensor, a gyrosensor or the like. More specifically, the "sensor capable of detecting a posture" is a sensor capable of detecting a posture of itself (a posture of a housing including the sensor itself). The "posture" is typically an inclination (inclination with respect to the direction of gravity; i.e., an angle of rotation around the horizontal axis), but may be an angle of rotation around an axis other than the horizontal axis, for example.

The "sensor capable of detecting an inclination" may be an acceleration sensor, a gyrosensor or the like. More specifically, the "sensor capable of detecting an inclination" is a sensor capable of detecting an inclination of itself (an inclination of a housing including the sensor itself).

The "sensor capable of detecting a motion" may be an acceleration sensor, a gyrosensor or the like. More specifically, the "sensor capable of detecting a motion" is a sensor capable of detecting a motion of itself (a motion of a housing including the sensor itself).

The "motion operation detection means" may detect that the housing was simply moved, or may detect that the housing made a predetermined motion (e.g., a swing).

Now, an acceleration sensor is influenced by an acceleration motion or a gravitational acceleration and detects an acceleration of a linear component in each of the sensing axis directions. By contrast, a gyroscope or a gyrosensor detects an angular velocity accompanying a rotation. The acceleration sensor, even when being rotated around the axis thereof, cannot detect an acceleration in each axis other than the gravitational acceleration. By contrast, the gyroscope cannot detect a linear acceleration which does not accompany a rotation. Therefore, when the acceleration sensor is merely replaced with a gyroscope, or when the gyroscope is merely replaced with an acceleration sensor, the same functions as those before the replacement are not provided. By performing additional complicated processing for absorbing the difference between the acceleration sensor and the gyroscope, the acceleration sensor may be replaced with a gyroscope or the gyroscope may be replaced with an acceleration sensor.

The acceleration sensor detects an acceleration of a linear component along each axis, and cannot directly detect a rotation or an inclination. Therefore, a rotation or an inclination of the posture of a device including an acceleration sensor is obtained by performing a predetermined calculation on the acceleration detected for each axis. For example, when the acceleration sensor is in a still state, a gravitational acceleration is always applied. Thus, an acceleration in accordance with the inclination of each axis with respect to the gravitational acceleration is detected. Specifically, when the acceleration sensor is in a horizontal still state, a gravitational acceleration of 1 G is applied to the Y axis of the acceleration sensor, and the gravitational acceleration in other axes is almost zero. When the acceleration sensor is inclined from the horizontal state, the gravitational acceleration is divided into the axes in accordance with the directions of the axes of the acceleration sensor and the angles of the axes with respect to the direction of gravity. At this point, an acceleration value of each axis of the acceleration sensor is detected. By performing a calculation on such an acceleration value of each axis, the posture of the acceleration sensor with respect to the direction of gravity can be calculated. A rotation is considered as a continuous change of the posture. Thus, a rotation angle can be calculated through software by calculating a change from an inclination of the posture at one point to an inclination of the posture at another point.

Using a gyroscope, a change from an inclination of the posture in one state until an inclination of the posture in another state can be calculated as follows, for example. At the start of the detection by the gyroscope, an inclination value is initialized. Angular velocity data which is output from the gyroscope from this time point is integrated. Then, a change amount in the inclination from the initialized value is calculated. Thus, an angle with respect to the posture at the initialization point can be obtained. Namely, a relative angle with respect to a certain point can be obtained. When a posture of a device including a gyroscope with respect to the direction of gravity needs to be found, the initialization needs to be conducted where the device is in a state based on the direction of gravity (e.g., in a horizontal state). By contrast, a device including an acceleration sensor has an advantage that initialization is not necessary because the acceleration sensor uses the direction of gravity as the reference direction.

According to the present technology, the player can freely move both of his/her hands during the play. Therefore, a dynamic play is made possible with a high degree of freedom of motion. Since the control is executed by a posture difference, an intuitive motion input is realized.

These and other features, aspects and advantages of the present technology will become more apparent from the following detailed description of the present technology when taken in conjunction with the accompanying drawings.

BRIEF DESCRIPTION OF THE DRAWINGS

FIG. 2 is a block diagram of a game apparatus 3;

FIG. 7 generally shows how to perform a game operation using the controller 7;

FIG. 38 shows an exemplary correspondence between the operation performed by the player and the motion of the character in a fifth embodiment;

FIG. 47 shows an exemplary operation performed by the player in a sixth embodiment;

DESCRIPTION OF THE PREFERRED EMBODIMENTS

Figure 1:
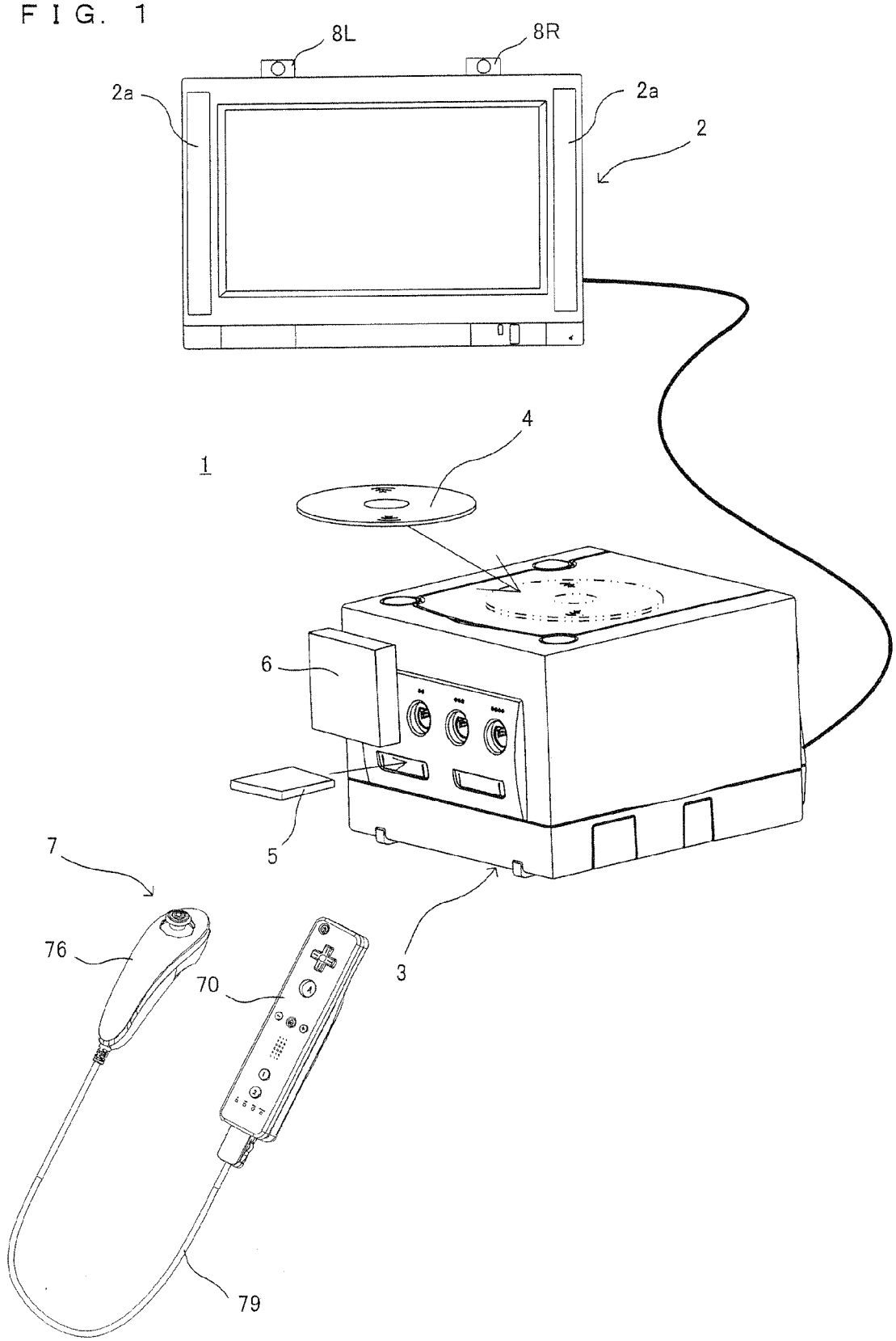
FIG. 1 is an external view of a game system 1 according to an embodiment.

With reference to FIG. 1, a game system 1 according to one embodiment will be described. FIG. 1 is an external view illustrating the game system 1. In the following example, the game system 1 includes an installation type game apparatus 3.

As shown in FIG. 1, the game system 1 includes a display (hereinafter, referred to as a "monitor") 2 such as a home-use TV receiver or the like, which includes speakers 2a, the installation type game apparatus (hereinafter, referred to simply as a "game apparatus") 3 connected to the monitor 2 via a connection cord, and a controller 7 for providing the game apparatus 3 with operation information. The game apparatus 3 is connected to a receiving unit 6 via a connection terminal. The receiving unit 6 receives transmission data which is wirelessly transmitted from the controller 7. The controller 7 and the game apparatus 3 are connected to each other via wireless communication. On the game apparatus 3, an optical disc 4 as an exemplary exchangeable information storage medium is detachably mounted. On a main top surface of the game apparatus 3, a power ON/OFF switch for the game apparatus 3, a reset switch for game processing, and an OPEN switch for opening a top lid of the game apparatus 3 are provided. When the player presses the OPEN switch, the lid is opened to allow the optical disc 4 to be mounted or dismounted.

Also on the game apparatus 3, an external memory card 5 is detachably mounted when necessary. The external memory card 5 includes a backup memory or the like for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the external memory card 5 and display a game image on the monitor 2. The player using the game apparatus 3 can enjoy the game by operating the controller 7 while watching the game image displayed on the monitor 2.

The controller 7 wirelessly transmits transmission data to the game apparatus 3 connected to the receiving unit 6 from a communication section 75 (see FIG. 6) included in the controller 7 using, for example, the Bluetooth (registered trademark) technology. The controller 7 includes two control units (a core unit 70 and a sub unit 76) connected to each other via a bendable connection cable 79. The controller 7 is control means mainly for operating a player object appearing in a game space displayed on the monitor 2. The core unit 70 and the sub unit 76 each have operation sections such as a plurality of operation buttons, keys, a stick and the like. As described later, the core unit 70 includes an imaging information calculation section 74 (see FIG. 6) for taking an image seen from the core unit 70. As an example of imaging target of the imaging information calculation section 74, two LED modules 8L and 8R are provided in the vicinity of the display screen of the monitor 2. The LED modules 8L and 8R output infrared light forward from the side of the monitor 2. In this example, the core unit 70 and the sub unit 76 are connected to each other via the bendable connection cable 79, but the sub unit 76 may include a wireless unit. In this case, the connection cable 79 is not necessary. When, for example, a Bluetooth (registered trademark) unit is mounted on the sub unit 76 as a wireless unit, operation data can be transmitted from the sub unit 76 to the core unit 70.

Next, with reference to FIG. 2, a structure of the game apparatus 3 will be described. FIG. 2 is a functional block diagram of the game apparatus 3.

As shown in FIG. 2, the game apparatus 3 includes a CPU (central processing unit) 30 (for example, a RISC CPU) for executing various programs. The CPU 30 executes a start program stored on a boot ROM (not shown) to initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F (interface) 36, the video I/F 37, the external memory I/F 38, the audio I/F 39 and the disc I/F 41 are respectively connected to the receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) or a part of the storage area of the main memory 33. The GPU 32 generates game image data or a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program, various types of data or the like read from the optical disc 4 by the CPU 30. The game program, the various types of data or the like stored on the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (e.g., storage of the game program or sound data already read). The DSP 34 reads the sound data stored on the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controller I/Fs, each of which communicably connects an external device engageable with a connector thereof and the game apparatus 3 to each other. For example, the receiving unit 6 is engaged with such a connector and is connected to the game apparatus 3 via the controller I/F 36. The receiving unit 6 receives the transmission data from the controller 7 as described above, and outputs the transmission data to the CPU 30 via the controller I/F 36. The video I/F 37 is connected to the monitor 2. The external memory I/F 38 is connected to the external memory card 5, and is accessible to the backup memory or the like included in the external memory card 5. The audio I/F 39 is connected to the speaker 2a built in the monitor 2, such that the sound data read by the DSP 34 from the ARAM 35 or sound data directly output from the disc drive 40 is output through the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
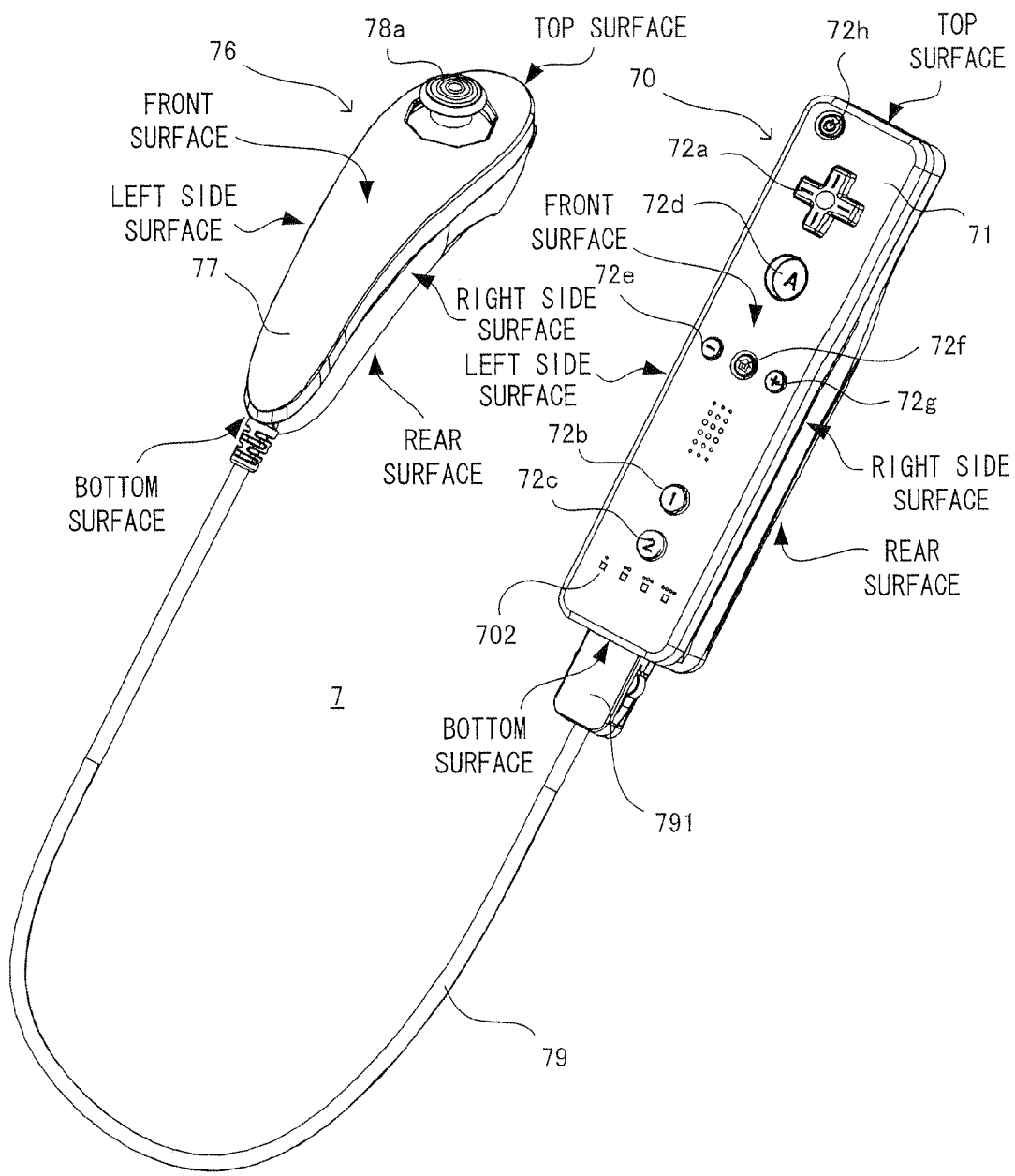
FIG. 3 is an isometric view of a controller 7 showing an external appearance thereof.

With reference to FIG. 3, the controller 7 will be described. FIG. 3 is an isometric view showing an external appearance of the controller 7.

As shown in FIG. 3, the controller 7 includes the core unit 70 and the sub unit 76 which are connected to each other via the connection cable 79. The core unit 70 has a housing 71, which includes a plurality of operation sections 72. The sub unit 76 has a housing 77, which includes a plurality of operation sections 78. The core unit 70 and the sub unit 76 are connected to each other via the connection cable 79.

One of two ends of the connection cable 79 is provided with a connector 791 which is detachable with a connector 73 (see FIG. 4) of the core unit 70. The other end of the connection cable 79 is fixedly connected with the sub unit 76. The connector 791 of the connection cable 79 is engaged with the connector 73 provided on a bottom surface of the core unit 70, and thus the core unit 70 and the sub unit 76 are connected to each other via the connection cable 79.

The housing 71 of the core unit 70 is formed by plastic molding or the like. The housing 71 has a generally parallelepiped shape, and the overall size of the housing 71 is small enough to be held by one hand of an adult or even a child.

At a center of a front surface of the housing 71, a cross key 72a is provided as direction instruction means. The cross key 72a is a cross-shaped four-direction push switch. The cross key 72a includes projecting operation portions corresponding to the four directions (top, bottom, right and left) and arranged at an interval of 90 degrees. The player selects one of the top, bottom, right and left directions by pressing one of the operation portions of the cross key 72a. Through an operation on the cross key 72a, the player can, for example, instruct a direction in which a player character or the like appearing in a virtual game world, or a cursor, is to move. Instead of the cross key 72a, a joystick capable of instructing any direction in 360 degrees may be provided.

Downward with respect to the cross key 72a on the front surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus 3.

Upward with respect to the cross key 72a on the front surface of the housing 71, an operation button 72h is provided. The operation button 72h is a power switch for remote-controlling the power of the game apparatus 3 to be on or off.

Downward with respect to the operation button 72c on the front surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the core unit 70 transmits transmission data to the receiving unit 6, one of the plurality of LEDs corresponding to the controller type is lit up.

On the front surface of the housing 71, sound holes for outputting a sound from a speaker 706 (see FIG. 4) described later are provided between the operation button 72b and the operation buttons 72e through 72g.

On a rear surface of the housing 71, an operation button (not shown) is provided at a position at which an index finger or middle finger of the player is located when the player holds the core unit 70. The operation button acts as, for example, a B button, and is used as, for example, a trigger switch in a shooting game.

On a top surface of the housing 71, an imaging element 743 (see FIG. 6) included in the imaging information calculation section 74 (see FIG. 6) is provided. The imaging information calculation section 74 is a system for analyzing image data which is taken by the core unit 70, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the core unit 70. The structure of the imaging information calculation section 74 will be described later in detail. On a bottom surface of the housing 71, the connector 73 (FIG. 4) is provided. The connector 73 is, for example, a 32-pin edge connector, and is used for engaging and connecting the connector 791 of the connection cable 79.

Figure 4:
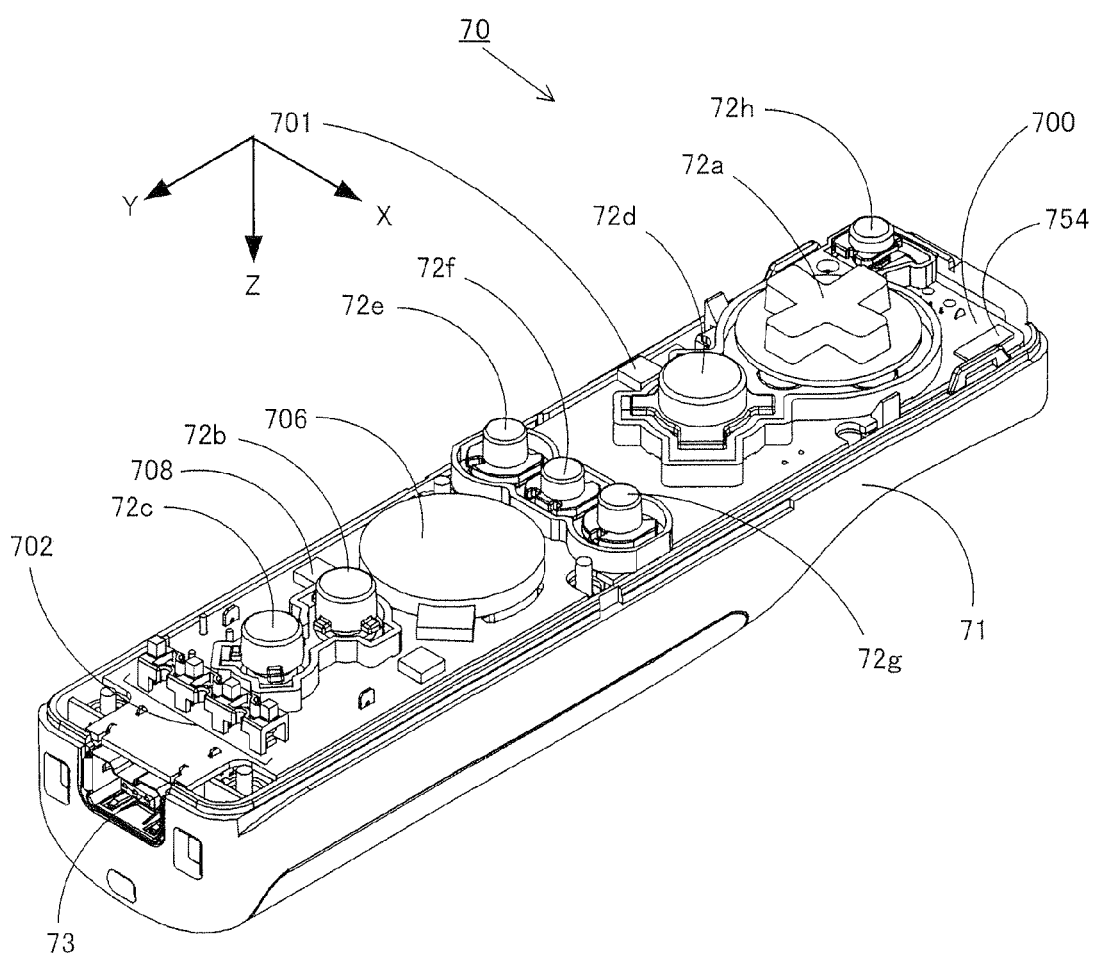
FIG. 4 is an isometric view of a core unit 70 in a state where an upper housing thereof is removed.

Now, with reference to FIG. 4, an internal structure of the core unit 70 will be described. FIG. 4 is an isometric view of the core unit 70, illustrating a state where an upper housing (a part of the housing 71) of the core unit 70 is removed.

As shown in FIG. 4, a substrate 700 is fixed inside the housing 71. On a front main surface of the substrate 700, the operation buttons 72a through 72h, an acceleration sensor 701, the LEDs 702, the speaker 706, an antenna 754 and the like are provided. These elements are connected to a microcomputer 751 (see FIG. 6) or the like via lines (not shown) formed on the substrate 700 or the like. The acceleration sensor 701 is provided in a peripheral area of the substrate 700, not in a central area. Owing to such an arrangement, as the core unit 70 rotates around a longitudinal direction thereof as an axis, the acceleration sensor 701 detects an acceleration including a centrifugal force component in addition to a component of direction change of gravitational acceleration. As a result, the rotation of the core unit 70 can be determined at a high sensitivity based on the detected acceleration data through a predetermined calculation.

On a rear main surface of the substrate 700, the image information calculation section 74 and the connector 73 are provided.

Figure 5:
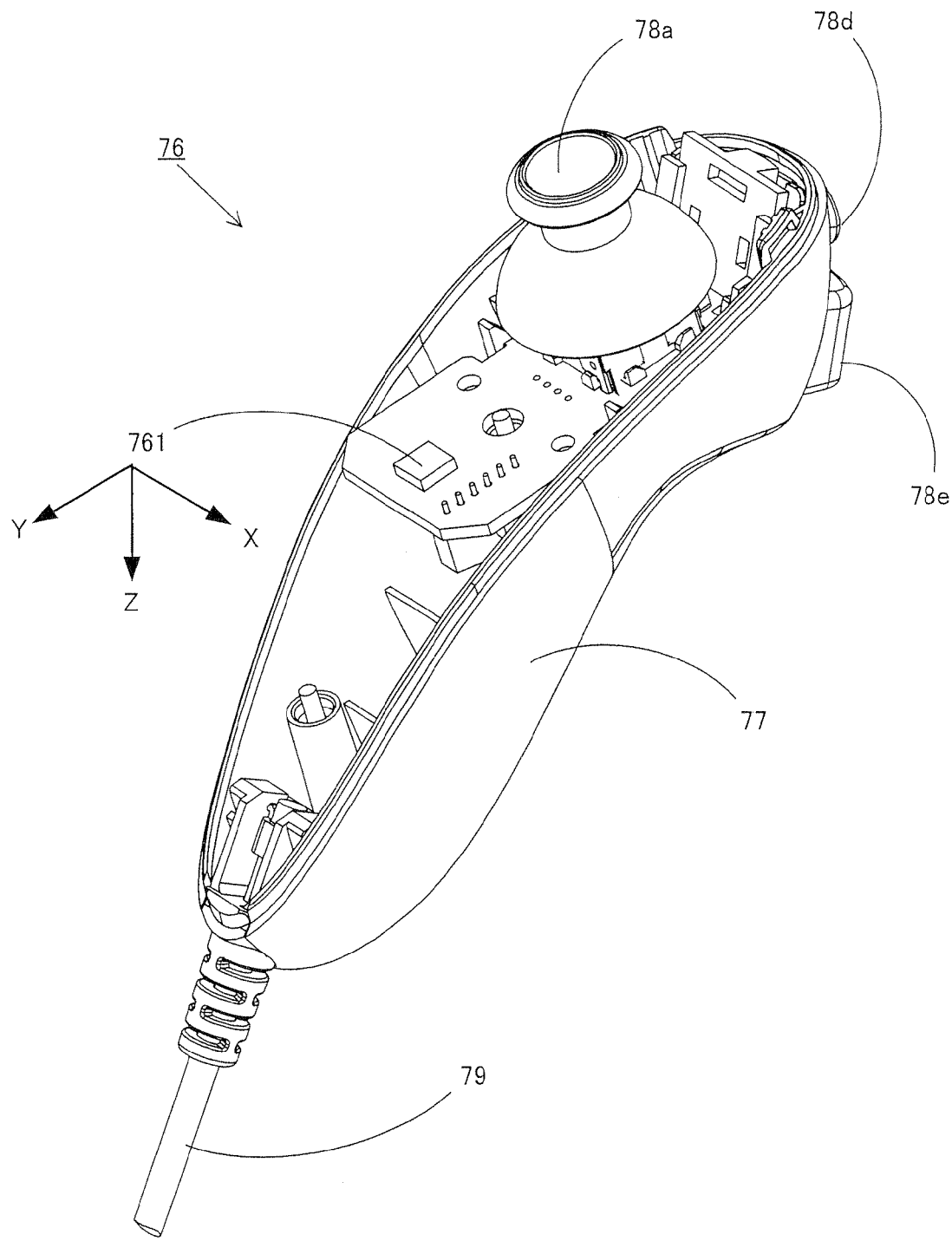
FIG. 5 is an isometric view of a sub unit 76 in a state where an upper housing thereof is removed.

With reference to FIG. 3 and FIG. 5, the sub unit 76 will be described. FIG. 5 is an isometric view of the sub unit 76, illustrating a state where an upper housing (a part of the housing 77) of the sub unit 76 is removed.

As shown in FIG. 3, the housing 77 of the sub unit 76 is formed by plastic molding or the like. The overall size of the housing 77 is small enough to be held by one hand of an adult or even a child.

On a front surface of the housing 77, a stick 78a is provided as direction instruction means. The stick 78a is an inclinable operation section protruding from the front surface of the housing 77. When being inclined, the stick 78a outputs an signal in accordance with the inclination direction. The player can instruct, for example, any direction or position by directing the tip of the stick 78a in any direction in 360 degrees. Thus, the player can instruct a direction in which a player character or the like appearing in the virtual game world, or a cursor, is to move. Instead of the stick 78a, a cross key may be provided.

On a top surface of the sub unit 76, a plurality of operation buttons 78d and 78e (see FIG. 5) are provided. The operation buttons 78d and 78e are each an operation section for outputting a respective operation signal when the player presses a head thereof. For example, the operation buttons 78d and 78e are assigned functions of an X button and a Y button. The operation buttons 78d and 78e are assigned various functions in accordance with the game program executed by the game apparatus 3.

As shown in FIG. 5, a substrate is fixed inside the housing 77. On the front main surface of the substrate, the stick 78a, an acceleration sensor 761 and the like are provided. These elements are connected to the connection cable 79 via lines (not shown) formed on the substrate or the like.

Figure 6:
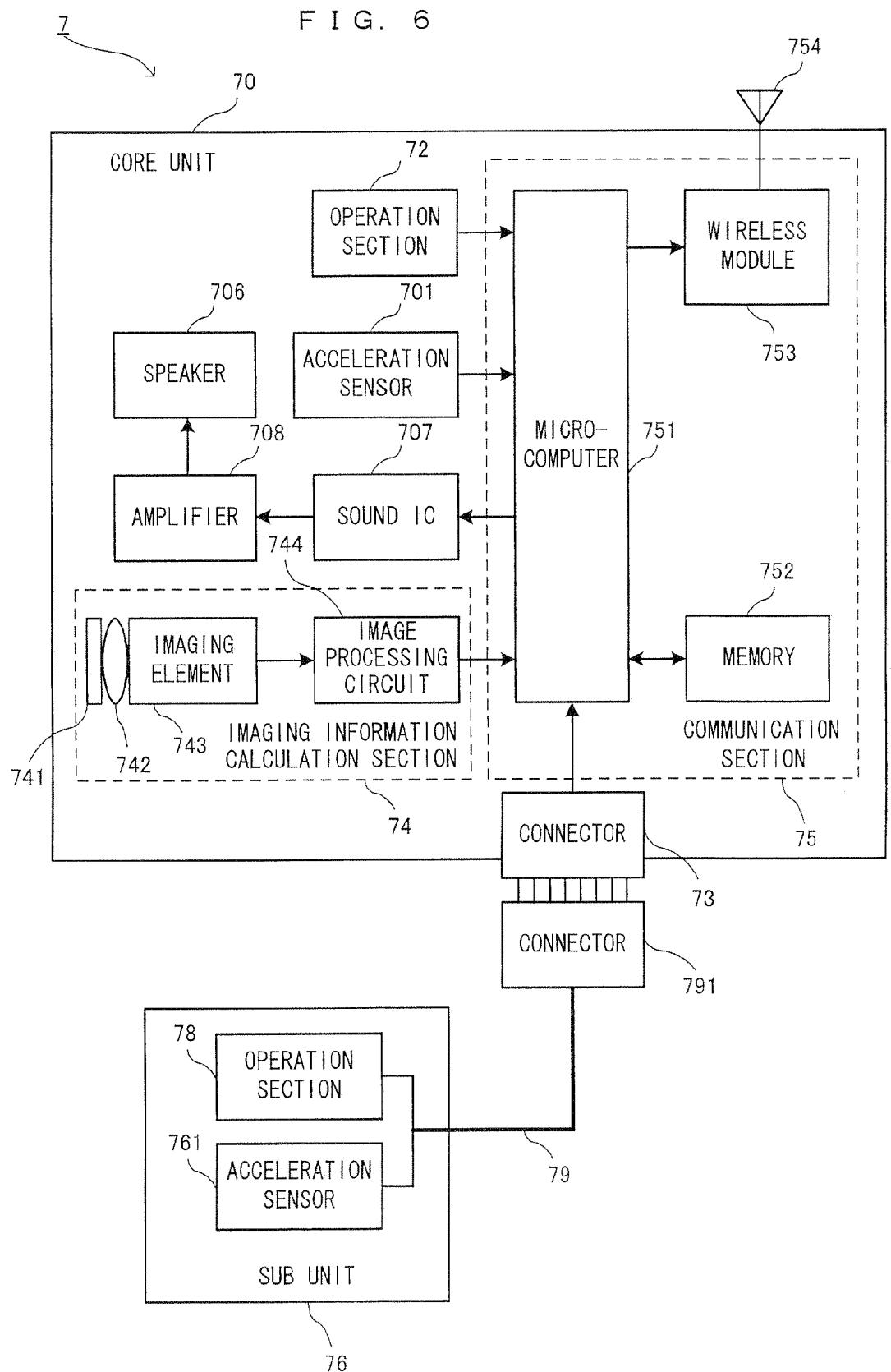
FIG. 6 is a block diagram illustrating a structure of the controller 7.

With reference to FIG. 6, an internal structure of the controller 7 will be described. FIG. 6 is a block diagram showing a structure of the controller 7.

As shown in FIG. 6, the core unit 70 includes the communication section 75 therein in addition to the operation sections 72, the imaging information calculation section 74, the acceleration sensor 701, the speaker 706, the sound IC 707 and the amplifier 708 described above. The sub unit 76 includes the operation sections 78 and the acceleration sensor 761 described above, and is connected to the microcomputer 751 via the connection cable 79, the connector 791 and the connector 73.

The imaging information calculation section 74 includes an infrared filter 741, a lens 742, the imaging element 743 and an image processing circuit 744. The infrared filter 741 allows only infrared light to pass therethrough, among light incident on the top surface of the core unit 70. The lens 742 collects the infrared light which has passed through the infrared filter 741 and outputs the infrared light to the imaging element 743. The imaging element 743 is a solid-state imaging device such as, for example, a CMOS sensor or a CCD, and takes an image of the infrared light collected by the lens 742. Accordingly, the imaging element 743 takes an image of only the infrared light which has passed through the infrared filter 741 for generating image data. The image data generated by the imaging element 743 is processed by the image processing circuit 744.

Specifically, the image processing circuit 744 processes the image data obtained from the imaging element 743, senses an area thereof having a high brightness, and outputs the processing result data representing the detected position coordinate and size of the area to the communication section 75. The imaging information calculation section 74 is fixed to the housing 71 of the core unit 70. The imaging direction of the imaging information calculation section 74 can be changed by changing the direction of the housing 71. The connection cable 79 which connects the housing 71 and the sub unit 76 is bendable. Therefore, even when the direction or position of the sub unit 76 is changed, the imaging direction of the imaging information calculation section 74 is not changed. Based on the processing result data which is output from the imaging information calculation section 74, a signal in accordance with the position or motion of the core unit 70 can be obtained.

In this example, the core unit 70 includes the acceleration sensor 701. The acceleration sensor 701 included in the core unit 70 is preferably a three-axial (X, Y and Z axes in FIG. 4) acceleration sensor. The acceleration sensor 761 included in the sub unit 76 is preferably a three-axial (X, Y and Z axes in FIG. 5) acceleration sensor. The three-axial acceleration sensors 701 and 761 each detect a linear acceleration in each of three directions, i.e., an X direction (left side surface toward right side surface), a Y direction (top surface toward bottom surface), and a Z direction (front surface toward rear surface). In other embodiments, two-axial acceleration detection means for detecting a linear acceleration in each of only the X direction and the Y direction (or directions along another pair of axes) may be used depending on the type of control signals used for game processing. Alternatively, one-axial acceleration detection means for detecting a linear acceleration in only the X direction (or other directions) may be used. For example, such three-axial, two-axial or one-axial acceleration sensors 701 and 761 may be available from Analog Devices, Inc. or STMicroelectronics N.V. The acceleration sensors 701 and 761 may be of a static capacitance coupling system based on the technology of MEMS (Micro Electro Mechanical Systems) provided by silicon precision processing. Alternatively, the three-axial, two-axial or one-axial acceleration sensors 701 and 761 may be based on an existing acceleration detection technology (e.g., piezoelectric system or piezoelectric resistance system) or any other appropriate technology developed in the future.

As apparent to those skilled in the art, the acceleration detection means used for the acceleration sensors 701 and 761 can detect only an acceleration along a straight line corresponding to each of the axes of the acceleration sensors 701 and 761 (linear acceleration sensors). Namely, a direct output from each of the acceleration sensors 701 and 761 is a signal indicating the linear acceleration (static or dynamic) along each of the axes thereof. Hence, the acceleration sensors 701 and 761 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the core unit 70 or the sub unit 76 can be estimated or calculated by executing additional processing on an acceleration signal which is output from the acceleration sensor 701 or 761. For example, when a static acceleration (gravitational acceleration) is detected, an inclination of the object (core unit 70 or the sub unit 76) with respect to the gravitational vector can be estimated by performing calculations based on the inclination angle and the detected acceleration, using the output from the acceleration sensor 701 or 761. By combining the acceleration sensor 701 or 761 with the microcomputer 751 (or another processor) in this manner, the inclination, posture or position of the core unit 70 or the sub unit 76 can be determined. Similarly, when the core unit 70 including the acceleration sensor 701 or the sub unit 76 including the acceleration sensor 761 is dynamically accelerated by a hand of the player or the like as described herein, various motions and/or positions of the core unit 70 or the sub unit 76 can be calculated or estimated by processing an acceleration signal generated by the acceleration sensor 701 or 761. In other embodiments, the acceleration sensor 701 or 761 may include a built-in signal processing device, or another type of dedicated processing device, for executing desired processing on an acceleration signal which is output from the built-in acceleration detection means, before the signal is output to the microcomputer 751. For example, when the acceleration sensor 701 or 761 is for detecting a static acceleration (e.g., a gravitational acceleration), the built-in or dedicated processing device may convert the detected acceleration signal to a corresponding inclination angle. The data indicating the acceleration detected by the acceleration sensor 701 or 761 is output to the communication section 75.

The communication section 75 includes the microcomputer 751, a memory 752, a wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 in accordance with the data transmitted from the game apparatus 3 to the wireless module 753 via the antenna 754. The sound IC 707 processes sound data or the like transmitted from the game apparatus 3 via the communication section 75.

Data from the core unit 70 including an operation signal from the operation section 72 (core key data), acceleration signals from the acceleration sensor 701 (core acceleration data), and the processing result data from the imaging information calculation section 74 are output to the microcomputer 751. Data transmitted from the sub unit 76 via the connection cable 79, including an operation signal from the operation section 78 (sub key data) and acceleration signals from the acceleration sensor 761 (sub acceleration data) are output to the microcomputer 751. The microcomputer 751 temporarily stores the input data (core key data, sub key data, core acceleration data, sub acceleration data, and the processing result data) in the memory 752 as transmission data which is to be transmitted to the receiving unit 6. The wireless transmission from the communication section 75 to the receiving unit 6 is performed at a predetermined time interval. Since game processing is generally performed at a cycle of 1/60 sec., the data collection and the wireless transmission need to be performed at a cycle of a shorter time period. Specifically, the game processing unit is 16.7 ms (1/60 sec.), and the transmission interval of the communication section 75 structured using the Bluetooth (registered trademark) technology is, for example, 5 ms. At the transmission timing to the receiving unit 6, the microcomputer 751 outputs the transmission data stored on the memory 752 as a series of operation information to the wireless module 753. Based on the Bluetooth (registered trademark) technology or the like, the wireless module 753 converts a carrier wave of a predetermined frequency with the operation information and radiates the resultant very weak radio signal from the antenna 754. Namely, the core key data from the operation sections 72 in the core unit 70, the sub key data from the operation sections 78 in the sub unit 76, the core acceleration data from the acceleration sensor 701 in the core unit 70, the sub acceleration data from the acceleration sensor 761 in the sub unit 76, and the processing result data from the imaging information calculation section 74 are converted into a very weak radio signal by the wireless module 743 and radiated from the core unit 70. The receiving unit 6 of the game apparatus 3 receives the very weak radio signal, and the game apparatus 3 demodulates or decodes the very weak radio signal to obtain the series of operation information (the core key data, the sub key data, the core acceleration data, the sub acceleration data, and the processing result data). Based on the obtained operation information and the game program, the CPU 30 of the game apparatus 3 performs the game processing. In the case where the communication section 75 is structured using the Bluetooth (registered trademark) technology or the like, the communication section 75 can have a function of receiving transmission data which is wirelessly transmitted from other devices.

As shown in FIG. 7, in order to play the game using the controller 7 of the game system 1, the player holds the core unit 70 with one hand (for example, right hand) and holds the sub unit 76 with the other hand (for example, left hand).

As described above, the inclination, posture, position or motion (movement or swing) of the core unit 70 can be determined using the output from the acceleration sensor 701 of the core unit 70 (core acceleration data). More specifically, when the player moves his/her hand holding the core unit 70, for example, up, down, right or left, the core unit 70 acts as operation input means for making an input in accordance with the motion or direction of the player's hand. Also as described above, the inclination, posture, position or motion (movement or swing) of the sub unit 76 can be determined using the output from the acceleration sensor 761 of the sub unit 76 (sub acceleration data). More specifically, when the player moves his/her hand holding the sub unit 76, for example, up, down, right or left, the sub unit 76 acts as operation input means for making an input in accordance with the motion or direction of the player's hand. Owing to this arrangement, the player holding different units with his/her right hand and left hand can make inputs by moving both of his/her hands. The core unit 70 and the sub unit 76, which are obtained by dividing a conventional game controller, allow the player to move both of his/her hands freely and to make new operations which are not possible with the conventional game controller. Since the degree of freedom of operations which can be made on the controller 7 is also significantly improved, realistic game operations can be realized.

In the above example, the controller 7 and the game apparatus 3 are connected with each other by wireless communication. Alternatively, the controller 7 and the game apparatus 3 may be electrically connected with each other via a cable. In this case, a cable connected to the core unit 70 is connected to a connection terminal of the game apparatus 3.

In the above example, the connection section 75 is provided in the core unit 70, but not in the sub unit 76 included in the controller 7. Alternatively, the sub unit 76 may include a communication section for transmitting transmission data to the receiving unit 6 wirelessly or in a wired manner. Still alternatively, the core unit 70 and the sub unit 76 may both include a communication section. For example, the communication section included in each of the core unit 70 and the sub unit 76 may wirelessly transmit transmission data to the receiving unit 6. The communication section in the sub unit 76 may wirelessly transmit transmission data to the core unit 70, and upon receiving the transmission data, the communication section 75 in the core unit 70 may wirelessly transmit transmission data of the core unit 70 and the transmission data from the sub unit 76 to the receiving unit 6. In these cases, the connection cable 79 is not necessary for electrically connecting the core unit 70 and the sub unit 76 with each other.

In the above example, the receiving unit 6 is connected to the connection terminal of the game apparatus 3 as receiving means for receiving transmission data wirelessly transmitted from the controller 7. The receiving means may be a receiving module provided in the game apparatus 3. In this case, the transmission data received by the receiving module is output to the CPU 30 via a predetermined bus.

Hereinafter, various embodiments which are realized by the game system 1 will be described. For easier understanding, the core unit 70 will be referred to as a "first unit", the sub unit 76 will be referred to as a "second unit", the acceleration sensor 701 included in the core unit 70 will be referred to as a "first acceleration sensor", and the acceleration sensor 761 included in the sub unit 76 will be referred to as a "second acceleration sensor".

First Embodiment

Figure 8:
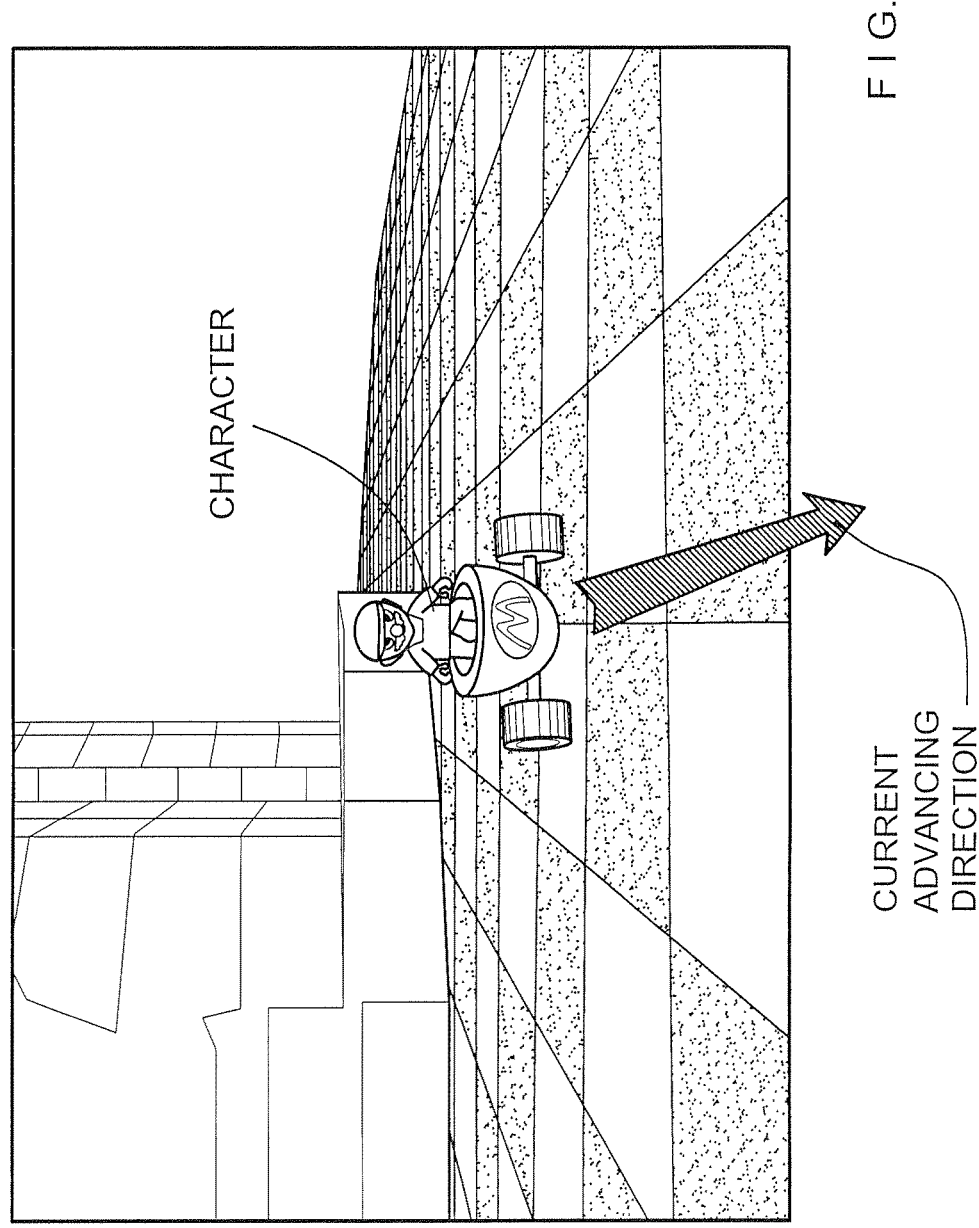
FIG. 8 shows an exemplary game image in a first embodiment.

FIG. 8 shows an exemplary image displayed in a first embodiment. On the screen of the monitor 2, a three-dimensional virtual game world including a character operated by the player (game object) is displayed. In this embodiment, the character is riding on a battle tank. The player can control the motion of the character by inclining the first unit or the second unit (i.e., rotating the first unit or the second unit around a horizontal axis thereof). The following description will be given with the premise that a positive X axis direction of the acceleration sensor is a horizontal direction and the rightward direction with respect to the player, a positive Y axis direction is the vertical downward direction, and a positive Z axis direction is a horizontal direction and the forward direction with respect to the player. The relationship between the axial directions regarding the acceleration sensor and the directions in the real world is not limited to such a premise.

Figure 9:
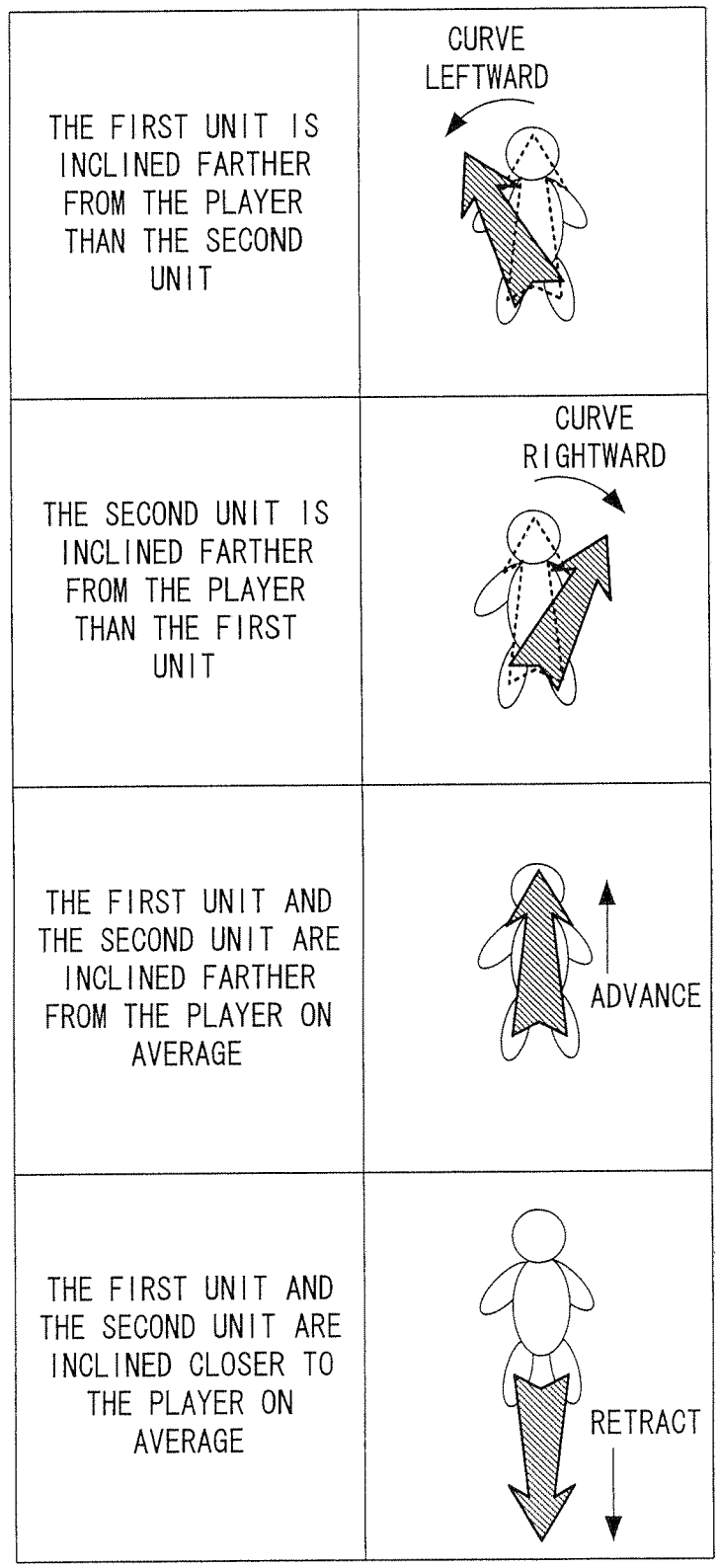
FIG. 9 shows an exemplary correspondence between the operation performed by the player and the motion of the character in the first embodiment.
Figure 16:
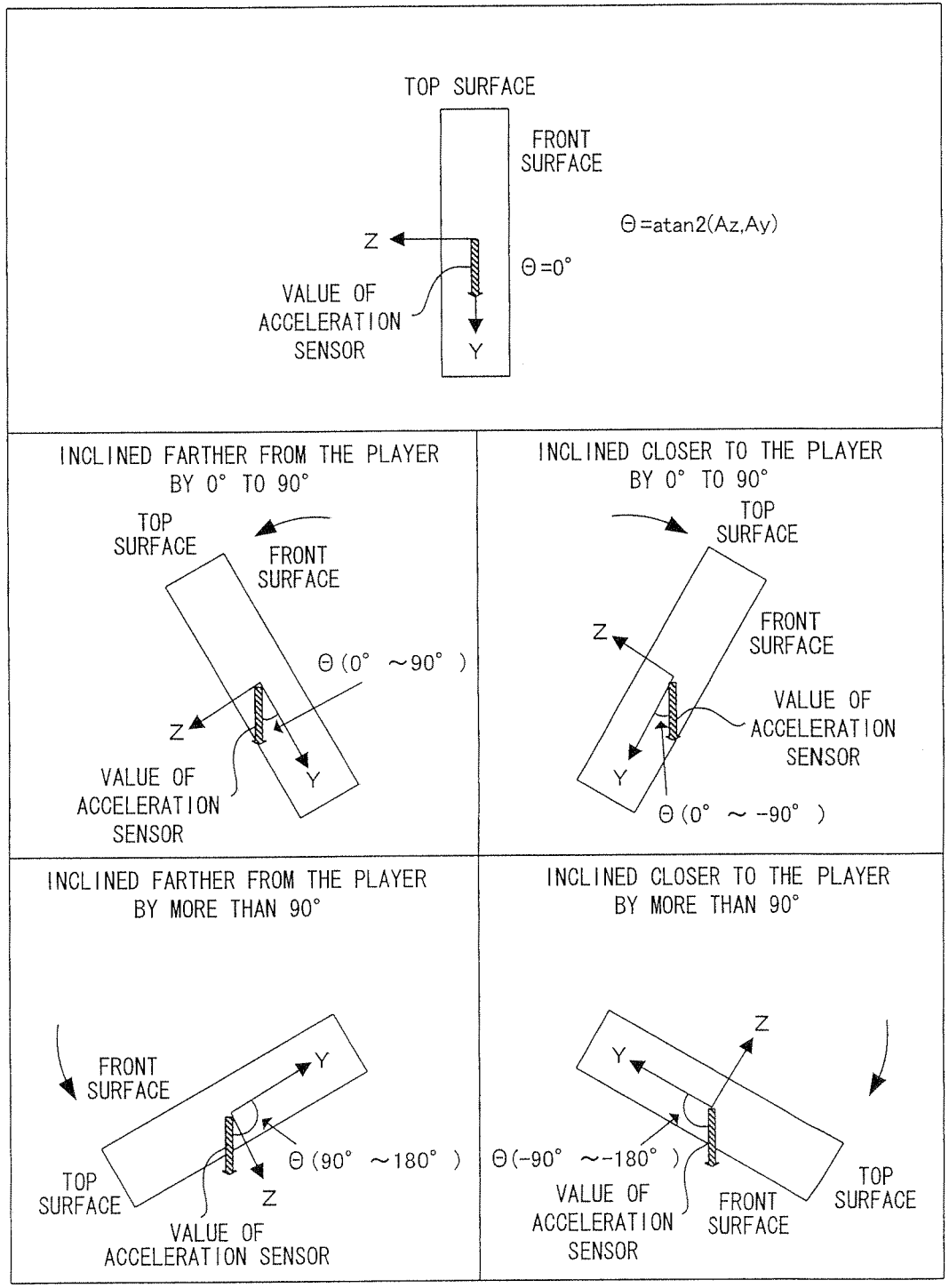
FIG. 16 shows an exemplary correspondence between the inclination of the operation unit and the detection result of the inclination in the first embodiment.

FIG. 9 shows an exemplary correspondence between the operation performed by the player and the motion of the character in the first embodiment. When the first unit is inclined farther (FIG. 16) from the player than the second unit, the character curves leftward; whereas when the second unit is inclined farther from the player than the first unit, the character curves rightward. When the first unit and the second unit are inclined farther from the player on average (i.e., the average of the inclinations of the first unit and the second unit is farther from the player) with respect to the reference posture (for example, the posture vertical to the ground), the character advances; whereas when the first unit and the second unit are inclined closer (see FIG. 16) to the player on average with respect to the reference posture, the character retracts. In FIG. 9, the direction from the eye of the observer of the drawing toward the sheet of the paper is the advancing direction (forward direction) of the character, and the opposite direction is the retracting direction (rearward direction) of the character.

Figure 10:
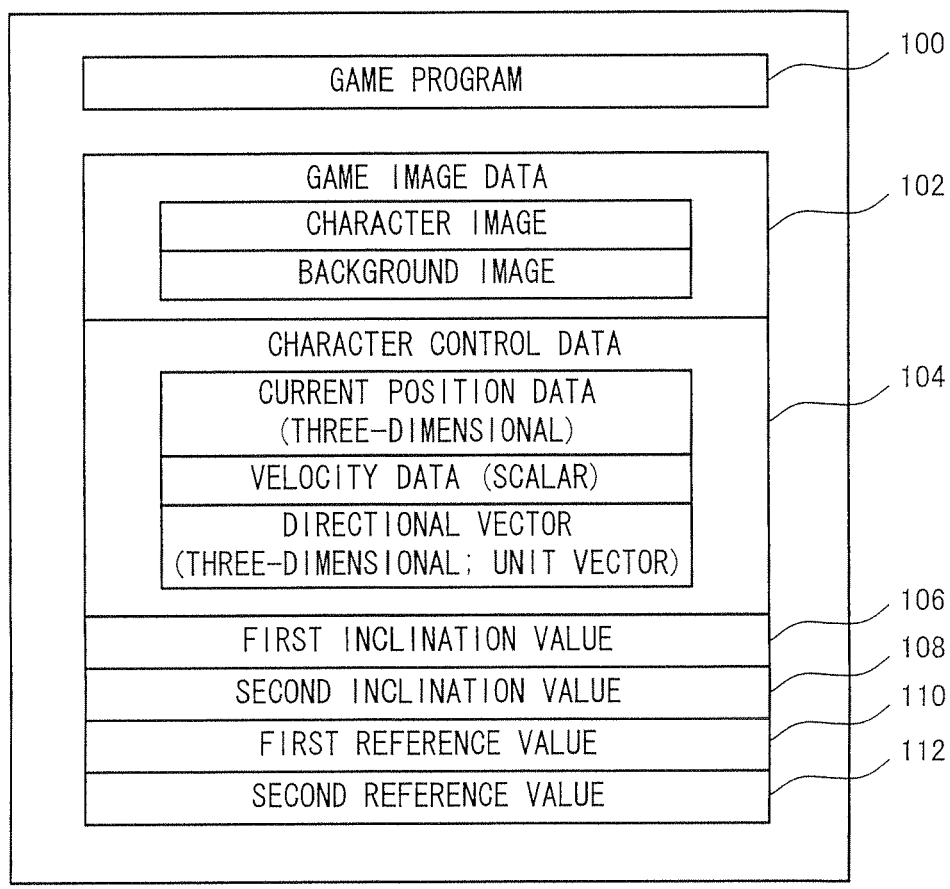
FIG. 10 is a memory map of a main memory in the first embodiment.

FIG. 10 shows an exemplary memory map of the main memory 33 in the first embodiment. The main memory 33 stores a game program 100, game image data 102, character control data 104, a first inclination value 106, a second inclination value 108, a first reference value 110, and a second reference value 112. The game program and the game image data 102 are stored on the optical disc 4, and are copied onto the main memory 33 for use when necessary. The first reference value 110 and the second reference value 112 may also be stored on the optical disc 4, and may be copied onto the main memory 33 for use when necessary.

The game image data 102 is data for generating a game image (polygon data, texture data, etc.) and includes data for generating a character image and data for generating a background image.

The character control data 104 is data for controlling a character, and includes current position data representing the current position of the character in the game world (three-dimensional virtual space), velocity data representing the magnitude of the moving speed of the character, and a directional vector representing the advancing direction of the character. The current position data is represented by a three-dimensional coordinate value, the velocity data is represented by a scalar value, and the directional vector is represented by a three-dimensional unit vector. Instead of the velocity data, a velocity vector may be used.

The first inclination value 106 represents an inclination of the first unit detected based on an output value from the first acceleration sensor. The second inclination value 108 represents an inclination of the second unit detected based on an output value from the second acceleration sensor. The first reference value 110 is a reference value for the inclination of the first unit. The second reference value 112 is a reference value for the inclination of the second unit.

With reference to the flowcharts in FIG. 11 through FIG. 14, a flow of processing executed by the CPU 30 based on the game program 100 will be described.

Figure 11:
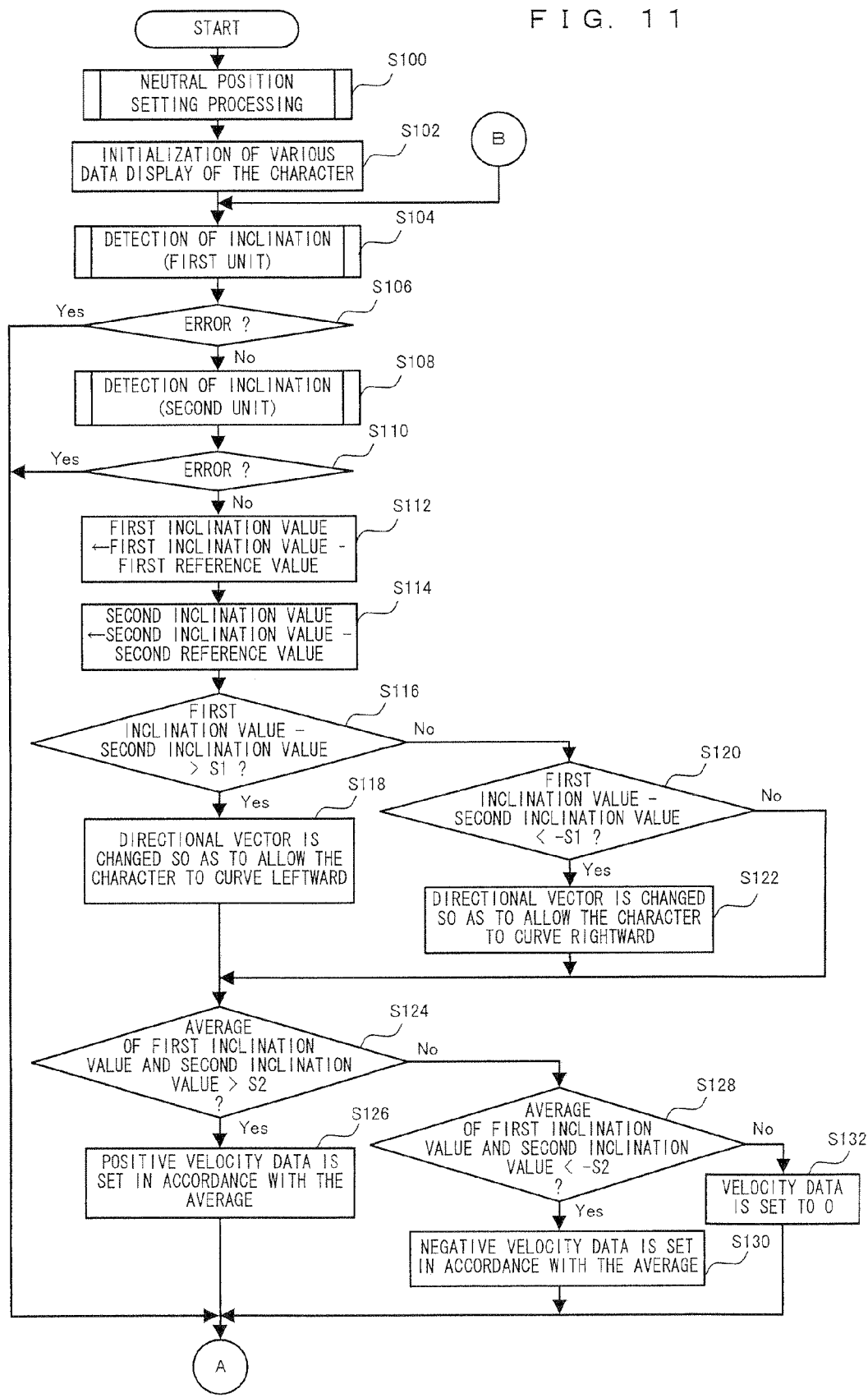
FIG. 11 is a part of a flowchart illustrating a flow of processing executed by a CPU in the first embodiment.

Referring to FIG. 11, when the execution of the game program 100 is started, the CPU 30 first executes neutral position setting processing in step S100. The neutral position setting processing is for determining the reference value for the inclination of the first unit (first reference value 110) and the reference value for the inclination of the second unit (second reference value 112). Hereinafter, with reference to FIG. 12, the neutral position setting processing will be described in detail.

Figure 12:
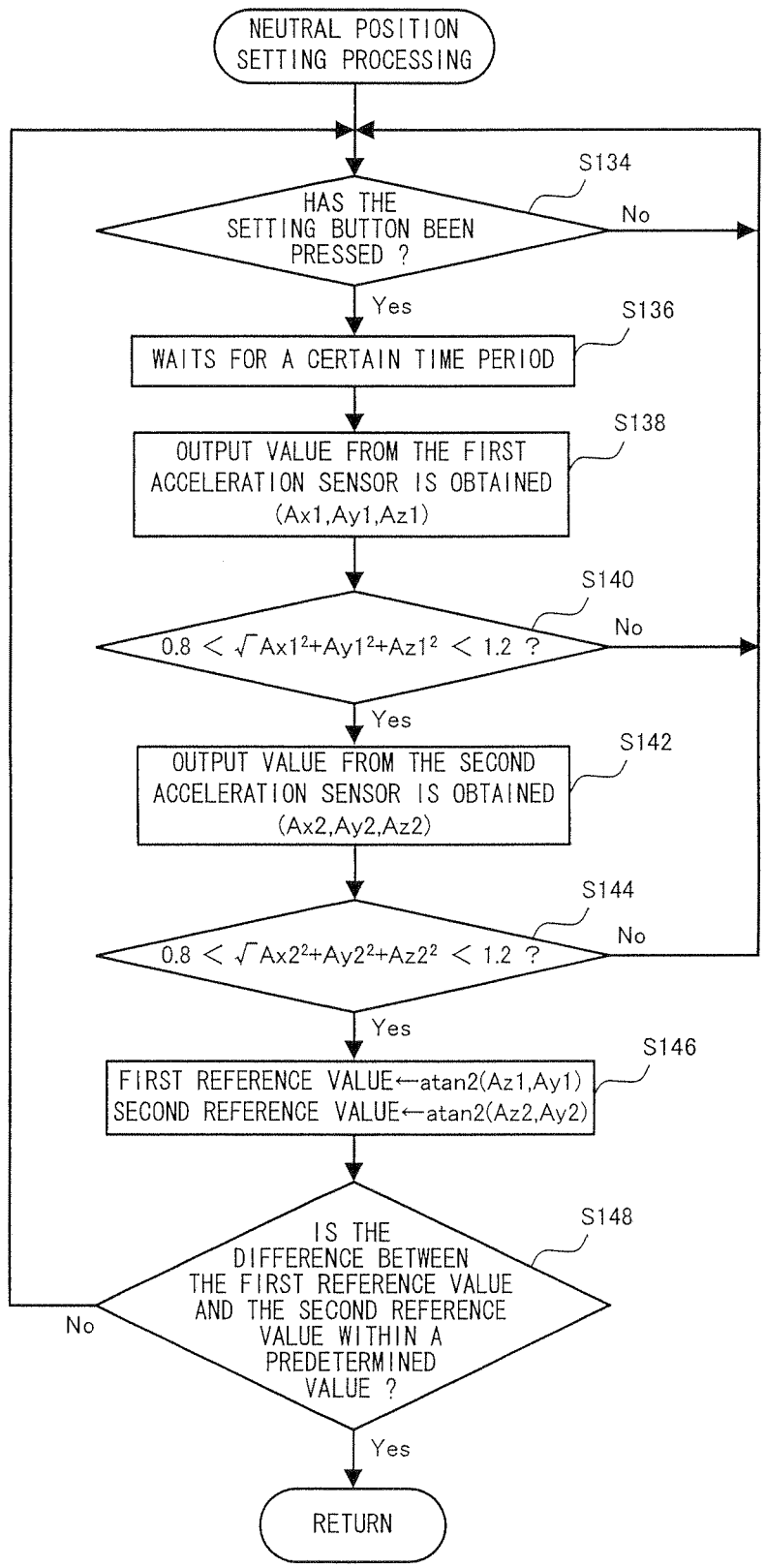
FIG. 12 is a flowchart illustrating neutral position setting processing in the first embodiment in detail.

Referring to FIG. 12, in step S134, the CPU 30 determines whether or not the player has pressed a setting button (a button for allowing the player to set the neutral position) based on the operation information transmitted from the controller 7. The setting button may be provided only in the first unit, only in the second unit or both in the first unit and the second unit. The neutral position may be set by the player uttering a voice to a microphone instead of pressing the setting button. In this embodiment, the setting button is provided in the first unit. When it is detected that the player has pressed the setting button, the processing is advanced to step S136. When it is not detected that the player has pressed the setting button, the processing in step S134 is repeated (i.e., the CPU 30 waits until the player presses the setting button).

In step S136, the CPU 30 waits for a certain time period (for example, 10 frames). The reason for this is that immediately after the player leaves his/her fingers from the setting button, the operation unit including the setting button (in this embodiment, the first unit) may possibly swing, in which case the first reference value is not correctly set.

In step S138, an output value (output vector) from the first acceleration sensor is obtained. In this embodiment, the output value in the X axis direction from the first acceleration sensor is Ax1, the output value in the Y axis direction from the first acceleration sensor is Ay1, and the output value in the Z axis direction from the first acceleration sensor is Az1. The output value may be set to be used as follows. Output values from the acceleration sensor for a predetermined time period (e.g., about 3 seconds) are always stored. When the player presses the setting button, the output value which was output a predetermined time period before may be used, or an average of the output values for a certain time period before or after the player presses the setting button may be used (this is also applicable to the second acceleration sensor).

In step S140, it is determined whether or not the magnitude of the output vector (Ax1, Ay1, Az1) from the first acceleration sensor obtained in step S138 (i.e., $\sqrt{Ax1^2+Ay1^2+Az1^2}$) is within the range of 0.8 to 1.2, namely, whether or not the first unit is in a still state. The output vector from each of the first acceleration sensor and the second acceleration sensor is set to have a magnitude of 1.0 in a still state (i.e., in a state of being influenced only by the gravitational acceleration). Therefore, when the magnitude of the output vector from the first acceleration sensor is 1.0 or closer thereto, the first unit can be determined to be substantially still. By contrast, when the magnitude of the output vector from the first acceleration sensor is far from 1.0, the first unit can be determined to be moving. When the magnitude of the output vector from the first acceleration sensor is within the range of 0.8 to 1.2, the processing is advanced to step S142. When the magnitude of the output vector from the first acceleration sensor is not within the range of 0.8 to 1.2, the processing is returned to step S134. The reason is that when the first unit is moving, the first reference value cannot be correctly set. The range of 0.8 to 1.2 is exemplary. The determination in step S140 is whether or not the magnitude of the output vector is substantially close to 1.0. In this embodiment, the X direction component of the acceleration sensor (Ax) is not used. Therefore, the player basically plays without inclining the controller 7 in the X direction. Therefore, when the X direction component of the output from the first acceleration sensor obtained in step S138 is larger than a certain value, the processing may be returned to step S134 for the reason that the neutral position is not appropriate (this is also applicable to the second acceleration sensor).

In step S142, an output value (output vector) from the second acceleration sensor is obtained. In this embodiment, the output value in the X axis direction from the second acceleration sensor is Ax2, the output value in the Y axis direction from the second acceleration sensor is Ay2, and the output value in the Z axis direction from the second acceleration sensor is Az2.

In step S144, it is determined whether or not the magnitude of the output vector (Ax2, Ay2, Az2) from the second acceleration sensor obtained in step S142 (i.e., $\sqrt{Ax2^2+Ay2^2+Az2^2}$) is within the range of 0.8 to 1.2, i.e., whether or not the second unit is in a still state. When the magnitude of the output vector from the second acceleration sensor is within the range of 0.8 to 1.2, the processing is advanced to step S146. When the magnitude of the output vector from the second acceleration sensor is not within the range of 0.8 to 1.2, the processing is returned to step S134. The reason is that when the second unit is moving, the second reference value cannot be correctly set.

In step S146, arctan (Az1/Ay1), which represents the inclination of the first unit around the X axis (horizontal axis) (such an inclination is represented by angle θ in FIG. 16), is calculated, and the calculated value is set as the first reference value 110. Similarly, arctan (Az2/Ay2), which represents the inclination of the second unit around the X axis (such an inclination is represented by angle θ in FIG. 16), is calculated, and the calculated value is set as the second reference value 112. (Ay1, Az1) may be set as a reference value.

In this embodiment, the first reference value 110 is set only based on the output value from the first acceleration sensor obtained in step S138. Alternatively, output values from the first acceleration sensor may be obtained at a plurality of different times, and the first reference value 110 may be set based on an average thereof. Owing to such an arrangement, even if the first unit is swinging when the neutral position is set, the influence of such a swing can be suppressed. This is also applicable to the second reference value 112.

In step S148, it is determined whether or not the difference between the first reference value 110 and the second reference value 112 is within a predetermined value. When the difference between the first reference value 110 and the second reference value 112 is within the predetermined value, the neutral position setting processing is terminated, and the processing is returned to step S102 in FIG. 11. When the difference between the first reference value 110 and the second reference value 112 exceeds the predetermined value, the processing is returned to step S134 to re-set the first reference value 110 and the second reference value 112.

The reason why the first reference value 110 and the second reference value 112 are re-set when the difference therebetween exceeds the predetermined value in step S148 is that when the first reference value 110 and the second reference value 112 having such values are used for the game, a high operability is not expected to be obtained. More specifically, in this embodiment, as shown in FIG. 9, when the first unit is inclined farther from the player than the second unit, the character curves leftward; whereas when the second unit is inclined farther from the player than the first unit, the character curves rightward. When the first reference value 110 and the second reference value 112 are largely different from each other, even when the first unit and the second unit are inclined parallel to each other, the character may curve leftward or rightward. This makes the player feel unnatural.

In the case of a game in which a large difference between the first reference value 110 and the second reference value 112 does not present any serious problem, the determination in step S148 may be omitted.

In this embodiment, when the player presses the setting button provided in the first unit, the first reference value 110 and the second reference value 112 are both set. The present invention is not limited to this. For example, the following arrangement is possible in the case where the first unit and the second unit each have a setting button. When the player presses the setting button provided in the first unit, the first reference value 110 is set; and then when the player presses the setting button provided in the second unit, the second reference value 112 is set. In this case, however, the first reference value 110 and the second reference value 112 are likely to be largely different from each other. Therefore, it is preferable that the first reference value 110 and the second reference value 112 are set substantially at the same time as in this embodiment.

In this embodiment, the first reference value 110 and the second reference value 112 are separately set. In order to avoid the unnaturalness described above, a common value may be set as the first reference value 110 and the second reference value 112. For example, an average of arctan (Az1/Ay1) and arctan (Az2/Ay2) may be commonly set as the first reference value 110 and the second reference value 112 in step S146. Alternatively, either arctan (Az1/Ay1) or arctan (Az2/Ay2) may be calculated, and such a calculation result may be commonly set as the first reference value 110 and the second reference value 112. In this case, in order to avoid the influence of the swing of the operation unit when the player presses the setting button, it is preferable to commonly set the first reference value 110 and the second reference value 112 based on the output value from the acceleration sensor in the operation unit which does not include the setting button pressed by the player.

Returning to FIG. 11, when the neutral position setting processing is terminated, in step S102, the CPU 30 initializes various data used for the game processing (character control data 104, inclination value 106, etc.), and generates and displays a game image including the character on the screen of the monitor 2.

In step S104, an inclination of the first unit is detected. Hereinafter, the detection of the inclination will be described in detail with reference to FIG. 14.

Figure 14:
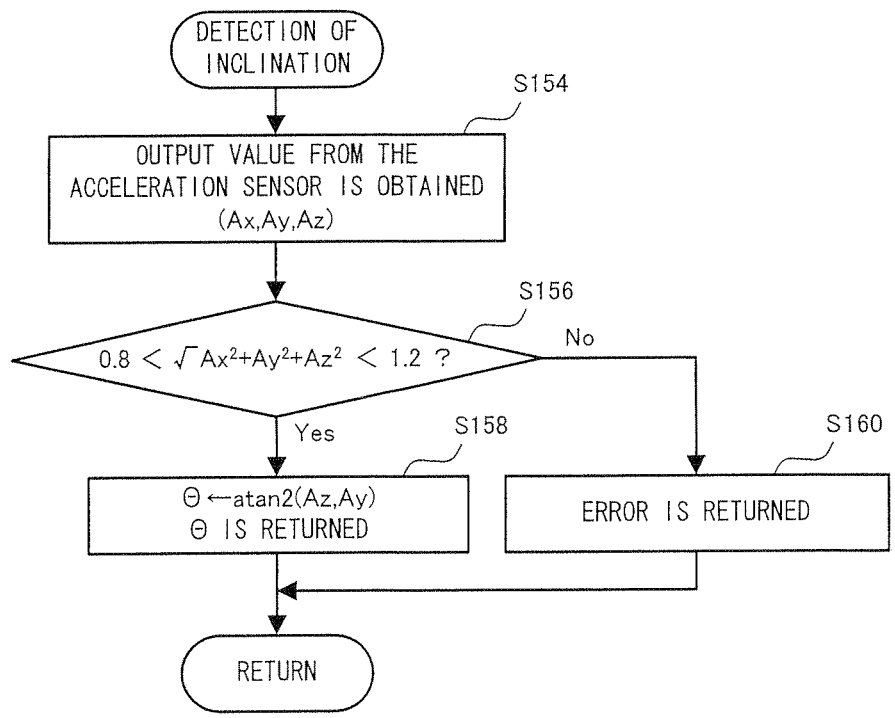
FIG. 14 is a flowchart illustrating the detection of inclination in the first embodiment in detail.

Referring to FIG. 14, in step S154, an output value (output vector) from the acceleration sensor (here, the first acceleration sensor) is obtained. In this embodiment, the output value in the X direction component from the acceleration sensor is Ax1, the output value in the Y direction component from the acceleration sensor is Ay1, and the output value in the Z direction component from the acceleration sensor is Az1.

In step S156, it is determined whether or not the magnitude of the output vector (Ax1, Ay1, Az1) from the first acceleration sensor obtained in step S154 (i.e., $\sqrt{(Ax1^2+Ay1^2+Az1^2)}$) is within the range of 0.8 to 1.2, namely, whether or not the first unit is in a still state. When the magnitude of the output vector from the first acceleration sensor is within the range of 0.8 to 1.2, the processing is advanced to step S158. When the magnitude of the output vector from the first acceleration sensor is not within the range of 0.8 to 1.2, the processing is advanced to step S160.

In step S158, arctan (Az1/Ay1), which represents the inclination of the first unit around the X axis (such an inclination is represented by angle θ in FIG. 16), is calculated, and the calculated value is returned as a return value for the detection of the inclination. The return value is stored on the main memory 33 as the first return value 106. Then, the processing is advanced to step S106 in FIG. 11.

In step S160, an error is returned as the detection result of the inclination for the reason that when the first unit is moving, the inclination of the first unit cannot be correctly detected. Then, the detection of the inclination is terminated. The processing is advanced to step S106 in FIG. 11.

In step S106, it is determined whether or not the detection result of the inclination in step S104 is an error. When the result is an error, the processing is advanced to step S150 in FIG. 13. When the result is not an error, the processing is advanced to step S108.

In step S108, the detection of the inclination is performed regarding the second unit similarly to step S104. Specifically, when the magnitude of the output vector from the second acceleration sensor (Ax2, Ay2, Az2) is within the range of 0.8 to 1.2, the value of arctan (Az2/Ay2), which represents the inclination of the second unit around the X axis (such an inclination is represented by angle θ in FIG. 16), is stored on the main memory 33 as the second inclination value 108.

In step S110, it is determined whether or not the detection result of the inclination in step S108 is an error. When the result is an error, the processing is advanced to step S150 in FIG. 13. When the result is not an error, the processing is advanced to step S112.

In step S112, the first inclination value 106 is corrected based on the first reference value 110. Specifically, the difference between the first inclination value 106 and the first reference value 110 is calculated, and the calculation result is stored on the main memory 33 to update the first inclination value 106.

In step S114, the second inclination value 108 is corrected based on the second reference value 112. Specifically, the difference between the second inclination value 108 and the second reference value 112 is calculated, and the calculation result is stored on the main memory 33 to update the second inclination value 108.

In step S116, it is determined whether or not the value obtained by subtracting the second inclination value 108 from the first inclination value 106 is larger than S1 (positive threshold value). When the value obtained by subtracting the second inclination value 108 from the first inclination value 106 is larger than S1 (i.e., when the first unit is inclined farther from the player than the second unit), the processing is advanced to step S118. Otherwise, the processing is advanced to step S120.

Figure 15:
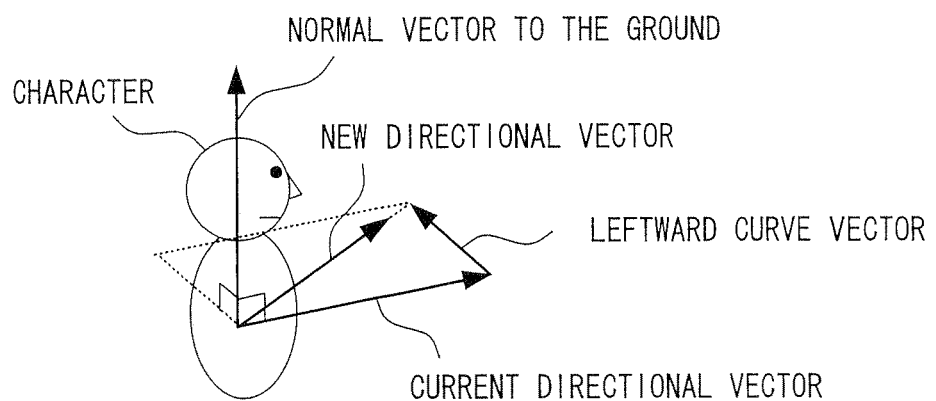
FIG. 15 shows an exemplary method for changing a directional vector in the first embodiment.

In step S118, the directional vector is changed so as to cause the character to curve leftward. The directional vector can be changed by various methods. In this embodiment, for example, the method shown in FIG. 15 is used. A leftward curve vector, which is perpendicular both to the normal vector to the ground and to the current directional vector at the current position of the character and has a predetermined magnitude, is obtained. The leftward curve vector and the current directional vector are synthesized to obtain a synthesized vector. A unit vector having the same direction as the synthesized vector is determined as a new directional vector.

In step S120, it is determined whether or not the value obtained by subtracting the second inclination value 108 from the first inclination value 106 is smaller than −S1. When the value obtained by subtracting the second inclination value 108 from the first inclination value 106 is smaller than −S1 (i.e., when the second unit is inclined farther from the player than the first unit), the processing is advanced to step S122. Otherwise, the processing is advanced to step S124.

In step S122, the directional vector is changed so as to cause the character to curve rightward.

In step S124, it is determined whether or not the average value of the first inclination value 106 and the second inclination value 108 is larger than S2 (positive threshold value). When the average value of the first inclination value 106 and the second inclination value 108 is larger than S2 (i.e., when the first unit and the second unit are inclined farther from the player on average with respect to the reference posture), the processing is advanced to step S126. Otherwise, the processing is advanced to step S128.

In step S126, positive velocity data is set in accordance with the average value of the first inclination value 106 and the second inclination value 108. For example, positive velocity data having an absolute value in proportion to the average value is set. Then, the processing is advanced to step S150 in FIG. 13.

In step S128, it is determined whether or not the average value of the first inclination value 106 and the second inclination value 108 is smaller than −S2. When the average value of the first inclination value 106 and the second inclination value 108 is smaller than −S2 (i.e., when the first unit and the second unit are inclined closer to the player on average with respect to the reference posture), the processing is advanced to step S130. Otherwise, the processing is advanced to step S132.

In step S130, negative velocity data is set in accordance with the average value of the first inclination value 106 and the second inclination value 108. For example, negative velocity data having an absolute value in proportion to the average value is set. Then, the processing is advanced to step S150 in FIG. 13.

Figure 13:
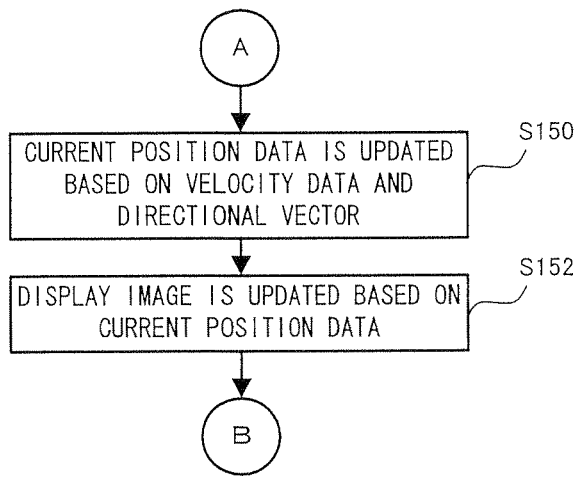
FIG. 13 is a part of the flowchart illustrating the flow of processing executed by the CPU in the first embodiment.

In step S132, the velocity data is set to 0, and the processing is advanced to step S150 in FIG. 13.

Referring to FIG. 13, in step S150, the current position data is updated based on the velocity data and the directional vector. As a result, the character in the game world moves by the distance represented by the velocity data in the direction represented by the directional vector.

In step S152, the game image displayed on the monitor 2 is updated based on the current position data, and the processing is returned to step S104 in FIG. 11. The above-described processing is repeated, so that the game image is changed when necessary in accordance with the operation performed by the player.

As described above, according to this embodiment, the player can freely move both of his/her hands. Owing to a high degree of freedom of motion realized by such an arrangement, a dynamic play is made possible. In addition, the character can be controlled by the inclination difference between two operation units. Therefore, the player can play intuitively and thus obtain a high operability.

In this embodiment, three-axial acceleration sensors are used. Even when one-axial acceleration sensors are used, the inclinations of the operation units can be detected (for example, the inclinations of the operation units can be detected by referring to only the output value in the Z axis direction in FIG. 16). Thus, substantially the same effects as those of this embodiment are provided.

In this embodiment, the inclination difference between the first unit and the second unit, and the average inclination value of the first unit and the second unit, are used to control the motion of the character. It is possible to use only the difference without using the average value. Hereinafter, a modification to the first embodiment in which only the inclination difference between the first unit and the second unit will be described.

Figure 17:
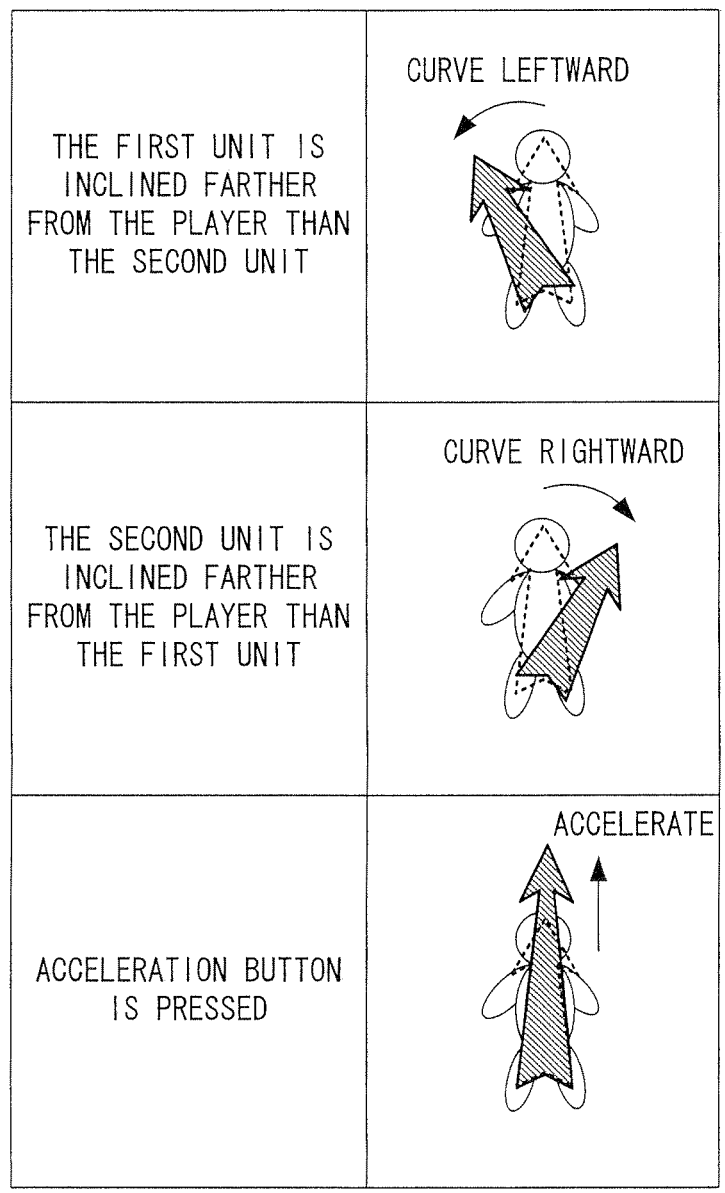
FIG. 17 shows an exemplary correspondence between the operation performed by the player and the motion of the character in a modification to the first embodiment.

FIG. 17 shows an exemplary correspondence between the operation performed by the player and the motion of the character in the modification to the first embodiment. When the first unit is inclined farther from the player than the second unit, the character curves leftward; whereas when the second unit is inclined farther from the player than the first unit, the character curves rightward. When an acceleration button is pressed, the character's motion is accelerated in the advancing direction at that time.

Figure 18:
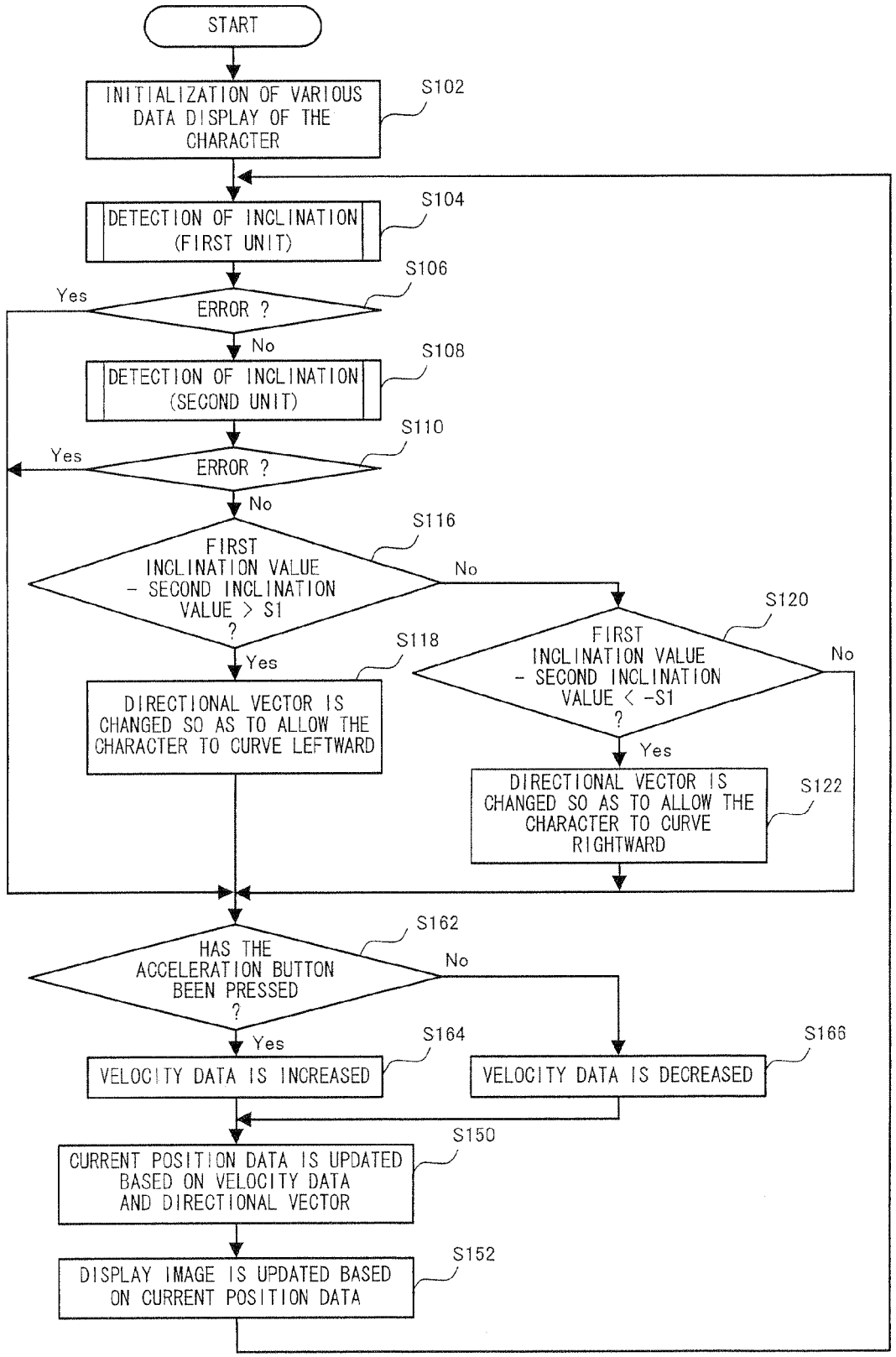
FIG. 18 is a flowchart illustrating a flow of processing executed by the CPU in the modification to the first embodiment.

With reference to FIG. 18, a flow of processing executed by the CPU 30 in the modification to the first embodiment will be described. In FIG. 18, substantially the same processing as that in FIG. 11 will bear the same reference numerals and the descriptions thereof will be omitted.

Before step S162, the character curves leftward or rightward in accordance with the inclination difference between the first unit and the second unit.

In step S162, the CPU 30 determines whether or not the player has pressed the acceleration button. The acceleration button may be provided only in the first unit, only in the second unit or both in the first unit and the second unit. When the player has pressed the acceleration button, the processing is advanced to step S164. When the player has not pressed the acceleration button, the processing is advanced to step S166.

In step S164, the velocity data is increased by a predetermined amount.

In step S166, the velocity data is decreased by a predetermined amount.

After step S164 or S166, substantially the same processing as that in FIG. 13 is executed.

As described above, according to this modification, the game can be played only using the inclination difference between the first unit and the second unit, without using any absolute value of the inclination of the first unit or the second unit. Therefore, the player can play the game with no problem even while lying on the floor. Thus, the degree of freedom of posture during the game is increased.

Second Embodiment

Figure 19:
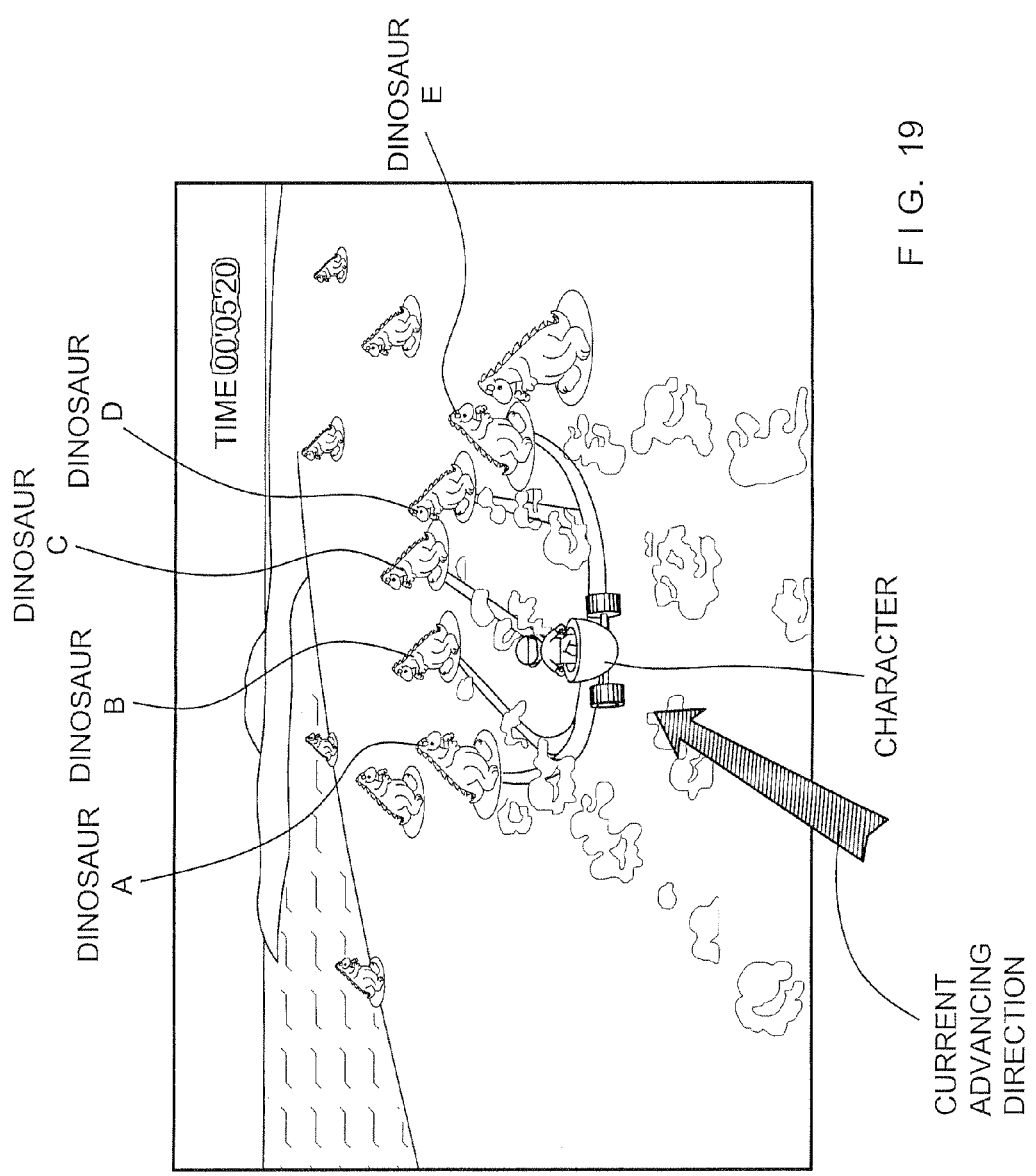
FIG. 19 shows an exemplary game image in a second embodiment.

FIG. 19 shows an exemplary image displayed in a second embodiment. On the screen of the monitor 2, a three-dimensional virtual game world including a character operated by the player (game object) is displayed. In this embodiment, the character is riding on a sleigh, which is pulled by five dinosaurs (dinosaurs A through E). The player can control the motion of the character by swinging the first unit or the second unit. The following description will be given with the premise that the player holds the first unit with his/her left hand and holds the second unit with his/her right hand (the player may hold the first unit with his/her right hand and hold the second unit with his/her left hand).

Figure 20:
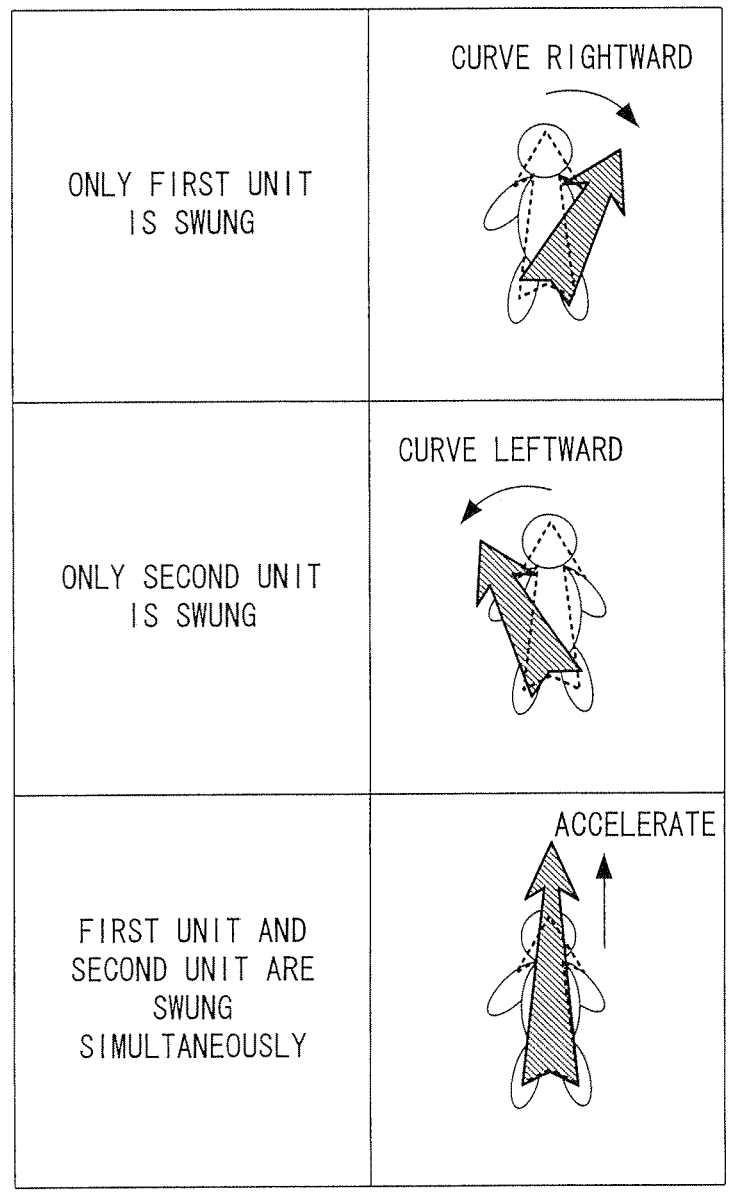
FIG. 20 shows an exemplary correspondence between the operation performed by the player and the motion of the character in the second embodiment.

FIG. 20 shows an exemplary correspondence between the operation performed by the player and the motion of the character in the second embodiment. When only the first unit is swung, the character curves rightward (the advancing direction is changed rightward); whereas when only the second unit is swung, the character curves leftward (the advancing direction is changed leftward). When the first unit and the second unit are swung simultaneously, the character's motion is accelerated in the advancing direction at that time.

The game may be set such that when only the first unit is swung, the character advances leftward; when only the second unit is swung, the character advances rightward; and when the first unit and the second unit are swung at the same time, the character advances forward.

Figure 21:
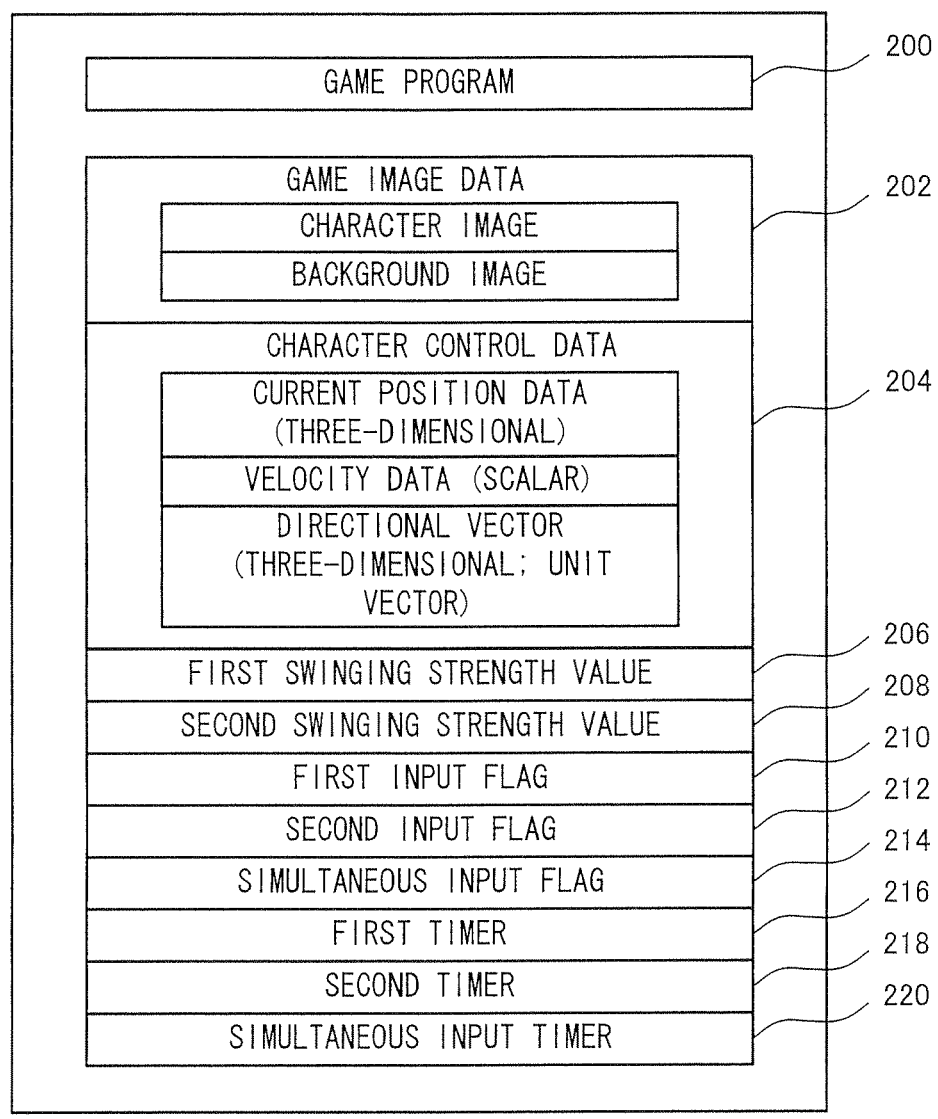
FIG. 21 is a memory map of the main memory in the second embodiment.

FIG. 21 shows an exemplary memory map of the main memory 33 in the second embodiment. The main memory 33 stores a game program 200, game image data 202, character control data 204, a first swinging strength value 206, a second swinging strength value 208, a first input flag 210, a second input flag 212, a simultaneous input flag 214, a first timer 216, a second timer 218, and a simultaneous input timer 220.

The game image data 202 and the character control data 204 are substantially the same as those in the first embodiment and will not be described here.

The first swinging strength value 206 represents a swinging strength of the first unit which is detected based on the output value from the first acceleration sensor. The second swinging strength value 208 represents a swinging strength of the second unit which is detected based on the output value from the second acceleration sensor.

The first flag 210 is a flag representing that the first unit has been swung, and is turned on when the first unit is detected to have been swung. The second flag 212 is a flag representing that the second unit has been swung, and is turned on when the second unit is detected to have been swung. The simultaneous input flag 214 is a flag representing that the first flag and the second unit have been swung simultaneously, and is turned on when the first flag and the second unit are detected to have been swung simultaneously.

The first timer 216 is a value representing a time period from when the first unit is detected to have been swung (the number of frames). The second timer 218 is a value representing a time period from when the second unit is detected to have been swung (the number of frames). The simultaneous input timer 220 is a value representing a time period from when the first unit and the second unit are detected to have been swung simultaneously (the number of frames).

With reference to the flowcharts in FIG. 22 through FIG. 25, a flow of processing executed by the CPU 30 based on the game program 200 will be described. The processing in steps S202 through S266 is repeated frame by frame.

Figure 22:
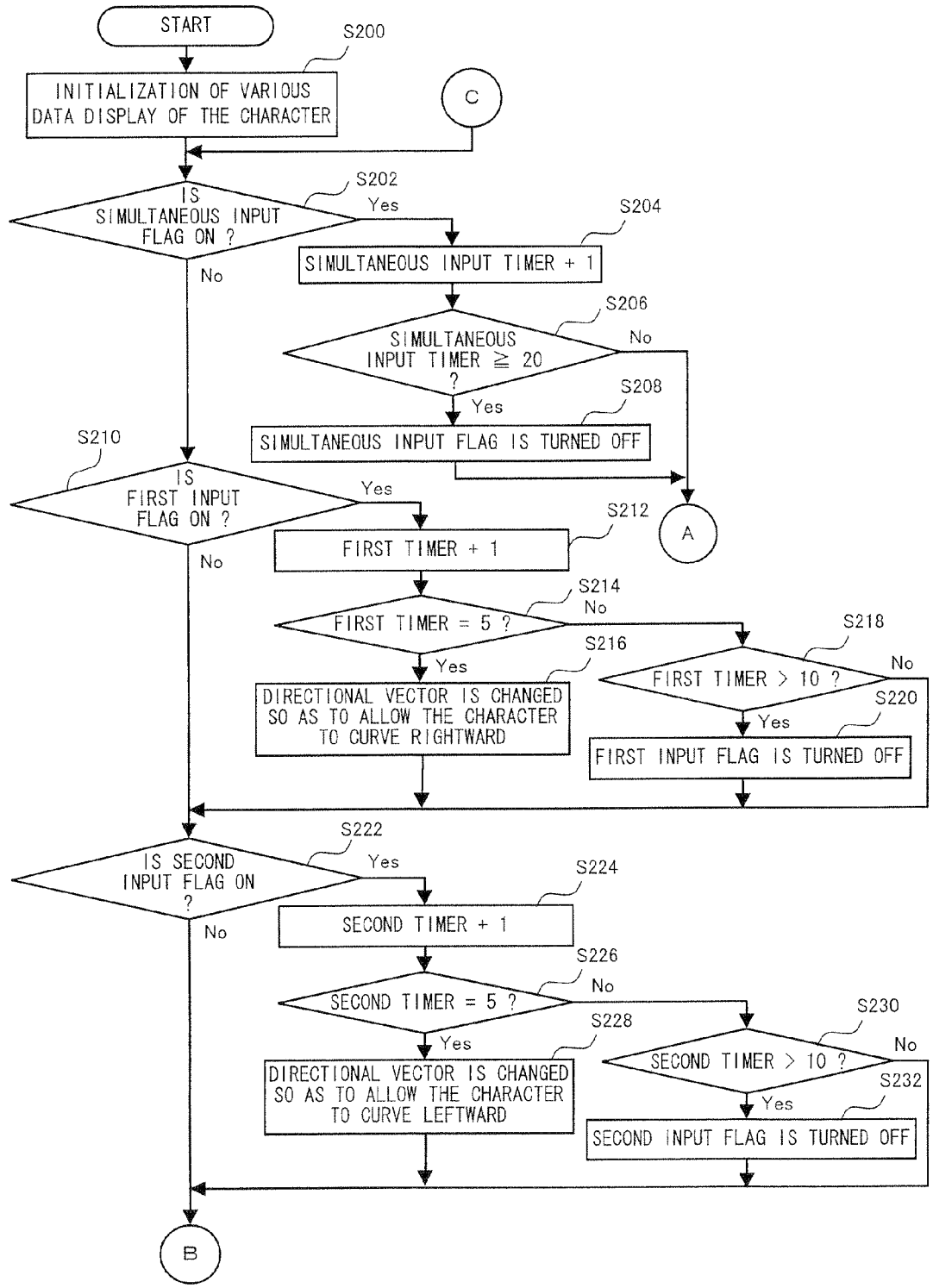
FIG. 22 is a part of a flowchart illustrating a flow of processing executed by the CPU in the second embodiment.

Referring to FIG. 22, when the execution of the game program 200 is started, in step S200, the CPU 30 first initializes various data used for the game processing (character control data 204, first swinging strength value 206, first input flag 210, first timer 216, etc.), and generates and displays a game image including the character on the screen of the monitor 2.

In step S202, it is determined whether or not the simultaneous input flag 214 is on. When the simultaneous input flag 214 is on, the processing is advanced to step S204. When the simultaneous input flag 214 is not on, the processing is advanced to step S210.

In step S204, "1" is added to the simultaneous input timer 220.

In step S206, it is determined whether or not the simultaneous input timer 220 is equal to or greater than 20. When the simultaneous input timer 220 is equal to or greater than 20, the processing is advanced to step S208. Otherwise, the processing is advanced to step S262 in FIG. 24.

Figure 24:
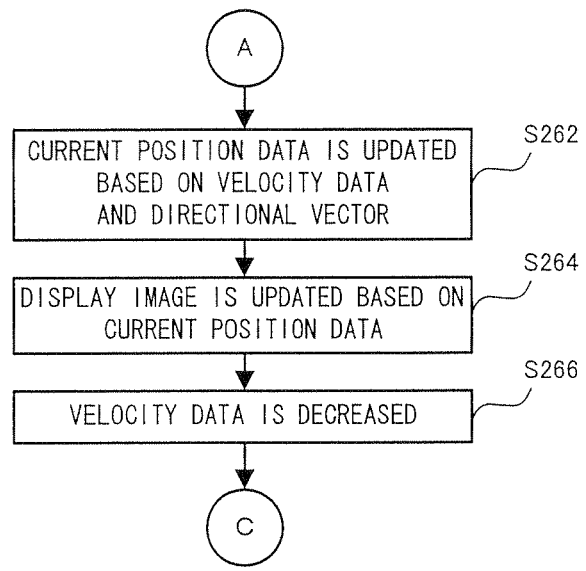
FIG. 24 is a part of the flowchart illustrating the flow of processing executed by the CPU in the second embodiment.

In step S208, the simultaneous input flag 214 is turned off, and the processing is advanced to step S262 in FIG. 24.

As described above, after the simultaneous input flag 214 is turned on (i.e., after the first unit and the second unit are detected to have been swung simultaneously) until a 20 frame time period passes, neither the detection of the swinging strength of the first unit (step S236 described later) nor the detection of the swinging strength of the second unit (step S250 described later) is performed. Namely, neither the swing operation on the first unit nor the swing operation on the second unit by the player is accepted. Owing to such an arrangement, one swing operation performed by the player is prevented from being detected continuously over a period of a plurality of frames.

In step S210, it is determined whether or not the first input flag 210 is on. When the first input flag 210 is on, the processing is advanced to step S212. When the first input flag 210 is not on, the processing is advanced to step S222.

In step S212, "1" is added to the first timer 216.

In step S214, it is determined whether or not the first timer 216 is 5. When the first timer 216 is 5 (i.e., when a 5 frame time period has passed after the first unit is detected to have been swung, without any swing of the second unit being detected; namely, when only the first unit was swung), the processing is advanced to step S216. When the first timer 216 is not 5, the processing is advanced to step S218.

In step S216, the directional vector is changed so as to cause the character to curve rightward. The directional vector can be changed in substantially the same manner as in the first embodiment.

In step S218, it is determined whether or not the first timer 216 is larger than 10. When the first timer 216 is larger than 10, the processing is advanced to step S220. When the first timer 216 is not larger than 10, the processing is advanced to step S222.

In step S220, the first input flag 210 is turned off.

As described above, after the first input flag 210 is turned on (i.e., after the first unit is detected to have been swung) until a 10 frame time period passes, the detection of the swinging strength of the first unit (step S236 described later) is not performed. Namely, the swing operation on the first unit by the player is not accepted. Owing to such an arrangement, one swing operation performed by the player is prevented from being detected continuously over a period of a plurality of frames.

As described in more detail later, when the second unit is detected to have been swung before a 5 frame time period passes after the first input flag 210 is turned on, the simultaneous input flag 214 is turned on at that time. Therefore, until a 20 frame time period passes after that, the swing operation on the first unit performed by the player is not accepted. When the simultaneous input flag 214 is turned off, the detection of the swinging strength of the first unit (step S236 described later) and the detection of the swinging strength of the second unit (step S250 described later) are resumed simultaneously. Therefore, the timing at which the acceptance of the swing operation on the first unit is resumed, and the timing at which the acceptance of the swing operation on the second unit is resumed, match each other.

In step S222, it is determined whether or not the second input flag 212 is on. When the second input flag 212 is on, the processing is advanced to step S224. When the second input flag 212 is not on, the processing is advanced to step S234 in FIG. 23.

In step S224, "1" is added to the second input timer 218.

In step S226, it is determined whether or not the second timer 218 is 5. When the second timer 218 is 5 (i.e., when only the second unit was swung), the processing is advanced to step S228. When the second timer 218 is not 5, the processing is advanced to step S230.

In step S228, the directional vector is changed so as to cause the character to curve leftward.

In step S230, it is determined whether or not the second timer 218 is larger than 10. When the second timer 218 is larger than 10, the processing is advanced to step S232. When the second timer 218 is not larger than 10, the processing is advanced to step S234 in FIG. 23.

In step S232, the second input flag 212 is turned off.

As described above, after the second input flag 212 is turned on (i.e., after the second unit is detected to have been swung) until a 10 frame time period passes, the detection of the swinging strength of the second unit (step S250 described later) is not performed. Namely, the swing operation on the second unit by the player is not accepted. Owing to such an arrangement, one swing operation performed by the player is prevented from being detected continuously over a period of a plurality of frames.

As described in more detail later, when the first unit is detected to have been swung before a 5 frame time period passes after the second input flag 212 is turned on, the simultaneous input flag 214 is turned on at that time. Therefore, until a frame time period passes after that, the swing operation on the second unit performed by the player is not accepted. When the simultaneous input flag 214 is turned off, the detection of the swinging strength of the first unit (step S236 described later) and the detection of the swinging strength of the second unit (step S250 described later) are resumed simultaneously. Therefore, the timing at which the acceptance of the swing operation on the first unit is resumed, and the timing at which the acceptance of the swing operation on the second unit is resumed, match each other. In other words, in this embodiment, even when the timing at which the first unit is detected to have been swung is slightly offset with respect to the timing at which the second unit is detected to have been swung, it is recognized that the first unit and the second unit were swung simultaneously. Even in this case, the timing at which the acceptance of the swing operation on the first unit is resumed, and the timing at which the acceptance of the swing operation on the second unit is resumed, match each other. Therefore, when the simultaneous swing operation is resumed and then another simultaneous swing operation is performed, the problem that it is detected that only the first unit or the second unit has been swung the second time is avoided. The time period in which the swing is not accepted (swing acceptance prohibition time period) after the simultaneous input flag 214 is turned on may be a 10 frame time period (same as the swing acceptance prohibition time period after only the first unit or only the second unit is swung). In this embodiment, such a period starts when a later swing operation is detected, among the swing operation on the first unit and the swing operation on the second unit. Alternatively, a period of, for example, 20 frames may start when an earlier swing operation is detected. Still alternatively, such a period may start at an intermediate timing (a timing between the timing at which an earlier swing operation is detected and the timing at which a later swing operation is detected; for example, exactly the middle timing N).

Figure 23:
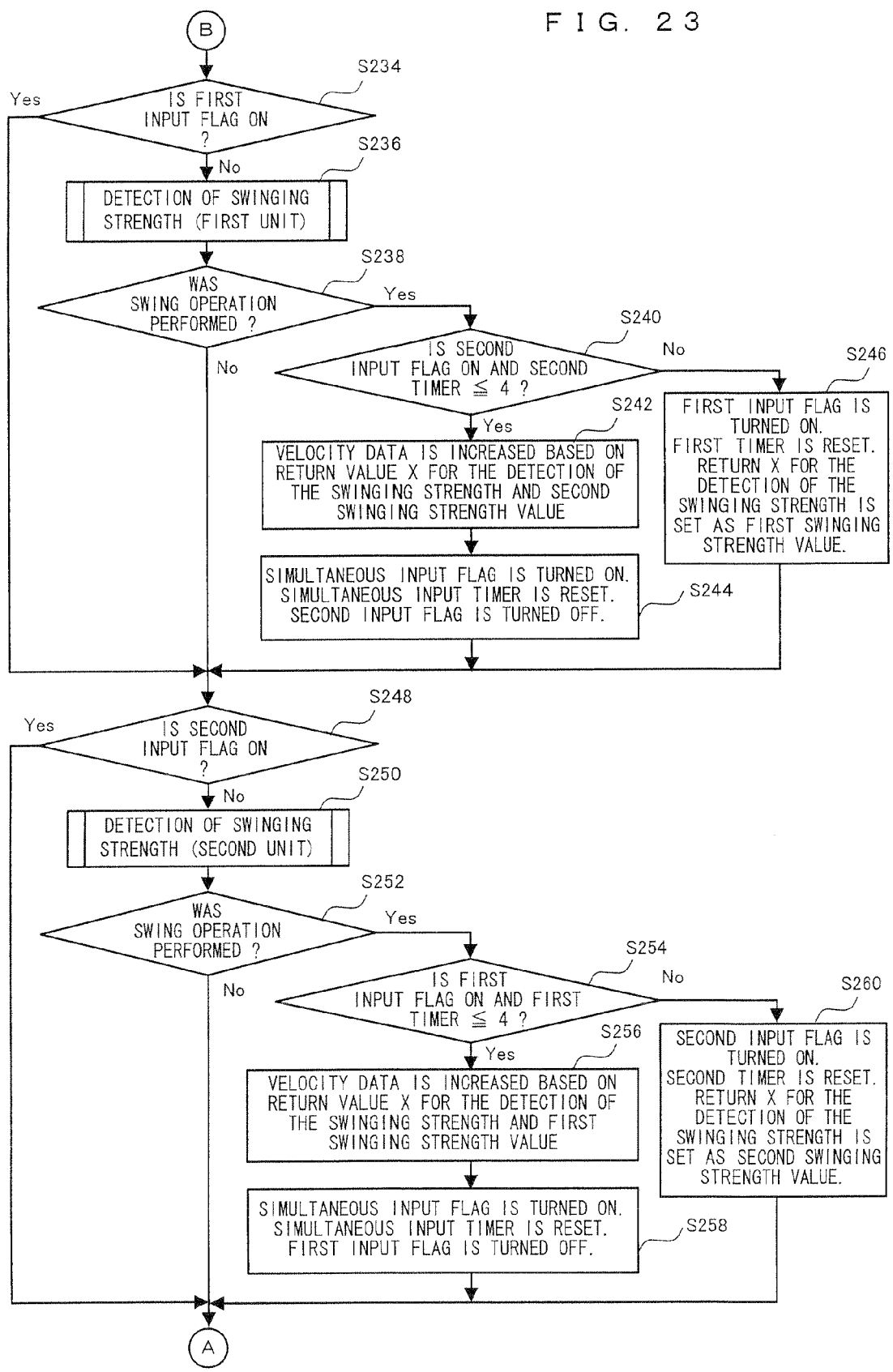
FIG. 23 is a part of the flowchart illustrating the flow of processing executed by the CPU in the second embodiment.

Referring to FIG. 23, in step S234, it is determined whether or not the first input flag 210 is on. When the first input flag 210 is on, the processing is advanced to step S248. When the first input flag 210 is not on, the processing is advanced to step S236.

In step S236, the swinging strength of the first unit is detected. Hereinafter, the detection of the swinging strength of the first unit will be described in detail with reference to FIG. 25.

Figure 25:
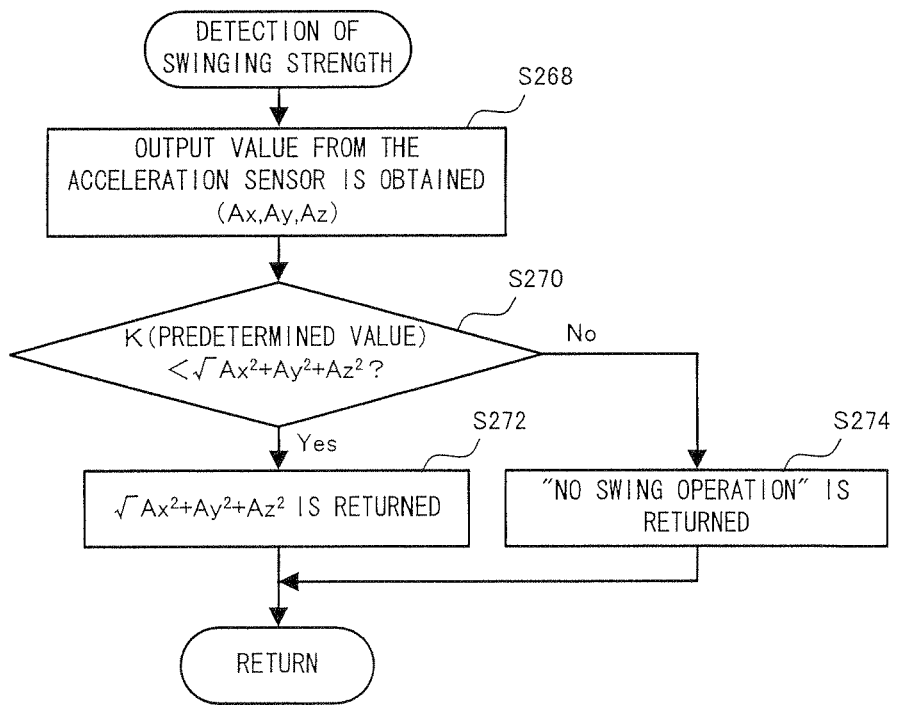
FIG. 25 is a flowchart illustrating the detection of swinging strength in the second embodiment in detail.

Referring to FIG. 25, in step S268, an output value (output vector) from an acceleration sensor (here, the first acceleration sensor) is obtained. In this embodiment, the output value in the X axis direction from the first acceleration sensor is Ax, the output value in the Y axis direction from the first acceleration sensor is Ay, and the output value in the Z axis direction from the first acceleration sensor is Az.

In step S270, it is determined whether or not the magnitude of the output vector (Ax, Ay, Az) from the first acceleration sensor obtained in step S268 (i.e., $\sqrt{(Ax^2+Ay^2+Az^2)}$) is larger than K (K is a predetermined value). When the magnitude of the output vector from the first acceleration sensor is larger than K (it is determined that a swing operation has been performed), the processing is advanced to step S272. When the magnitude of the output vector from the first acceleration sensor is not larger than K (it is determined that a swing operation has not been performed), the processing is advanced to step S274.

In step S272, the magnitude of the output vector from the first acceleration sensor is returned as a return value X for the detection of the swinging strength. Usually, as the first unit is swung more strongly, the magnitude of the output vector from the first acceleration sensor is larger. Therefore, the return value X reflects the swinging strength of the first unit. Then, the processing is advanced to step S238 in FIG. 23. In this embodiment, when the magnitude of the output vector exceeds K, the magnitude of the output vector at that time is immediately returned as the return value X. In a modification, the following processing may be executed. When the magnitude of the output vector exceeds K, a state flag indicating such a state is stored; and the output vector value when the magnitude of the output vector reaches the maximum value (the point at which the magnitude of the output vector starts decreasing after being maximized) may be returned.

In this embodiment, the determination on the swing operation is made based on the magnitude of the output vector being equal to or greater than a predetermined value. The determination may be performed more precisely. This will be described in more detail. When a swing operation is made, the output from the acceleration sensor usually changes as follows. (a) 0→(b) output is increased→(c) maximum→(d) output is decreased→(e) 0→(f) output is increased in the opposite direction→(g) maximum in the opposite direction→(h) output is decreased in the opposite direction→(i) 0.

The history of output values for a predetermined time period from the current point may be always stored, so that it can be detected whether or not the history shows such a change. More simply, it may be detected that the history matches a part of such a change. In this case, which part of the change from (a) through (i) is to be used may be determined arbitrarily (any point other than (a) through (i), for example, a point when the output reaches a predetermined value while being increased, may be used).

Instead of the swing operation, a predetermined motion (an operation for providing a motion of a predetermined pattern) may be detected. Such an operation is, for example, an operation for moving the character in a predetermined direction. In this case also, the history of output values is stored, so that it can be detected whether or not the history matches the predetermined pattern.

The above-described modification is also applicable to embodiments other than the second embodiment.

In step S274, a value representing "no swing operation" is returned as the detection result of the swing operation. Then, the processing is advanced to step S238 in FIG. 23.

In step S238, it is determined whether or not the first unit was swung based on the detection result of the swing operation in step S236. When the first unit was swung, the processing is advanced to step S240. When the first unit was not swung, the processing is advanced to step S248.

In step S240, it is determined whether or not the second input flag 212 is on and also whether or not the second timer 218 is equal or smaller than 4. When the second input flag 212 is on and also the second timer 218 is equal or smaller than 4 (i.e., when the first unit and the second unit were swung substantially simultaneously), the processing is advanced to step S242. When the second input flag 212 is not on, or the second timer 218 is larger than 4, the processing is advanced to step S246. When the first unit is swung before a 4 frame time period passes after the second unit is swung, it is determined that "the first unit and the second unit were swung simultaneously" for the following reason. Even if the player intended to swing the first unit and the second unit simultaneously, such swing operations may not necessarily be performed exactly simultaneously. Even when the timing at which the first unit is detected to have been swung is offset by several frames with respect to the timing at which the second unit is detected to have been swung, it is determined that "the first unit and the second unit were swung simultaneously". Thus, a better operability is obtained.

In step S242, the velocity data of the character is increased in accordance with the return value X for the detection of the swinging strength of the first unit in step S236 (value reflecting the swinging strength of the first unit) and the second swinging strength value 208 which is set in step S260 described later (value reflecting the swinging strength of the second unit). For example, the current velocity data may be multiplied by a numerical value in proportion to the return value X and by a numerical value in proportion to the second swinging strength value 208 so as to determine new velocity data. Alternatively, a numerical value obtained by multiplying the return X by a first coefficient, and a numerical value obtained by multiplying the second swinging strength 208 by a second coefficient, may be added to the current velocity data (the first coefficient may be the same as, or different from, the second coefficient). Still alternatively, an average of the return value X and the second swinging strength value 208 is multiplied by a predetermined coefficient, and the resultant value may be added to the current velocity data.

As the return value for the detection of the swinging strength, the magnitude of only the component in a predetermined direction may be used among the output values from the acceleration sensor.

In step S244, the simultaneous input flag 214 is turned on. The simultaneous input timer 220 is reset to 0 to resume. The second input flag 212 is turned off.

In step S246, the first input flag 210 is turned on. The first input timer 216 is reset to 0 to resume. The return value X for the detection of the swinging strength of the first unit is set as the first swinging strength value 206.

In step S248, it is determined whether or not the second input flag 212 is on. When the second input flag 212 is on, the processing is advanced to step S250. When the second input flag 212 is not on, the processing is advanced to step S262 in FIG. 24.

In step S250, the swinging strength of the second unit is detected in substantially the same manner as in step S236. Namely, when the magnitude of the output vector from the second acceleration sensor is larger than K, the magnitude of the output vector from the second acceleration sensor (value reflecting the swinging strength of the second unit) is returned as a return value X for the detection of the swinging strength.

In step S252, it is determined whether or not the second unit was swung based on the detection result of the swing operation in step S250. When the second unit was swung, the processing is advanced to step S254. When the second unit was not swung, the processing is advanced to step S262 in FIG. 24.

In step S254, it is determined whether or not the first input flag 210 is on and also whether or not the first timer 216 is equal or smaller than 4. When the first input flag 210 is on and also the first timer 216 is equal or smaller than 4 (i.e., when the first unit and the second unit were swung substantially simultaneously), the processing is advanced to step S256. When the first input flag 210 is not on, or the first timer 216 is larger than 4, the processing is advanced to step S260.

In step S256, the velocity data is increased in accordance with the return value X for the detection of the swinging strength of the second unit in step S250 (value reflecting the swinging strength of the second unit) and the first swinging strength value 206 which was set in step S246 above (value reflecting the swinging strength of the first unit). For example, the current velocity data may be multiplied by a numerical value in proportion to the return value X and by a numerical value in proportion to the first swinging strength value 208 so as to determine new velocity data.

In step S258, the simultaneous input flag 214 is turned on. The simultaneous input timer 220 is reset to 0 to resume. The first input flag 210 is turned off.

In step S260, the second input flag 212 is turned on. The second input timer 218 is reset to 0 to resume. The return value X for the detection of the swinging strength of the second unit is set as the second swinging strength value 208.

In step S262 in FIG. 24, the current position data is updated based on the velocity data and the directional vector. As a result, the character in the game world moves by the distance represented by the velocity data in the direction represented by the directional vector.

In step S264, the game image displayed on the monitor 2 is updated based on the current position data.

In step S266, the velocity data is decreased by a predetermined amount. This is performed in order to reflect the influence of the friction of the sleigh and the ground on the velocity of the character.

The above-described processing is repeated, so that the game image is changed when necessary in accordance with the operation performed by the player.

As described above, according to this embodiment, the player can freely move both of his/her hands. Owing to a high degree of freedom of motion realized by such an arrangement, a dynamic play is made possible. In addition, the player can control the character by swinging the operation units. Therefore, the player can play intuitively and thus obtain a high operability. As the operation units are swung more strongly, the acceleration of the character is larger. Thus, a more intuitive operation is realized.

In this embodiment, three-axial acceleration sensors are used. Even when one-axial acceleration sensors are used, the swing operations on the operation units and the swinging strength values thereof can be detected (for example, by referring to only the output value in the Z axis direction in FIG. 16, it is detected that the operation units were swung, and the swinging strength values thereof are also detected). Thus, substantially the same effects as those of this embodiment are provided.

Third Embodiment

An image displayed in a third embodiment is, for example, substantially the same as the image shown in FIG. 19. In this embodiment, the player can control the motion of the character by swinging the first unit or the second unit.

Figure 26:
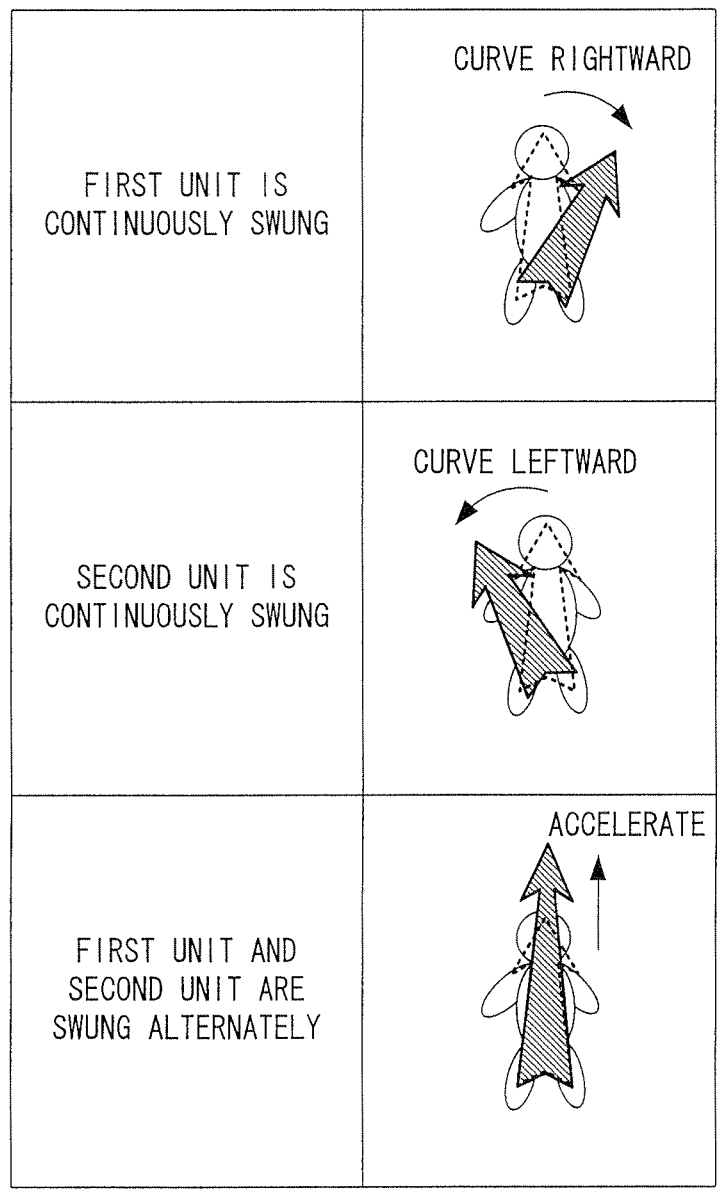
FIG. 26 shows an exemplary correspondence between the operation performed by the player and the motion of the character in a third second embodiment.

FIG. 26 shows an exemplary correspondence between the operation performed by the player and the motion of the character in the third embodiment. When the first unit is continuously swung, the character curves rightward; whereas when the second unit is continuously swung, the character curves leftward. When the first unit and the second unit are swung alternately, the character's motion is accelerated in the advancing direction at that time.

Figure 27:
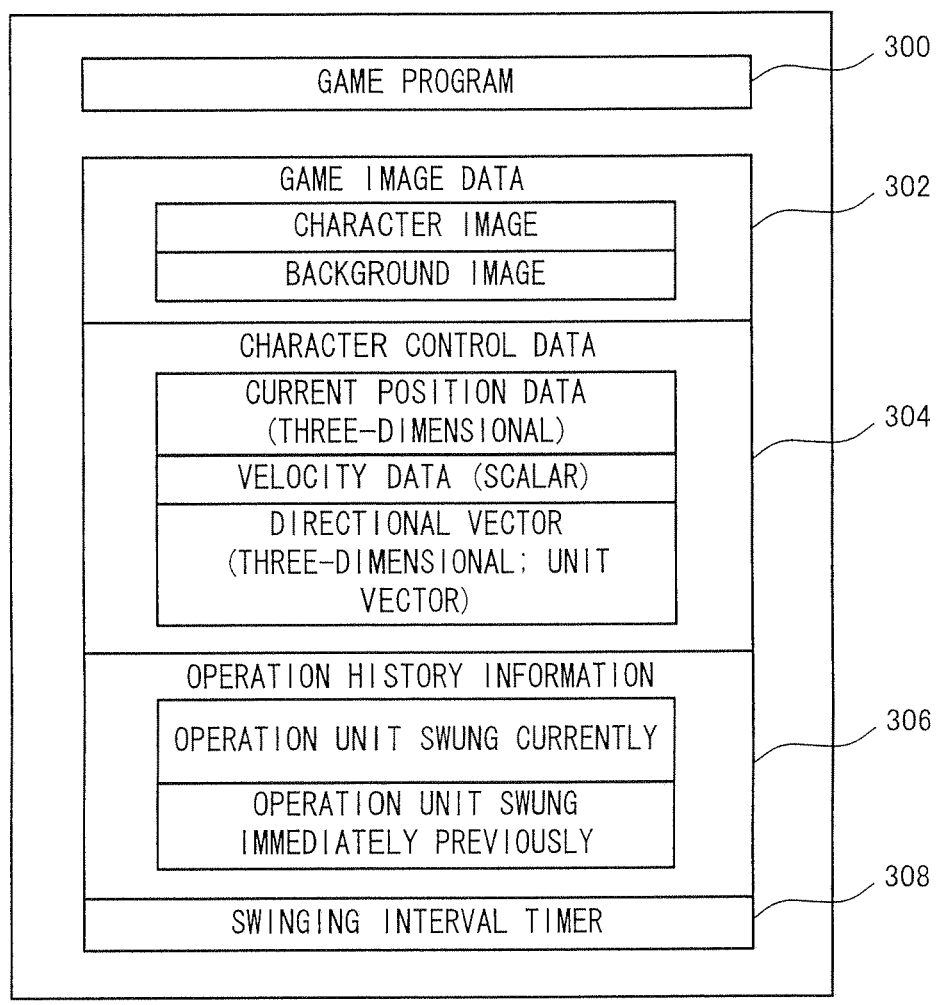
FIG. 27 is a memory map of the main memory in the third embodiment.

FIG. 27 shows an exemplary memory map of the main memory 33 in the third embodiment. The main memory 33 stores a game program 300, game image data 302, character control data 304, operation history information 306, and a swinging interval timer 308.

The game image data 302 and the character control data 304 are substantially the same as those in the first embodiment and will not be described here.

The operation history information 306 is information representing the type of the operation unit swung by the player (first unit or second unit) regarding the past two swings.

The swinging interval timer 308 is a value representing a time period from when the player swung the first unit or the second unit immediately previously (the number of frames).

With reference to the flowcharts in FIG. 28 through FIG. 30, a flow of processing executed by the CPU 30 based on the game program 300 will be described.

Figure 28:
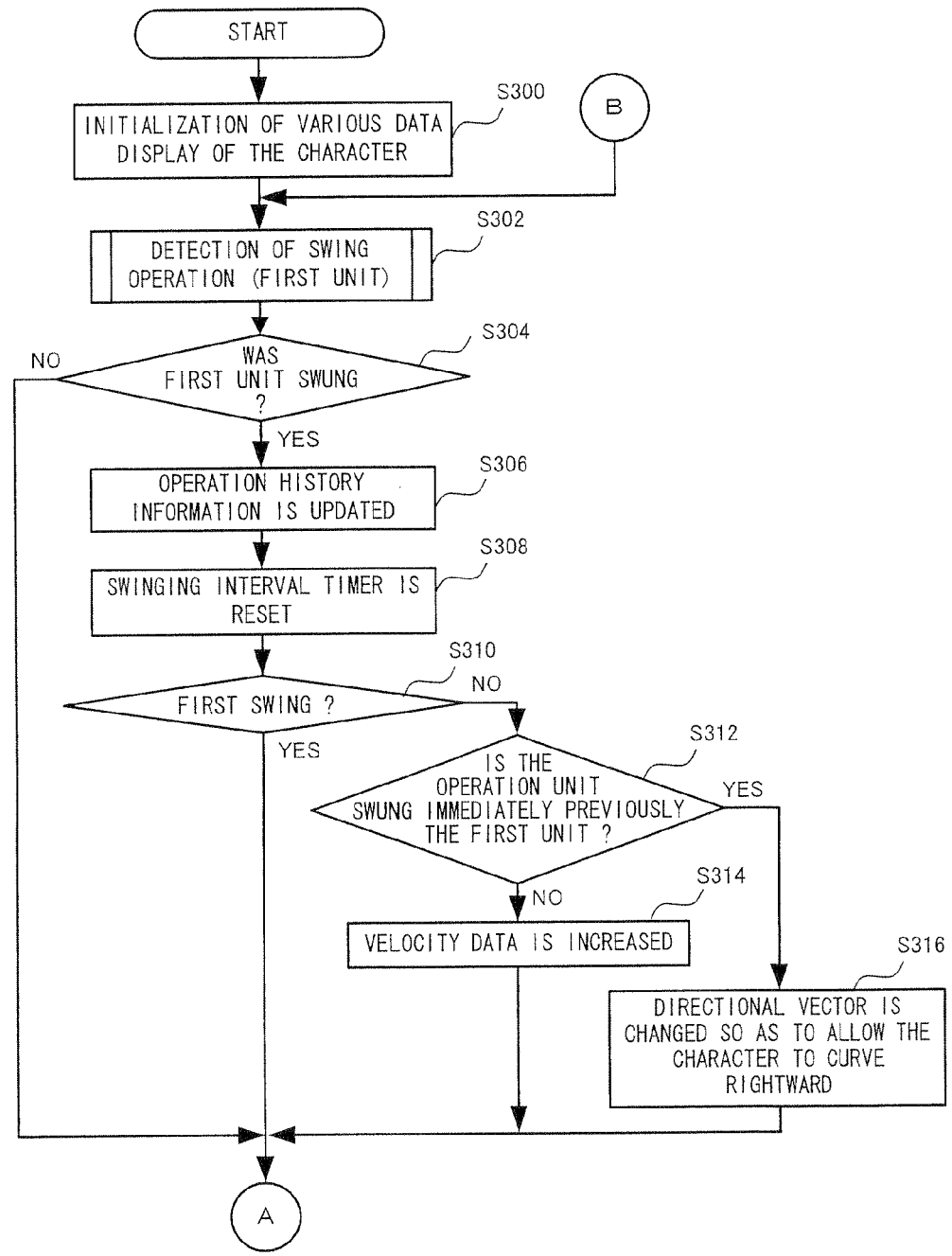
FIG. 28 is a part of a flowchart illustrating a flow of processing executed by the CPU in the third embodiment.

Referring to FIG. 28, when the execution of the game program 300 is started, in step S300, the CPU 30 first initializes various data used for the game processing (character control data 304, operation history information 306, swinging interval timer 308, etc.), and generates and displays a game image including the character on the screen of the monitor 2.

In step S302, the swinging strength of the first unit is detected. Hereinafter, the detection of the swinging strength of the first unit will be described in detail with reference to FIG. 30.

Figure 30:
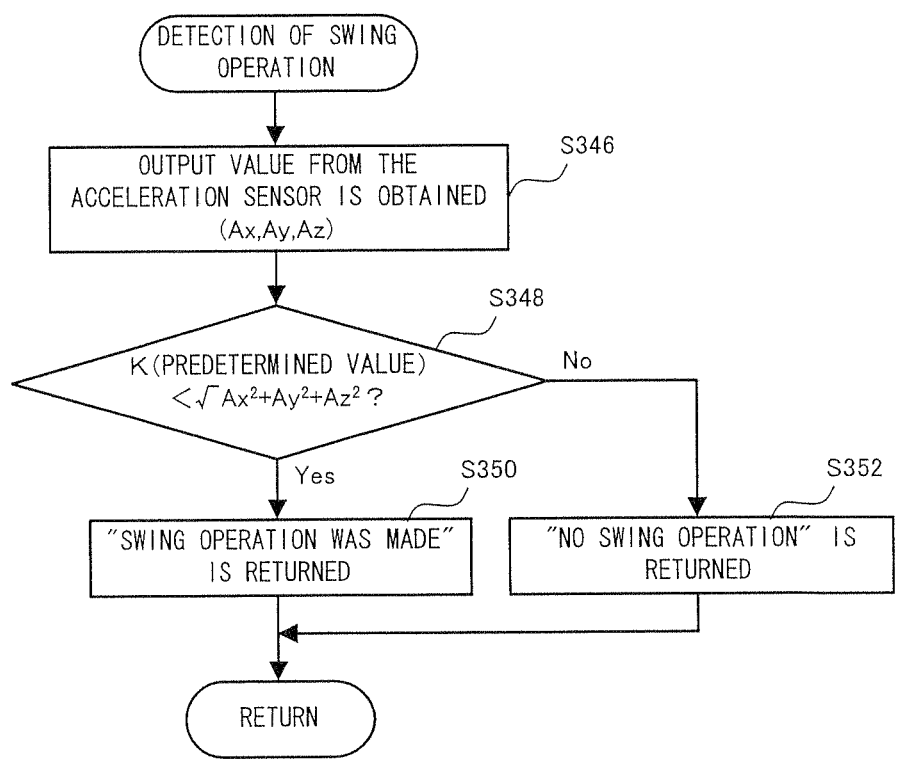
FIG. 30 is a flowchart illustrating the detection of swing operation in the third embodiment in detail.

Referring to FIG. 30, in step S346, an output value (output vector) from an acceleration sensor (here, the first acceleration sensor) is obtained. In this embodiment, the output value in the X axis direction from the first acceleration sensor is Ax, the output value in the Y axis direction from the first acceleration sensor is Ay, and the output value in the Z axis direction from the first acceleration sensor is Az.

In step S348, it is determined whether or not the magnitude of the output vector (Ax, Ay, Az) from the first acceleration sensor obtained in step S346 is larger than K (K is a predetermined value). When the magnitude of the output vector from the first acceleration sensor is larger than K, the processing is advanced to step S350. When the magnitude of the output vector from the first acceleration sensor is not larger than K, the processing is advanced to step S352.

In step S350, a value representing that "a swing operation was performed" is returned as the detection result of the swing operation. Then, the processing is advanced to step S304 in FIG. 28.

In step S352, a value representing "no swing operation" is returned as the detection result of the swing operation. Then, the processing is advanced to step S304 in FIG. 28.

In step S304, it is determined whether or not the first unit was swung based on the detection result of the swing operation in step S302. When the first unit was swung, the processing is advanced to step S306. When the first unit was not swung, the processing is advanced to step S318 in FIG. 29.

In step S306, the operation history information 306 is updated. Specifically, the pre-update value of the "operation unit swung currently" is set as the "operation unit swung immediately previously", and then the value representing the first unit is set as the "operation unit swung currently".

In step S308, the swinging interval timer 308 is reset to 0.

In step S310, it is determined whether or not the swing operation detected currently is "the first swing of the continuous swing operation". Specifically, the operation history information 306 is referred to. When neither the value representing the first unit nor the value representing the second unit is stored in the "operation unit swung immediately previously", it is determined that the swing operation detected currently is "the first swing of the continuous swing operation". In this embodiment, when the interval between the immediately previous swing operation and the current swing operation exceeds a 60 frame time period, it is determined that the swing operation detected currently is "the first swing of the continuous swing operation". When the swing operation detected currently is "the first swing of the continuous swing operation", the processing is advanced to step S318 in FIG. 29. Otherwise, the processing is advanced to step S312.

In step S312, it is determined whether or not the operation unit swung immediately previously is the first unit, by referring to the operation history information 306. When the operation unit swung immediately previously is the first unit (i.e., when the first unit is continuously swung), the processing is advanced to step S316. When the operation unit swung immediately previously is not the first unit (i.e., when the operation unit swung immediately previously is the second unit; namely, the first unit and the second unit are swung alternately), the processing is advanced to step S314.

In step S314, the velocity data is increased by a predetermined amount. In a modification, the following processing may be executed. When the swing operation of the first unit is detected in step S302, the swinging strength is also detected as in the second embodiment. The velocity data is increased more largely as the swinging strength is greater. Alternatively, the swinging strength when the operation unit was swung immediately previously is stored, and the velocity data is increased based both on the immediately previous swinging strength and the current swinging strength of the first unit. (For example, the increasing amount of the velocity data is determined based on the sum or average of the two swinging strength values. A weighted average may be used; for example, the coefficient is decreased as the swinging strength data is older.) Still alternatively, as long as the first unit and the second unit are continuously swung alternately, the increasing amount of the velocity data is determined based on the sum or average of the swinging strength values of such a plurality of swings.

In step S316, the directional vector is changed so as to cause the character to curve rightward. In this step also, the following processing may be executed. As the swinging strength is greater, the character may curve at a larger angle. Alternatively, the swinging strength when the operation unit was swung immediately previously is stored, and the velocity data is increased based both on the immediately previous swinging strength and the current swinging strength of the first unit. Still alternatively, as long as the first unit and the second unit are continuously swung alternately, the angle of curving is determined based on the sum or average of the swinging strength values of such a plurality of swings.

Figure 29:
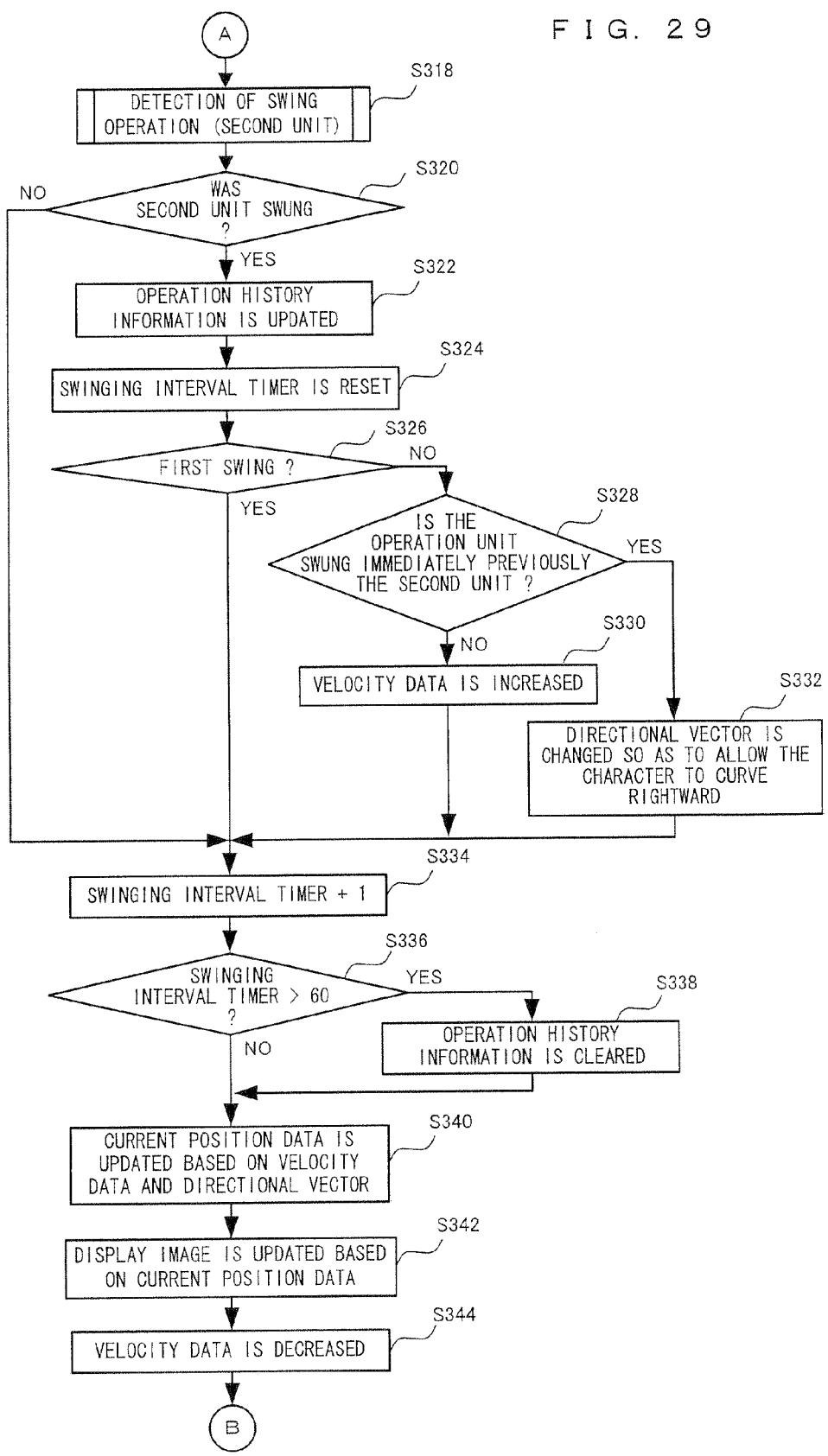
FIG. 29 is a part of the flowchart illustrating the flow of processing executed by the CPU in the third embodiment.

Referring to FIG. 29, in step S318, the swing operation of the second unit is detected as in step S302.

In step S320, it is determined whether or not the second unit was swung based on the detection result of the swing operation in step S318. When the second unit was swung, the processing is advanced to step S322. When the second unit was not swung, the processing is advanced to step S334.

In step S322, the operation history information 306 is updated. Specifically, the pre-update value of the "operation unit swung currently" is set as the "operation unit swung immediately previously", and then the value representing the second unit is set as the "operation unit swung currently".

In step S324, the swinging interval timer 308 is reset to 0.

In step S326, it is determined whether or not the swing operation detected currently is "the first swing of the continuous swing operation". When the swing operation detected currently is "the first swing of the continuous swing operation", the processing is advanced to step S334. Otherwise, the processing is advanced to step S328.

In step S328, it is determined whether or not the operation unit swung immediately previously is the second unit, by referring to the operation history information 306. When the operation unit swung immediately previously is the second unit (i.e., when the second unit is continuously swung), the processing is advanced to step S332. When the operation unit swung immediately previously is not the second unit (i.e., when the operation unit swung immediately previously is the first unit; namely, the first unit and the second unit are swung alternately), the processing is advanced to step S330.

In step S330, the velocity data is increased by a predetermined amount. In a modification, when the swing operation of the second unit is detected in step S318, the swinging strength may also be detected as in the second embodiment, so that the velocity data can be increased more largely as the swinging strength is greater.

In step S332, the directional vector is changed so as to cause the character to curve leftward. In this step also, as the swinging strength is greater, the character may curve at a larger angle.

In step S334, "1" is added to the swinging interval timer 308.

In step S336, it is determined whether or not the swinging interval timer 308 exceeds 60. When the swinging interval timer 308 exceeds 60, the processing is advanced to step S338. When the swinging interval timer 308 does not exceed 60, the processing is advanced to step S340.

In step S338, the operation history information 306 is cleared.

In step S340, the current position data is updated based on the velocity data and the directional vector. As a result, the character in the game world moves by the distance represented by the velocity data in the direction represented by the directional vector.

In step S342, the game image displayed on the monitor 2 is updated based on the current position data.

In step S344, the velocity data is decreased by a predetermined amount. Then, the processing is returned to step S302 in FIG. 28.

As described above, according to this embodiment, the player can freely move both of his/her hands. Owing to a high degree of freedom of motion realized by such an arrangement, a dynamic play is made possible. In addition, the player can control the character by swinging the operation units. Therefore, the player can play intuitively and thus obtain a high operability.

In this embodiment, three-axial acceleration sensors are used. As in the second embodiment, even when one-axial acceleration sensors are used, substantially the same effects as those of this embodiment can be provided.

In this embodiment, it is detected whether the first unit is continuously swung, the second unit is continuously swung, or the first unit and the second unit are alternately swung. Then, the game control is performed in accordance with the detection result. In a modification, it may be detected whether or not the continuous swinging is of a predetermined pattern. For example, predetermined game processing (for example, processing of allowing the character to make an attack) may be executed when a pattern of "the swing of the first unit→the swing of the second unit→the swing of the second unit→the swing of the first unit" is detected. (The pattern is not limited to this, and any other appropriate pattern may be set.)

In this embodiment, when the interval between two continuous swing operations is within a predetermined time period (for example, within a 60 frame time period), it is determined that the first unit and the second unit are alternately swung. The present technology is not limited to this. When a swing is made within a predetermined time period after the first swing, it may be determined that the same operation unit is continuously swung or two operation units are alternately swung. Alternatively, as the same operation unit is continuously swung for a longer time period, the interval for determining whether the swings are made continuously or alternately may be extended (or shortened).

Fourth Embodiment

An image displayed in a fourth embodiment is, for example, substantially the same as the image shown in FIG. 19. In this embodiment, one of the first unit and the second unit is used as an inclination unit, and the other is used as a swing unit. The player can control the motion of the character by inclining the inclination unit or by swinging the swing unit.

Figure 31:
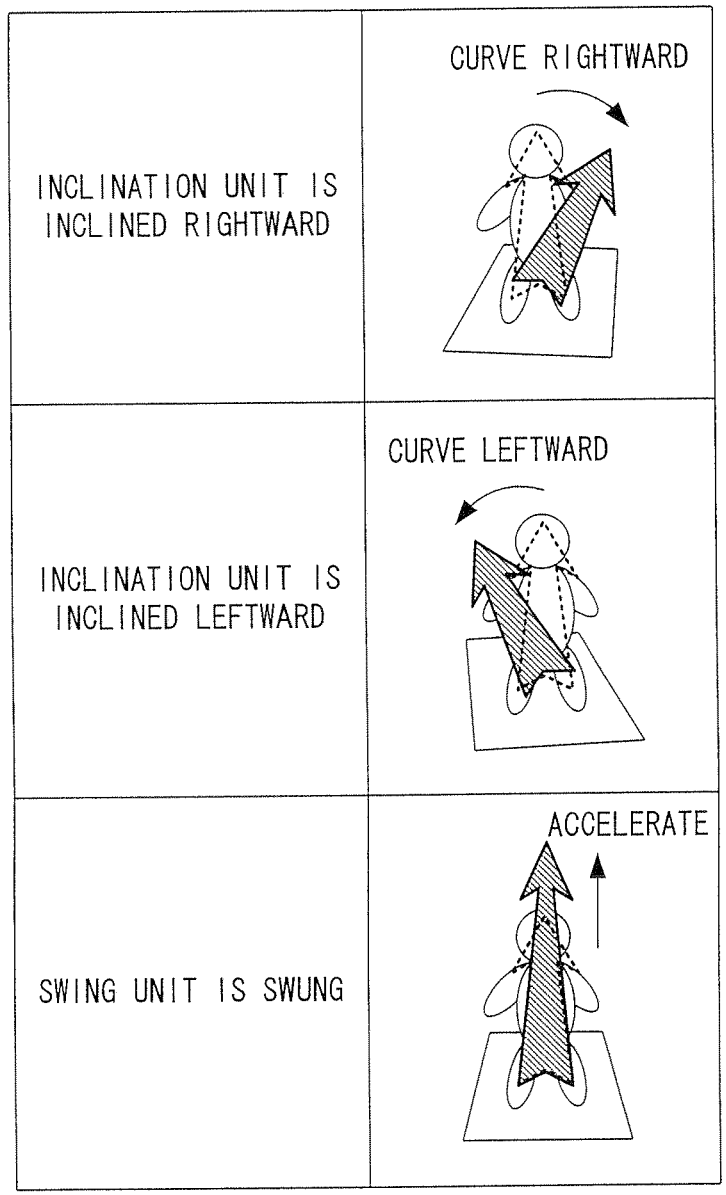
FIG. 31 shows an exemplary correspondence between the operation performed by the player and the motion of the character in a fourth embodiment.

FIG. 31 shows an exemplary correspondence between the operation performed by the player and the motion of the character in the fourth embodiment. When the inclination unit is inclined rightward, the character curves rightward; whereas when the inclination unit is inclined leftward, the character curves leftward. When the swing unit is swung, the character's motion is accelerated in the advancing direction at that time.

Figure 32:
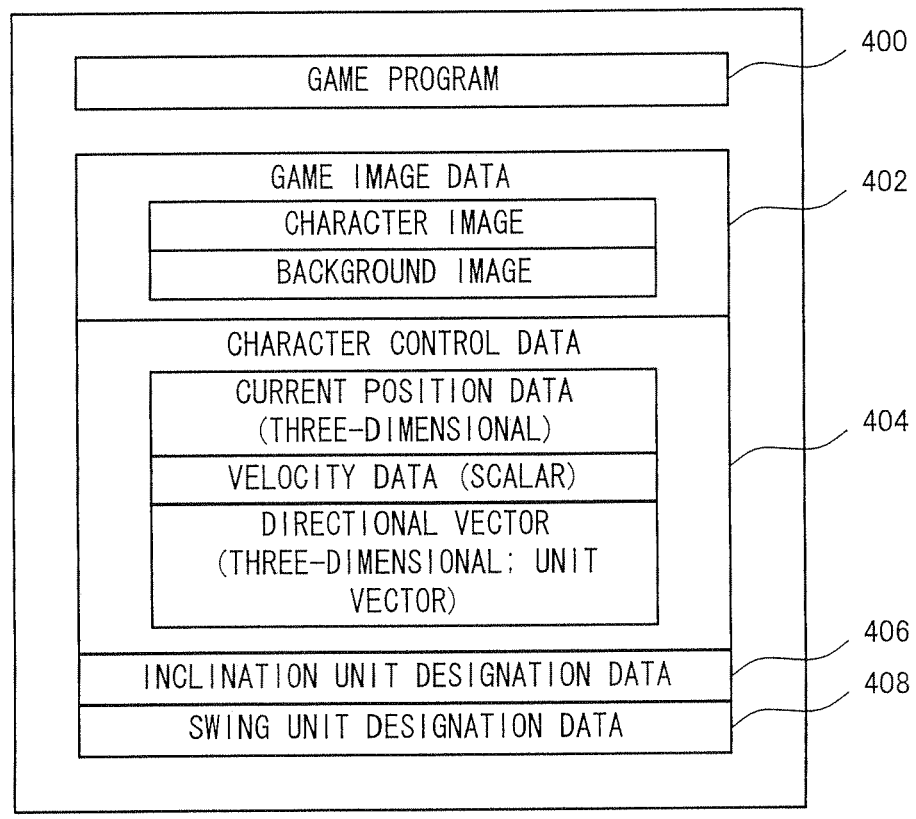
FIG. 32 is a memory map of the main memory in the fourth embodiment.

FIG. 32 shows an exemplary memory map of the main memory 33 in the fourth embodiment. The main memory 33 stores a game program 400, game image data 402, character control data 404, inclination unit designation data 406, and swing unit designation data 408.

The game image data 402 and the character control data 404 are substantially the same as those in the first embodiment and will not be described here.

The inclination unit designation data 406 is data representing which of the first unit and the second unit is to be used as the inclination unit. The swing unit designation data 408 is data representing which of the first unit and the second unit is to be used as the swing unit.

With reference to the flowcharts in FIG. 33 through FIG. 35, a flow of processing executed by the CPU 30 based on the game program 400 will be described.

Figure 33:
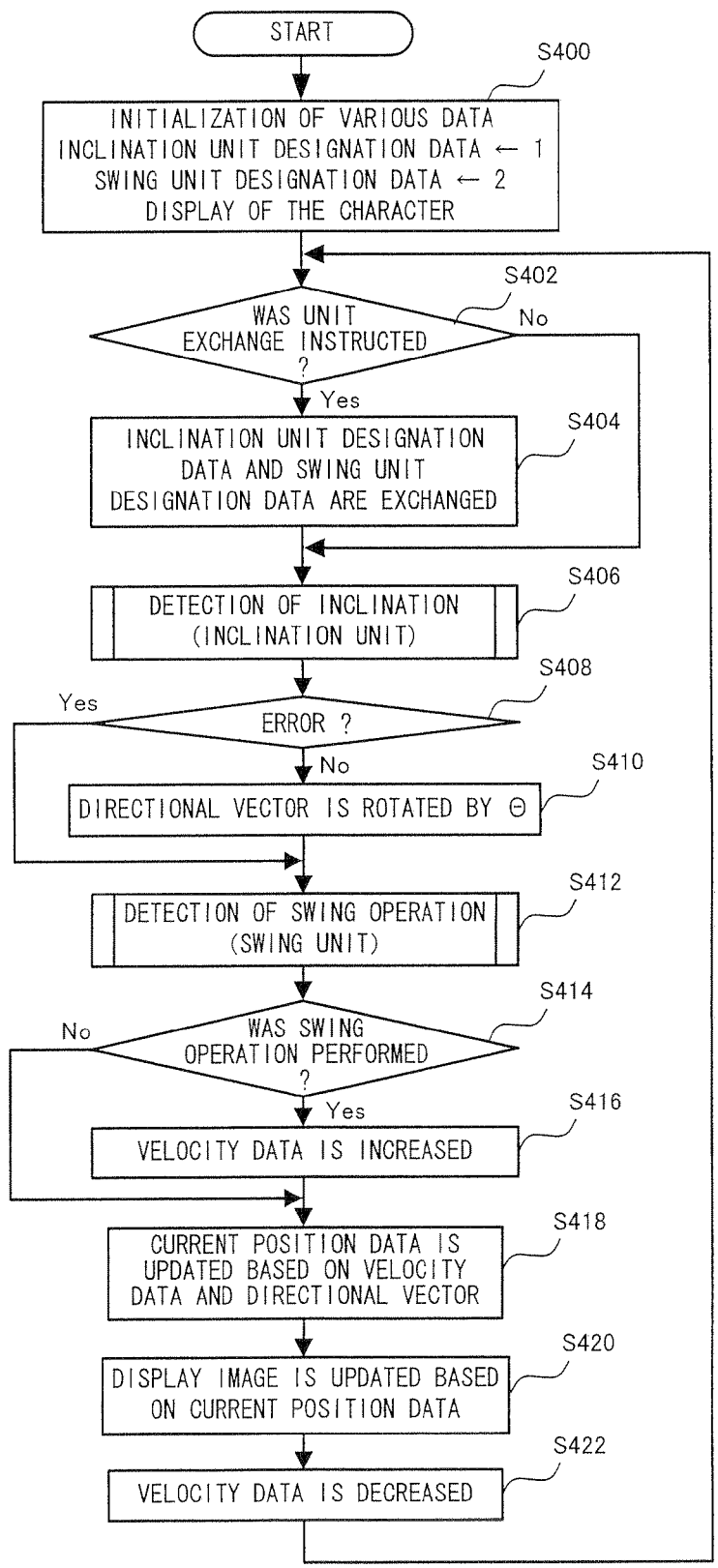
FIG. 33 is a part of a flowchart illustrating a flow of processing executed by the CPU in the fourth embodiment.

Referring to FIG. 33, when the execution of the game program 400 is started, in step S400, the CPU 30 first initializes various data used for the game processing (character control data 404, etc.), and stores "1" representing the first unit in the inclination unit designation data 406 as an initial value and stores "2" representing the second unit in the swing unit designation data 408 as an initial value. The CPU 30 also generates and displays a game image including the character on the screen of the monitor 2.

In step S402, it is determined whether or not the player has input a unit role exchange instruction using an operation button or the like. When a unit role exchange has been instructed, the processing is advanced to step S404. When no unit role exchange has been instructed, the processing is advanced to step S406.

In step S404, the value of the inclination unit designation data 406 and the value of the swing unit designation data 408 are exchanged.

Owing to the above-described processing, the player can optionally change the role of the first unit and the role of the second unit in accordance with his/her preference or the situation in the game. Such an exchange of the role of the first unit and the second is also applicable to the other embodiments in substantially the same manner.

In step S406, an inclination of the inclination unit is detected. Hereinafter, the detection of the inclination of the inclination unit will be described in detail with reference to FIG. 34.

Figure 34:
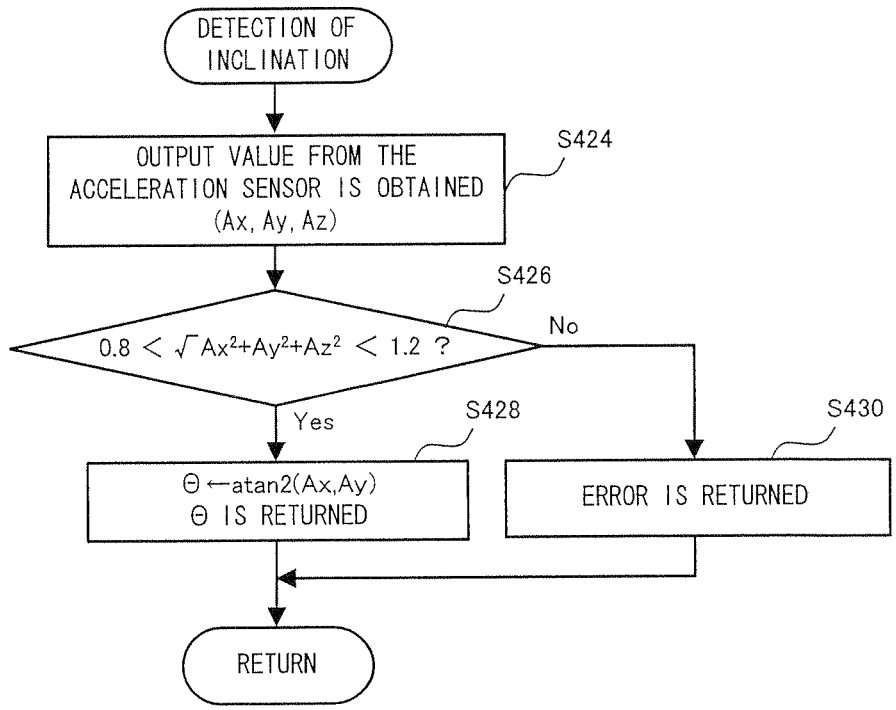
FIG. 34 is a flowchart illustrating the detection of inclination in the fourth embodiment in detail.

Referring to FIG. 34, in step S424, an output value (output vector) from an acceleration sensor provided in the inclination unit is obtained. In this embodiment, the output value in the X axis direction from the acceleration sensor is Ax, the output value in the Y axis direction from the acceleration sensor is Ay, and the output value in the Z axis direction from the acceleration sensor is Az.

In step S426, it is determined whether or not the magnitude of the output vector (Ax, Ay, Az) from the acceleration sensor obtained in step S424 is within the range of 0.8 to 1.2. When the magnitude of the output vector from the acceleration sensor is within the range of 0.8 to 1.2, the processing is advanced to step S428. When the magnitude of the output vector from the acceleration sensor is not within the range of 0.8 to 1.2, the processing is advanced to step S430.

Figure 36:
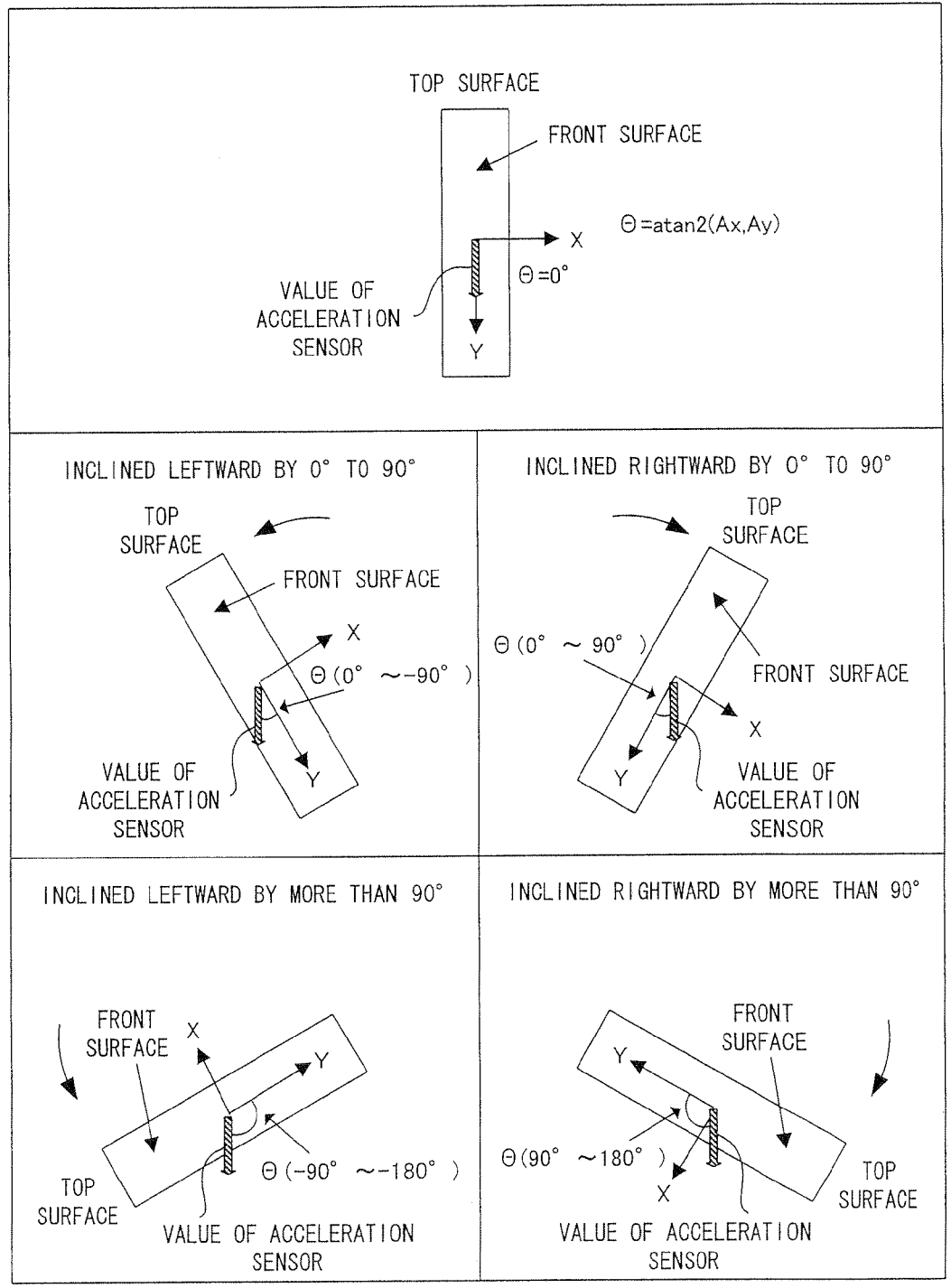
FIG. 36 shows an exemplary correspondence between the inclination of the operation unit and the detection result of the inclination in the fourth embodiment.

In step S428, arctan (Az/Ay), which represents the inclination of the inclination unit around the Z axis (represented by angle θ in FIG. 36), is calculated, and the calculated value is returned as a return value for the detection of the inclination. Then, the processing is advanced to step S408 in FIG. 33.

In step S430, an error is returned as the detection result of the inclination. Thus, the detection of the inclination is terminated, and the processing is advanced to step S408.

In step S408, it is determined whether or not the detection result of the inclination in step S430 is an error. When the result is an error, the processing is advanced to step S412. When the result is not an error, the processing is advanced to step S410.

Figure 37:
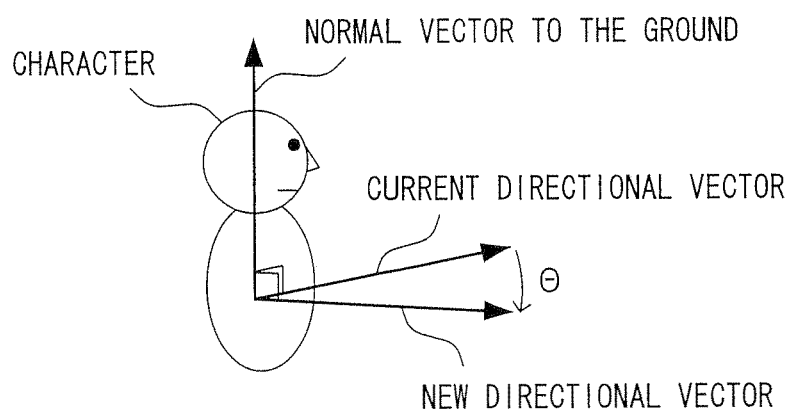
FIG. 37 shows an exemplary method for changing a directional vector in the fourth embodiment.

In step S410, the directional vector is changed in accordance with the return value θ of the detection result of the inclination in step S406. The directional vector can be changed by various methods. In this embodiment, for example, the method shown in FIG. 37 is used. The current directional vector is rotated by the return value θ around the rotation axis, which is the normal vector to the ground at the current position of the character. The resultant vector is determined as a new directional vector.

In step S412, a swing operation of the swing unit is detected. Hereinafter, the detection of the swing operation will be described in detail with reference to FIG. 35.

Figure 35:
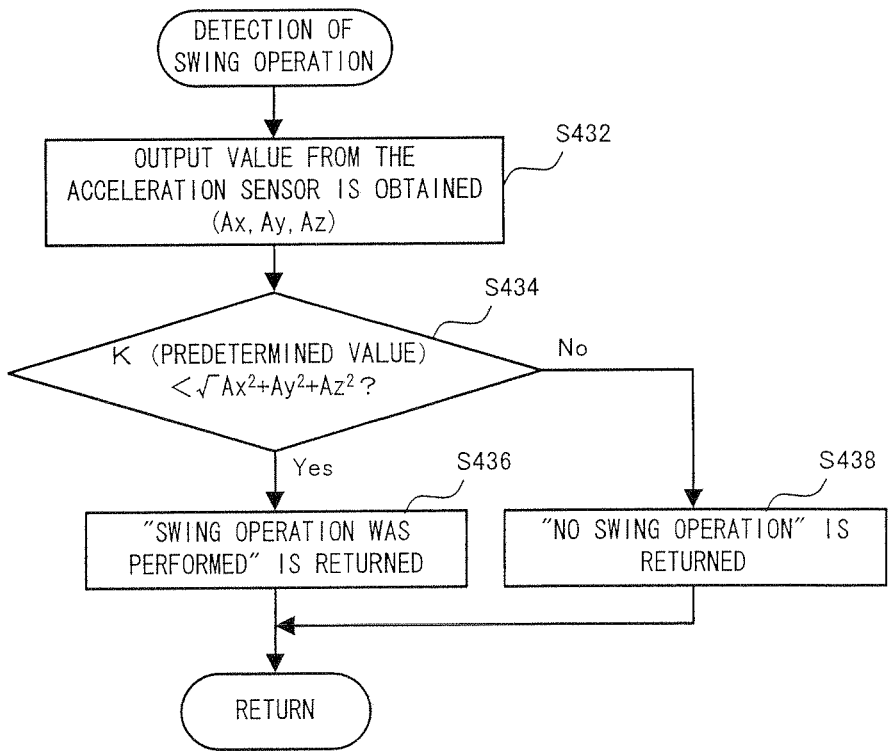
FIG. 35 is a flowchart illustrating the detection of swing operation in the fourth embodiment in detail.

Referring to FIG. 35, in step S432, an output value (output vector) from an acceleration sensor provided in the swing unit is obtained. In this embodiment, the output value in the X axis direction from the acceleration sensor is Ax, the output value in the Y axis direction from the acceleration sensor is Ay, and the output value in the Z axis direction from the acceleration sensor is Az.

In step S434, it is determined whether or not the magnitude of the output vector (Ax, Ay, Az) from the acceleration sensor obtained in step S432 is larger than K (K is a predetermined value). When the magnitude of the output vector from the acceleration sensor is larger than K, the processing is advanced to step S436. When the magnitude of the output vector from the acceleration sensor is not larger than K, the processing is advanced to step S438.

In step S436, a value representing that "a swing operation was performed" is returned as the detection result of the swing operation. Then, the processing is advanced to step S414 in FIG. 33.

In step S438, a value representing "no swing operation" is returned as the detection result of the swing operation. Then, the processing is advanced to S414 in FIG. 33.

In step S414, it is determined whether or not the swing unit was swung based on the detection result of the swing operation in step S412. When the swing unit was swung, the processing is advanced to step S416. When the swing unit was not swung, the processing is advanced to step S418.

In step S416, the velocity data is increased by a predetermined amount. In a modification, the following processing may be executed. When the swing operation of the swing unit is detected in step S412, the swinging strength is also detected as in the second embodiment. The velocity data is increased more largely as the swinging strength is greater.

In step S418, the current position data is updated based on the velocity data and the directional vector. As a result, the character in the game world moves by the distance represented by the velocity data in the direction represented by the directional vector.

In step S420, the game image displayed on the monitor 2 is updated based on the current position data.

In step S422, the velocity data is decreased by a predetermined amount. Then, the processing is returned to step S402.

As described above, according to this embodiment, the player can freely move both of his/her hands. Owing to a high degree of freedom of motion realized by such an arrangement, a dynamic play is made possible. In addition, the character can curve by inclining the inclination unit and accelerated by swinging the swing unit. Therefore, the player can play intuitively and thus obtain a high operability.

In this embodiment, three-axial acceleration sensors are used. As in the first and second embodiments, even when one-axial acceleration sensors are used, substantially the same effects as those of this embodiment can be provided.

As described later, when the swing unit is swung, the swinging direction may be detected, so that the direction or the magnitude of acceleration of the character can be changed in accordance with the detected direction.

Fifth Embodiment

An image displayed in a fifth embodiment is, for example, substantially the same as the image shown in FIG. 19. In this embodiment, the motion of the character is controlled based on the direction in which the first unit and the second unit are swung (moved).

FIG. 38 shows an exemplary correspondence between the operation performed by the player and the motion of the character in the fifth embodiment. When either the first unit or the second unit is swung obliquely rightward and farther from the player (right-forward; "forward" is the direction in which the player is directed), the character is accelerated slightly right-forward; whereas when either the first unit or the second unit is swung obliquely leftward and closer to the player (left-rearward; "rearward" is the direction opposite to the direction in which the player is directed), the character is accelerated slightly left-rearward. In this embodiment, the character is basically accelerated in a direction (direction based on the forward direction with respect to the character in the virtual space) corresponding to the direction in which the operation unit is swung (direction based on the forward direction with respect to the player in the real world).

When the first unit and the second unit are simultaneously swung obliquely rightward and farther from the player, the character is accelerated largely right-forward. In this embodiment, when the first unit and the second unit are simultaneously swung in the same direction, the character is accelerated largely.

When one of the first unit and the second unit is swung rightward and the other unit is swung farther from the player, the character is accelerated slightly right-forward. In this embodiment, when the first unit and the second unit are simultaneously swung in different directions, the acceleration direction of the character is determined based on a direction obtained by synthesizing the swinging direction of the first unit and the swinging direction of the second unit.

When the first unit and the second unit are swung simultaneously in opposite directions, the character stops.

Figure 39:
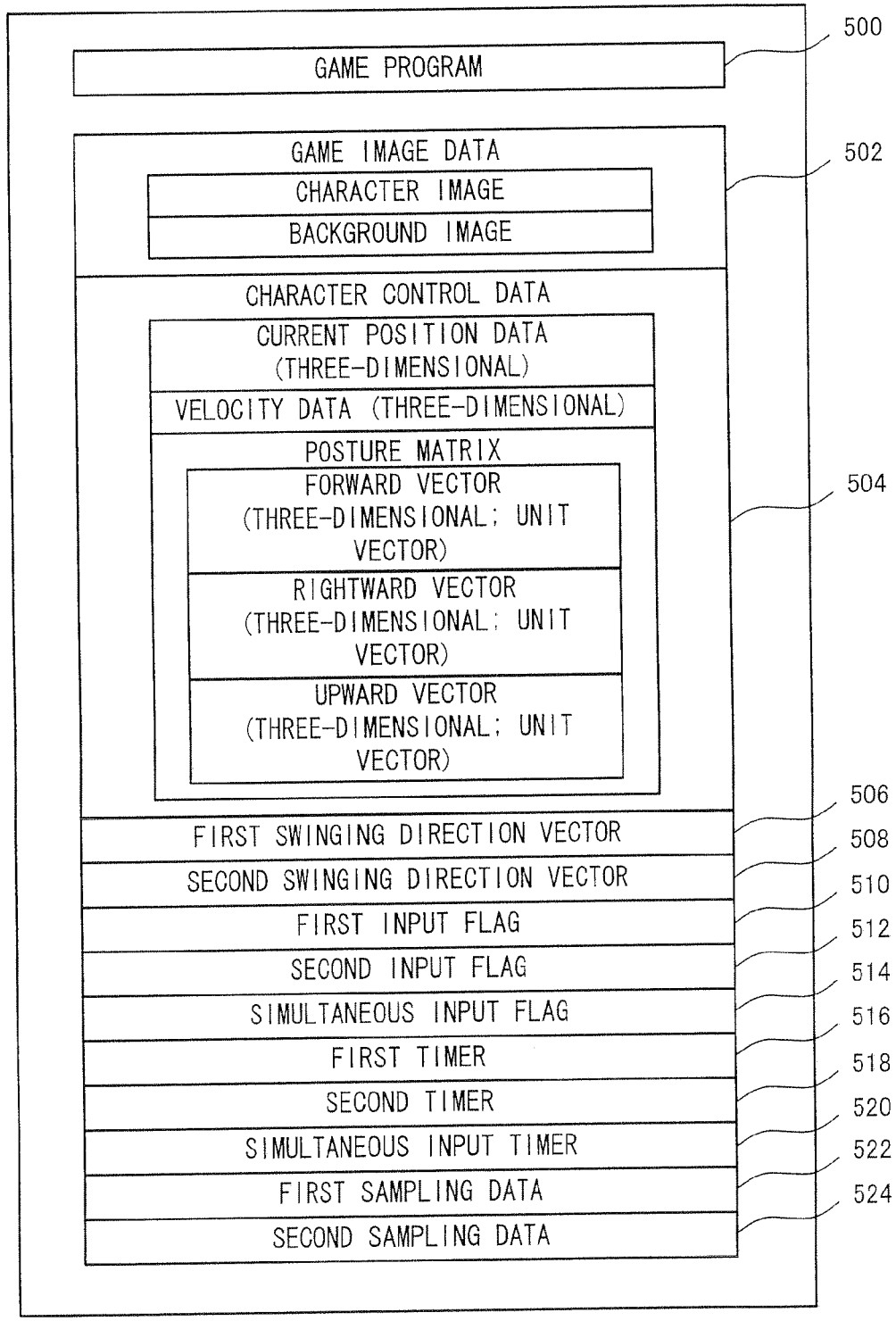
FIG. 39 is a memory map of the main memory in the fifth embodiment.

FIG. 39 shows an exemplary memory map of the main memory 33 in the fifth embodiment. The main memory 33 stores a game program 500, game image data 502, character control data 504, a first swinging directional vector 506, a second swinging directional vector 508, a first input flag 510, a second input flag 512, a simultaneous input flag 514, a first timer 516, a second timer 518, a simultaneous input timer 520, first sampling data 522, and second sampling data 524.

The game image data 502 is substantially the same as that described in the first embodiment and will not be described here.

The character control data 504 includes current position data, velocity vector representing the magnitude and the direction of the moving speed of the character, and a posture matrix representing the posture of the character. The current position data is represented by a three-dimensional coordinate value, and the velocity vector is represented by a three-dimensional vector. The posture matrix is a set of a forward vector which is a three-dimensional unit vector representing the forward direction with respect to the character, a rightward vector which is a three-dimensional unit vector representing the rightward direction with respect to the character, and an upward vector which is a three-dimensional unit vector representing the upward direction with respect to the character.

The first swinging directional vector 506 represents a direction in which the first unit is swung by the player. The second swinging directional vector 508 represents a direction in which the second unit is swung by the player.

The first input flag 510, the second input flag 512, the simultaneous input flag 514, the first timer 516, the second timer 518, and the simultaneous input timer 520 are substantially the same as those in the second embodiment and will not be described here.

The first sampling data 522 is sampling data on outputs from the first acceleration sensor provided in the first unit for the immediately previous 60 frames. The second sampling data 524 is sampling data on outputs from the second acceleration sensor provided in the second unit for the immediately previous 60 frames.

With reference to the flowcharts in FIG. 40 through FIG. 44, a flow of processing executed by the CPU 30 based on the game program 500 will be described.

Figure 40:
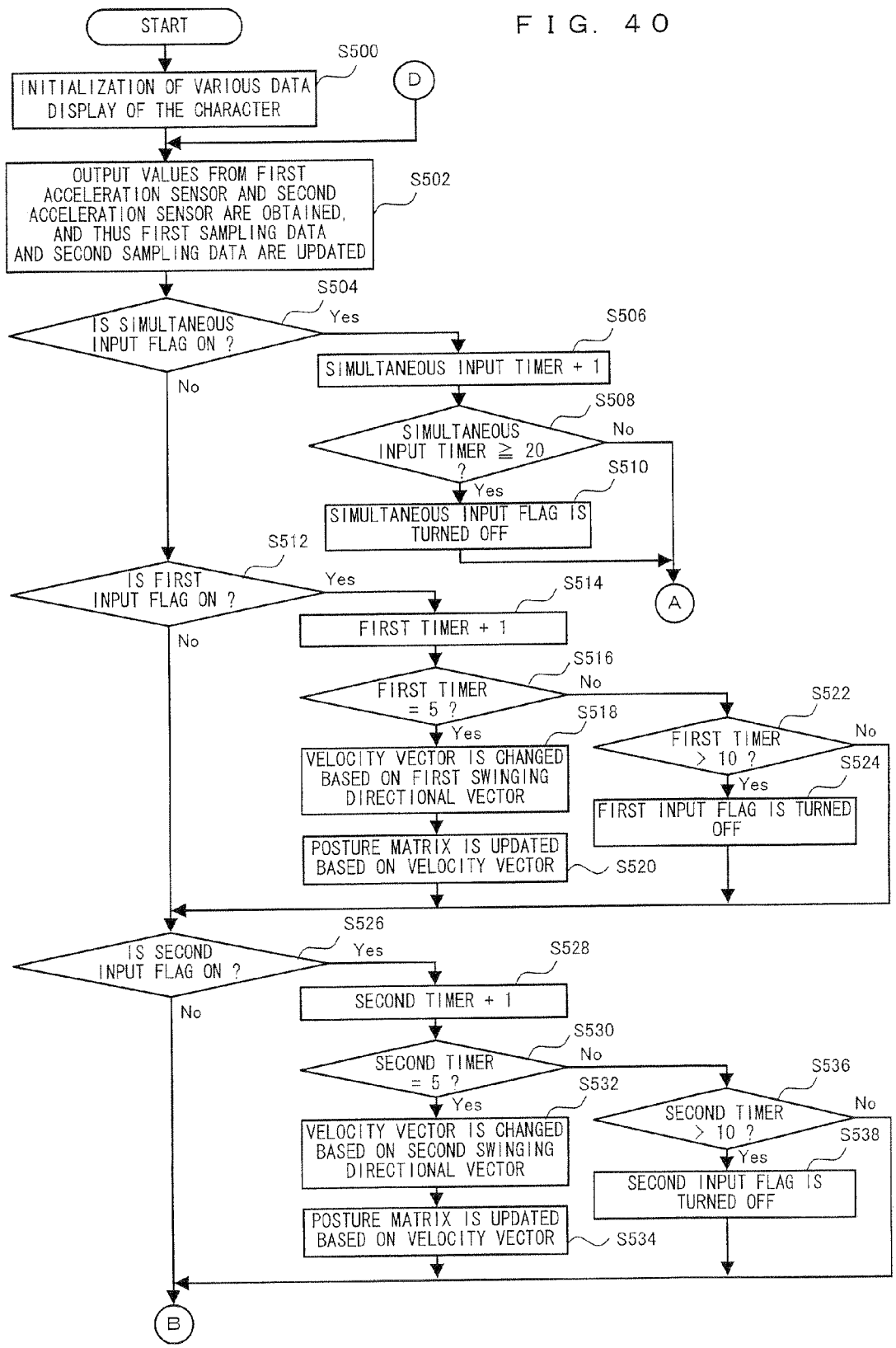
FIG. 40 is a part of a flowchart illustrating a flow of processing executed by the CPU in the fifth embodiment.

Referring to FIG. 40, when the execution of the game program 500 is started, in step S500, the CPU 30 first initializes various data used for the game processing (character control data 504, first swinging directional vector 506, first input flag 510, first timer 516, first sampling data 522, etc.), and generates and displays a game image including the character on the screen of the monitor 2.

In step S502, an output value from the first acceleration sensor and an output value from the second acceleration sensor are obtained, and thus the first sampling data 522 and the second sampling data 524 are updated.

In step S504, it is determined whether or not the simultaneous input flag 514 is on. When the simultaneous input flag 514 is on, the processing is advanced to step S506. When the simultaneous input flag 514 is not on, the processing is advanced to step S512.

In step S506, "1" is added to the simultaneous input timer 520.

In step S508, it is determined whether or not the simultaneous input timer 520 is equal to or greater than 20. When the simultaneous input timer 520 is equal to or greater than 20, the processing is advanced to step S510. Otherwise, the processing is advanced to step S596 in FIG. 43.

Figure 43:
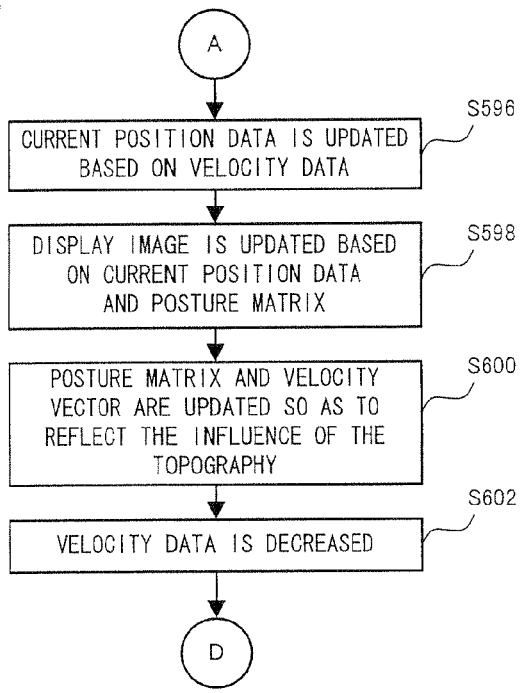
FIG. 43 is a part of the flowchart illustrating the flow of processing executed by the CPU in the fifth embodiment.

In step S510, the simultaneous input flag 514 is turned off, and the processing is advanced to step S596 in FIG. 43.

In step S512, it is determined whether or not the first input flag 510 is on. When the first input flag 510 is on, the processing is advanced to step S514. When the first input flag 510 is not on, the processing is advanced to step S526.

In step S514, "1" is added to the first timer 516.

In step S516, it is determined whether or not the first timer 516 is 5. When the first timer 516 is 5 (i.e., when only the first unit was swung), the processing is advanced to step S518. When the first timer 516 is not 5, the processing is advanced to step S522.

Figure 45:
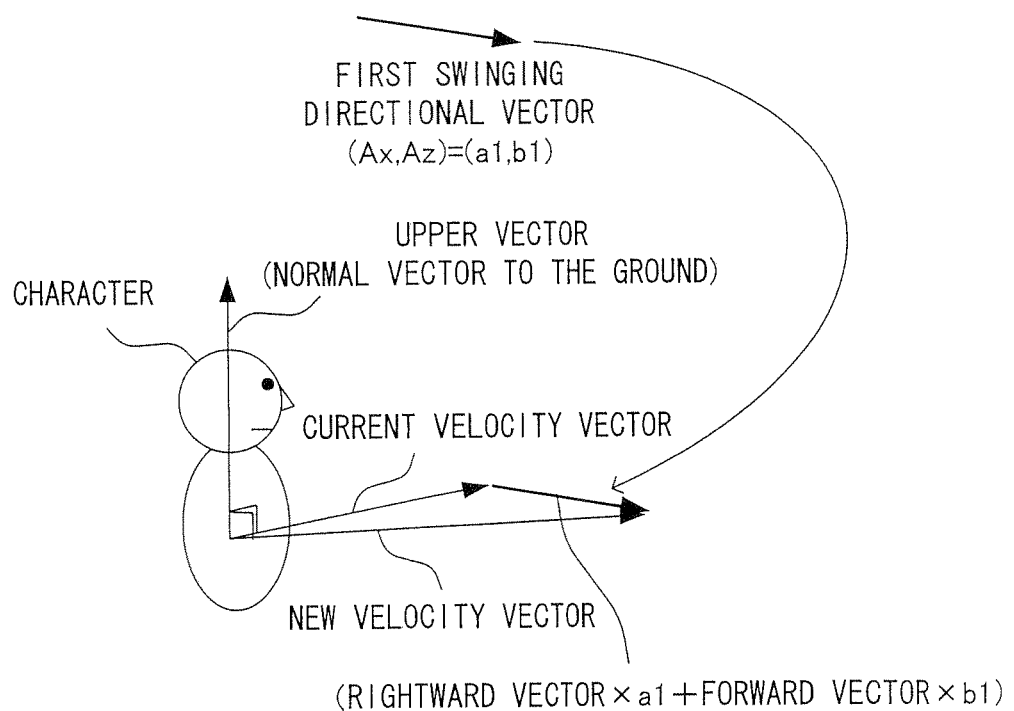
FIG. 45 shows an exemplary method for changing a velocity vector in the fifth embodiment.

In step S518, the velocity vector is changed based on the first swinging directional vector 506 detected in the step of detecting the swinging direction of the first unit (step S542 described later). The velocity vector can be changed by various methods. In this embodiment, for example, the method shown in FIG. 45 is used. Where an X axis value of the first swinging directional vector 506 is a1 and a Z axis value thereof is b1, the current vector is synthesized with a vector represented by (rightward vector×a1+forward vector×b1). The resultant vector is determined as a new velocity vector. Therefore, as the X axis value of the first swinging directional vector 506 is larger, the character is accelerated in the direction of the rightward vector more largely. As the Z axis value of the first swinging directional vector 506 is larger, the character is accelerated in the direction of the forward vector more largely.

In step S520, the posture matrix is updated such that the direction of the forward vector matches the direction of the velocity vector updated in step S518.

In step S522, it is determined whether or not the first timer 516 is larger than 10. When the first timer 516 is larger than 10, the processing is advanced to step S524. When the first timer 516 is not larger than 10, the processing is advanced to step S526.

In step S524, the first input flag 510 is turned off.

In step S526, it is determined whether or not the second input flag 512 is on. When the second input flag 512 is on, the processing is advanced to step S528. When the second input flag 512 is not on, the processing is advanced to step S540 in FIG. 41.

In step S528, "1" is added to the second input timer 518.

In step S530, it is determined whether or not the second timer 518 is 5. When the second timer 518 is 5 (i.e., when only the second unit was swung), the processing is advanced to step S532. When the second timer 518 is not 5, the processing is advanced to step S536.

In step S532, the velocity vector is changed based on the second swinging directional vector 508 detected in the step of detecting the swinging direction of the second unit (step S570 described later), by substantially the same method as in step S518.

In step S534, the posture matrix is updated such that the direction of the forward vector matches the direction of the velocity vector updated in step S532.

In step S536, it is determined whether or not the second timer 518 is larger than 10. When the second timer 518 is larger than 10, the processing is advanced to step S538. When the second timer 518 is not larger than 10, the processing is advanced to step S540 in FIG. 41.

In step S538, the second input flag 512 is turned off.

Figure 41:
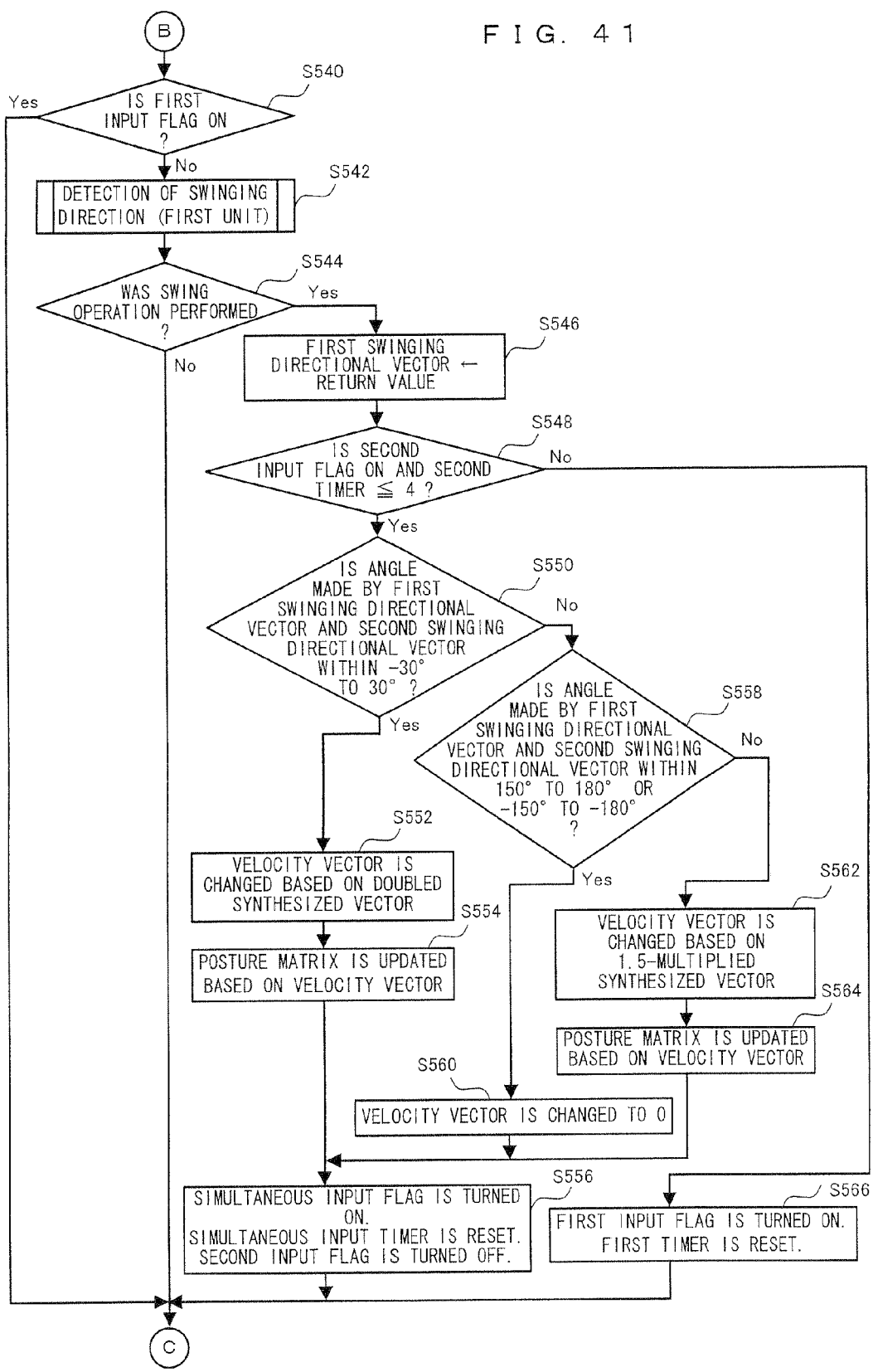
FIG. 41 is a part of the flowchart illustrating the flow of processing executed by the CPU in the fifth embodiment.

Referring to FIG. 41, in step S540, it is determined whether or not the first input flag 510 is on. When the first input flag 510 is on, the processing is advanced to step S568. When the first input flag 510 is not on, the processing is advanced to step S542.

In step S542, the swinging direction of the first unit is detected. Hereinafter, the detection of the swinging direction of the first unit will be described in detail with reference to FIG. 44.

Figure 44:
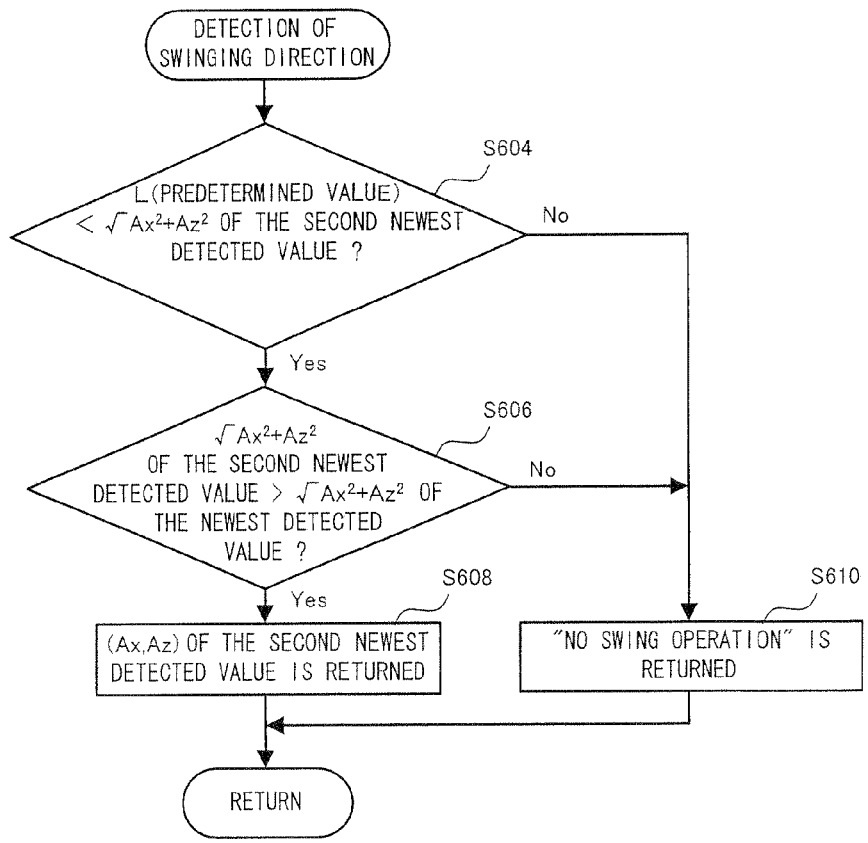
FIG. 44 is a flowchart illustrating the detection of swinging direction in the fifth embodiment in detail.

Referring to FIG. 44, in step S604, the first sampling data 522 is referred to. It is determined whether or not the magnitude of the vector represented by the X axis value and the Z axis value of the second newest detected value from the first acceleration sensor (Ax, Ay, Az) (the magnitude is $\sqrt{(Ax^2 + Az^2)}$) is larger than L (L is a predetermined value). (Hereinafter, such a vector represented by an X axis value and a Z axis value will be referred to as an "XZ vector".) When the magnitude of the XZ vector is larger than L (i.e., when the first unit is determined to have been swung), the processing is advanced to step S606. When the magnitude of the XZ vector is not larger than L (i.e., when the first unit is determined not to have been swung), the processing is advanced to step S610.

In step S606, the first sampling data 522 is referred to. It is determined whether or not the magnitude of the XZ vector of the second newest detected value from the first acceleration sensor is larger than the magnitude of the XZ vector of the newest detected value from the first acceleration sensor. This is performed in order to detect the timing at which the maximum force was applied to the first acceleration sensor in a direction parallel to the XZ plane. When the player swings the first unit in a direction parallel to the XZ plane, a large force is applied to the first unit (first acceleration sensor) by the player immediately after the start of the swing and immediately before the end of the swing. Therefore, the magnitude of the XZ vector of the detected value regarding the first acceleration sensor is maximum immediately after the start of the swing and immediately before the end of the swing. When the magnitude of the XZ vector of the second newest detected value from the first acceleration sensor is larger than the magnitude of the XZ vector of the newest detected value from the first acceleration sensor (i.e., immediately after the magnitude of the XZ vector of the detected value regarding the first acceleration sensor is maximized), the processing is advanced to step S608. Otherwise, the processing is advanced to step S610.

In step S608, the XZ vector (Ax, Az) of the second newest detected value from the first acceleration sensor is returned as a return value for the detection of the swinging direction. The XZ vector (Ax, Az) represents the direction in which the force was applied to the first unit when the player swung the first unit (i.e., the direction in which the first unit was swung). Then, the processing is advanced to step S544 in FIG. 41.

Alternatively, the swinging direction may be detected by averaging the XZ vectors during the time period in which the XZ vector is larger than L.

The XZ vector detected by the direction of the swinging direction may be sometimes opposite to the actual swinging direction of the operation unit when a certain detection method is used. In such a case, a value obtained by multiplying the detected XZ vector by −1 may be returned as a return value for the detection of the swinging direction.

In step S610, a value representing "no swing operation" is returned as the detection result of the swing direction. Then, the processing is advanced to step S544 in FIG. 41.

In step S544, it is determined whether or not the first unit was swung based on the detection result of the swing direction in step S542. When the first unit was swung, the processing is advanced to step S546. When the first unit was not swung, the processing is advanced to step S568.

In step S546, the return value for the direction of the swinging direction in step S542 (i.e., a vector representing the swinging direction of the first unit) is set as the first swinging directional vector 506.

In step S548, it is determined whether or not the second input flag 512 is on and also whether or not the second timer 518 is equal or smaller than 4. When the second input flag 512 is on and also the second timer 518 is equal or smaller than 4 (i.e., when the first unit and the second unit were swung substantially simultaneously), the processing is advanced to step S550. When the second input flag 512 is not on, or the second timer 518 is larger than 4, the processing is advanced to step S566.

In step S550, it is determined whether or not an angle made by the first swinging directional vector 506 and the second swinging directional vector 508 (a vector representing the swinging direction of the second unit) which is set in step S574 described later is within the range of −30° to 30°. When the angle made by the first swinging directional vector 506 and the second swinging directional vector 508 is within the range of −30° to 30° (i.e., when the first unit and the second unit were swung in substantially the same direction), the processing is advanced to step S552. When the angle made by the first swinging directional vector 506 and the second swinging directional vector 508 is not within the range of −30° to 30°, the processing is advanced to step S558. The range of −30° to 30° is merely exemplary, and the range may be wider or narrower. Any range by which the first unit and the second unit are regarded as being swung in substantially the same direction is usable.

Figure 46:
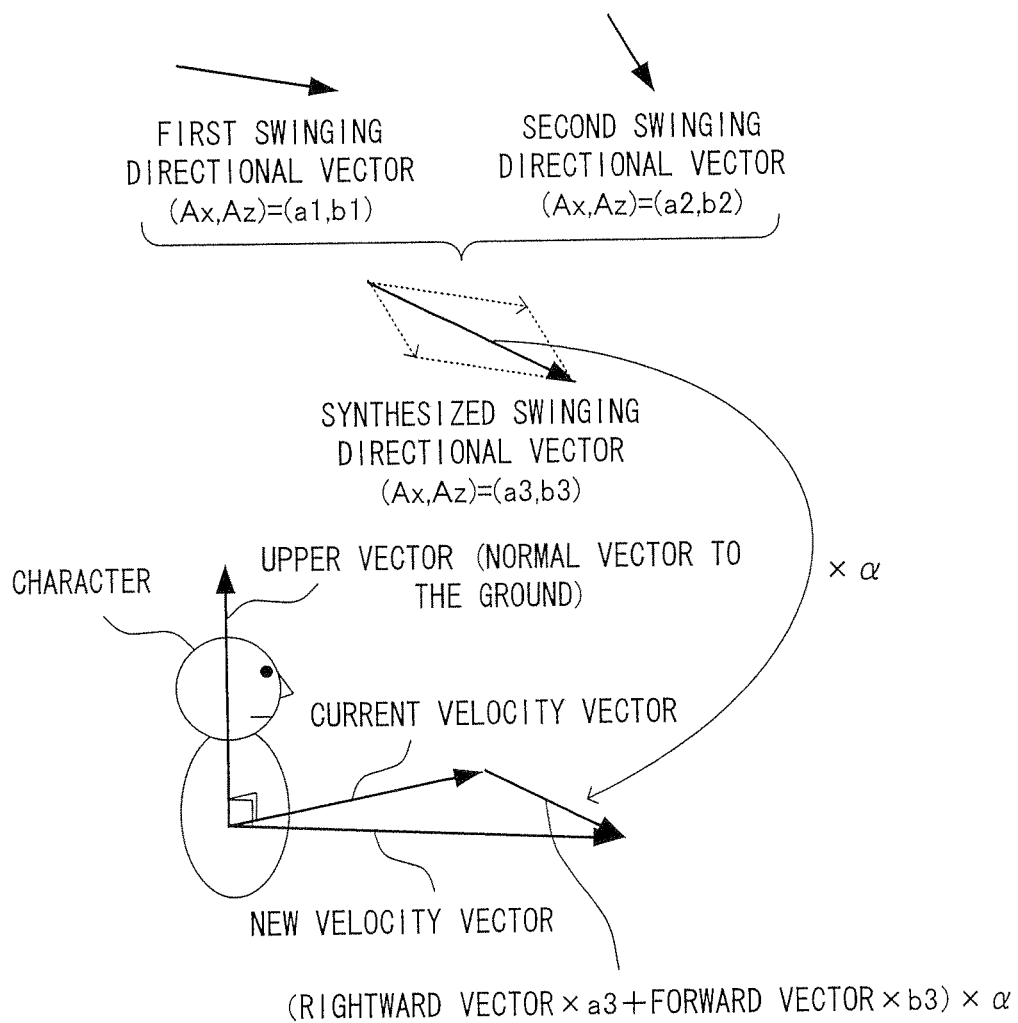
FIG. 46 shows another exemplary method for changing a velocity vector in the fifth embodiment.

In step S552, the velocity vector is changed based on the first swinging directional vector 506 and the second swinging directional vector 508. The velocity vector can be changed by various methods. In this embodiment, for example, the method shown in FIG. 46 is used. The first swinging directional vector 506 and the second swinging directional vector 508 are synthesized to obtain a synthesized swinging directional vector. Where an X axis value of the synthesized swinging directional vector is a3 and a Z axis value thereof is b3, the current vector and a vector represented by (rightward vector×a3+forward vector×b3)×α (predetermined constant) are synthesized. The resultant vector is determined as a new velocity vector. α is a constant, and in step S552, α=2. Namely, in step S552, the new velocity vector is determined by synthesizing the current vector with a vector obtained by doubling the magnitude of the synthesized swinging directional vector. In step S552, a vector obtained by doubling the magnitude of the first swinging directional vector 506 or the second swinging directional vector 508 may be regarded as the synthesized vector.

In step S554, the posture matrix is updated such that the direction of the forward vector matches the direction of the velocity vector updated in step S552.

In step S556, the simultaneous input flag 514 is turned on. The simultaneous input timer 520 is reset to 0. The second input flag 512 is turned off.

In step S558, it is determined whether or not an angle made by the first swinging directional vector 506 and the second swinging directional vector 508 is either within the range of 150° to 180° or within the range of −150° to −180°. When the angle made by the first swinging directional vector 506 and the second swinging directional vector 508 is either within the range of 150° to 180° or within the range of −150° to −180° (i.e., when the first unit and the second unit were swung in substantially the opposite directions), the processing is advanced to step S560. When the angle made by the first swinging directional vector 506 and the second swinging directional vector 508 is neither within the range of 150° to 180° nor within the range of −150° to −180°, the processing is advanced to step S562. The ranges of 150° to 180° and −150° to −180° are merely exemplary, and the ranges may be wider or narrower. Any ranges by which the first unit and the second unit are regarded as being swung in substantially the opposite directions are usable.

In step S560, the velocity vector is changed to 0, and the processing is advanced to step S556.

In step S562, as in step S552, the first swinging directional vector 506 and the second swinging directional vector 508 are synthesized to obtain a synthesized swinging directional vector. Where an X axis value of the synthesized swinging directional vector is a3 and a Z axis value thereof is b3, the current vector and a vector represented by (rightward vector×a3+forward vector×b3)×α (predetermined constant) are synthesized. The resultant vector is determined as a new velocity vector. In step S562, α=1.5. Namely, in step S562, the new velocity vector is determined by synthesizing the current vector with a vector obtained by multiplying the magnitude of the synthesized swinging directional vector by 1.5.

In step S564, the posture matrix is updated such that the direction of the forward vector matches the direction of the velocity vector updated in step S562.

In step S566, the first input flag 510 is turned on. The first input timer 516 is reset to 0.

Figure 42:
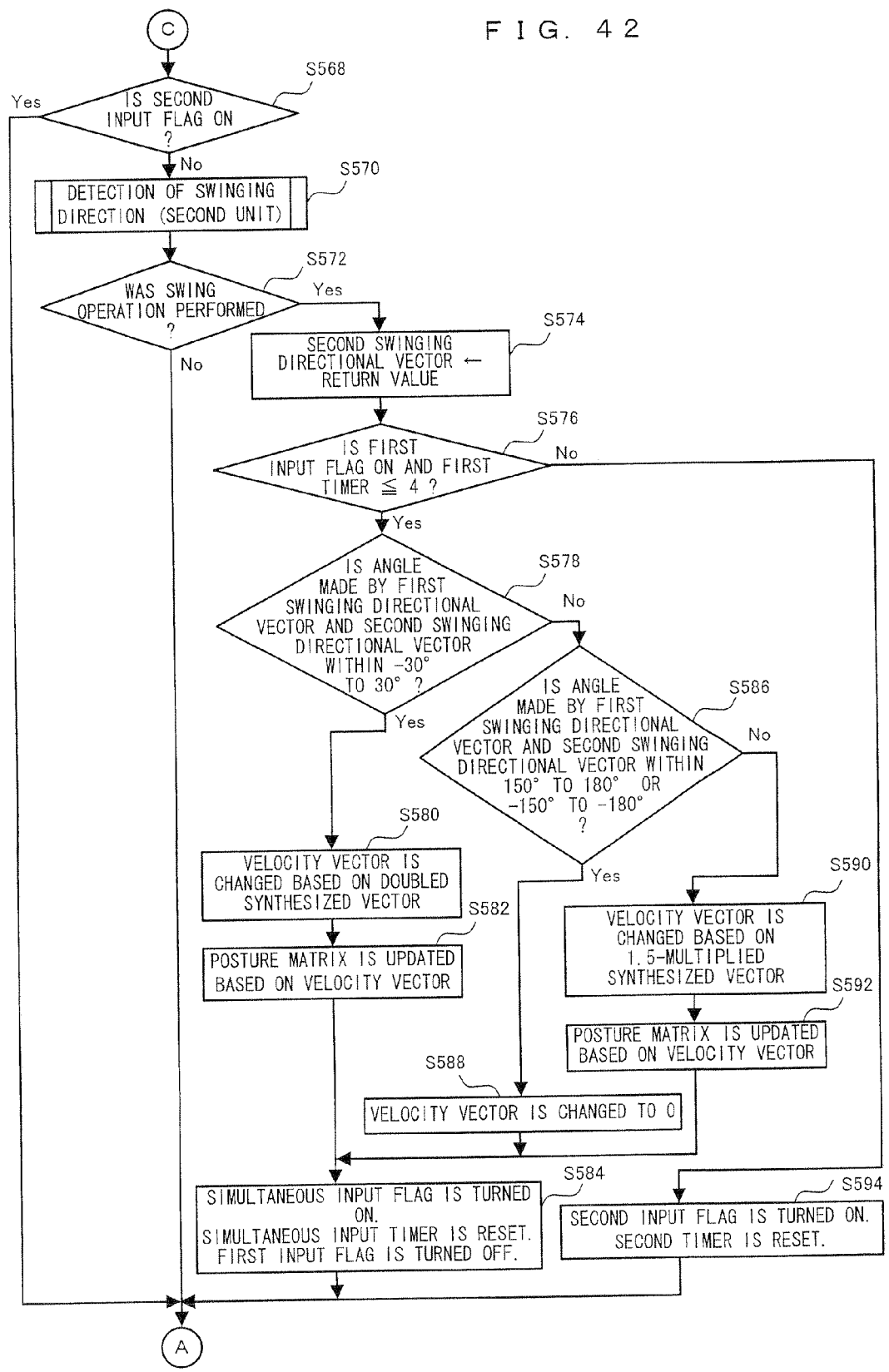
FIG. 42 is a part of the flowchart illustrating the flow of processing executed by the CPU in the fifth embodiment.

Referring to FIG. 42, in step S568, it is determined whether or not the second input flag 512 is on. When the second input flag 512 is on, the processing is advanced to step S596 in FIG. 43. When the second input flag 512 is not on, the processing is advanced to step S570.

In step S570, the swinging direction of the second unit is detected. Hereinafter, the detection of the swinging direction of the second unit will be described in detail with reference to FIG. 44.

Referring to FIG. 44, in step S604, the second sampling data 524 is referred to. It is determined whether or not the magnitude of the XZ vector of the second newest detected value from the second acceleration sensor is larger than L. When the magnitude of the XZ vector is larger than L (i.e., when the second unit is determined to have been swung), the processing is advanced to step S606. When the magnitude of the XZ vector is not larger than L (i.e., when the second unit is determined not to have been swung), the processing is advanced to step S610.

In step S606, the second sampling data 524 is referred to. It is determined whether or not the magnitude of the XZ vector of the second newest detected value from the second acceleration sensor is larger than the magnitude of the XZ vector of the newest detected value from the second acceleration sensor. When the magnitude of the XZ vector of the second newest detected value from the second acceleration sensor is larger than the magnitude of the XZ vector of the newest detected value from the second acceleration sensor (i.e., immediately after the magnitude of the XZ vector of the detected value regarding the second acceleration sensor is maximized), the processing is advanced to step S608. Otherwise, the processing is advanced to step S610.

In step S608, the XZ vector (Ax, Az) of the second newest detected value from the second acceleration sensor is returned as a return value for the detection of the swinging direction. The XZ vector (Ax, Az) represents the direction in which the force was applied to the second unit when the player swung the second unit (i.e., the direction in which the second unit was swung). Then, the processing is advanced to step S572 in FIG. 42.

In step S610, a value representing "no swing operation" is returned as the detection result of the swing direction. Then, the processing is advanced to step S572 in FIG. 42.

In step S572, it is determined whether or not the second unit was swung based on the detection result of the swing direction in step S570. When the second unit was swung, the processing is advanced to step S574. When the second unit was not swung, the processing is advanced to step S596.

In step S574, the return value for the direction of the swinging direction in step S570 (i.e., a vector representing the swinging direction of the second unit) is set as the second swinging directional vector 508.

In step S576, it is determined whether or not the first input flag 510 is on and also whether or not the first timer 516 is equal or smaller than 4. When the first input flag 510 is on and also the first timer 516 is equal or smaller than 4 (i.e., when the first unit and the second unit were swung substantially simultaneously), the processing is advanced to step S578. When the first input flag 510 is not on, or the first timer 516 is larger than 4, the processing is advanced to step S594.

In step S578, it is determined whether or not an angle made by the first swinging directional vector 506 and the second swinging directional vector 508 is within the range of −30° to 30°. When the angle made by the first swinging directional vector 506 and the second swinging directional vector 508 is within the range of −30° to 30° (i.e., when the first unit and the second unit were swung in substantially the same direction), the processing is advanced to step S580. When the angle made by the first swinging directional vector 506 and the second swinging directional vector 508 is not within the range of −30° to 30°, the processing is advanced to step S586.

In step S580, as in step S552, a new velocity vector is determined by synthesizing the current vector and a vector obtained by doubling the magnitude of the synthesized swinging directional vector.

In step S582, the posture matrix is updated such that the direction of the forward vector matches the direction of the velocity vector updated in step S580.

In step S584, the simultaneous input flag 514 is turned on. The simultaneous input timer 520 is reset to 0. The first input flag 510 is turned off.

In step S586, it is determined whether or not an angle made by the first swinging directional vector 506 and the second swinging directional vector 508 is within the range of 150° to 180° or within the range of −150° to −180°. When the angle made by the first swinging directional vector 506 and the second swinging directional vector 508 is within the range of 150° to 180° or within the range of −150° to −180° (i.e., when the first unit and the second unit were swung in substantially the opposite directions), the processing is advanced to step S588. When the angle made by the first swinging directional vector 506 and the second swinging directional vector 508 is neither within the range of 150° to 180° nor within the range of −150° to −180°, the processing is advanced to step S590.

In step S588, the velocity vector is changed to 0, and the processing is advanced to step S584.

In step S590, as in step S562, a new velocity vector is determined by synthesizing the current vector and a vector obtained by multiplying the magnitude of the synthesized swinging directional vector by 1.5.

In step S592, the posture matrix is updated such that the direction of the forward vector matches the direction of the velocity vector updated in step S590.

In step S594, the second input flag 512 is turned on. The second input timer 518 is reset to 0.

Referring to FIG. 43, in step S596, the current position data is updated based on the velocity vector.

In step S598, the game image displayed on the monitor 2 is updated based on the current position data and the posture matrix.

In step S600, the posture matrix and the velocity vector are updated so as to reflect the influence of the topography. This is performed such that, for example, when the character goes up a steep slope, the character inclines its body slightly backward and the advancing direction of the character is along the slope.

In step S602, the velocity data is decreased by a predetermined amount. Then, the processing is returned to step S502 in FIG. 40.

The above-described processing is repeated, so that the game image is changed when necessary in accordance with the operation performed by the player.

The processing in this embodiment can be summarized as follows.

(1) When the first unit and the second unit are swung at different timings→the velocity vector is updated based on the directional vectors of the respective units.

(2) When the first unit and the second unit are swung substantially simultaneously in substantially the same direction→the velocity vector is updated based on a vector obtained by doubling the magnitude of the synthesized swinging directional vector.

(3) When the first unit and the second unit are swung substantially simultaneously in different directions (excluding substantially the opposite directions)→the velocity vector is updated based on a vector obtained by multiplying the magnitude of the synthesized swinging directional vector by 1.5.

(4) When the first unit and the second unit are swung substantially simultaneously in substantially opposite directions→the velocity vector is made 0 (the character stops).

In this manner, the game processing is made in different manners based on the swinging timing and the relative directions of the first unit and the second unit. This allows the player to make various inputs.

As described above, according to this embodiment, the player can freely move both of his/her hands. Owing to a high degree of freedom of motion realized by such an arrangement, a dynamic play is made possible. Since the player can control the character by swinging the operation units, the player can play intuitively and thus obtain a high operability. As the swing directions of two operation units swung simultaneously are closer to each other, the acceleration of the character is larger. Therefore, a more intuitive operation is realized.

In this embodiment, three-axial acceleration sensors are used. Even when two-axial acceleration sensors are used, the swinging directions of the operation units can be detected (for example, in the flow shown in FIG. 44, it is detected that the operation units were swung, and the swinging directions thereof are also detected, by referring to the output values in the two axes of the X axis and the Z axis). Thus, substantially the same effects as those of this embodiment are provided.

In this embodiment, one of the first unit and the second unit is swung, the character is accelerated in accordance with the swinging direction thereof. Alternatively, the game may be set such that when one of the first unit and the second unit is swung, the character is not accelerated; whereas when the first unit and the second unit are substantially simultaneously swung, the character is accelerated.

In this embodiment, when it is detected that the output from the acceleration sensor (specifically the XZ vector in this embodiment) is maximized, the swinging direction of the operation unit is detected based on the output from the acceleration sensor at that time or the vicinity thereof. The present invention is not limited to this. The swinging direction of the operation unit may be detected by any other method. For example, the following methods are usable. When the magnitude of the XZ vector from the acceleration sensor exceeds a predetermined value and then returns to 0, the sampling data during that time period is referred to, and thus the maximum value of the XZ vector from the acceleration sensor during that period may be set as the swinging directional vector. A vector obtained by averaging or synthesizing the XZ vectors during that period may be set as the swinging directional vector. Alternatively, the outputs from the acceleration sensor are integrated to calculate the moving speed of the operation unit. The swinging direction of the operation unit may be detected based on the outputs from the acceleration sensor during the time period in which the moving speed calculated in this manner is equal to or larger than a predetermined value.

In this embodiment, the swing operation is detected. The present invention is not limited to this. A motion of the operation unit may be detected, in which case the game control may be executed based on the direction and the timing of the motion.

Sixth Embodiment

An image displayed in a sixth embodiment is, for example, substantially the same as the image shown in FIG. 19. In this embodiment, the motion of the character is controlled based on the direction in which the first unit and the second unit are swung.

FIG. 47 shows an exemplary manner of operating the operation units in the sixth embodiment. In this embodiment, the player instructs a direction by performing a direction instruction operation (an operation of moving the operation unit horizontally), and then determines the direction which was input by the direction instruction operation by performing a trigger operation (an operation of moving the operation unit vertically downward). The correspondence between the direction in which the first unit and the second unit are moved by the direction instruction operation and the motion of the character is substantially the same as that shown in FIG. 38 except for several points. Hereinafter, a swing operation is used as an example of the operation for moving the operation units. The present invention is not limited to this, and any operation is usable as long as the motions of the operation units are detected and the motion of the character is controlled based on the direction and the magnitude of the detected motions.

Figure 48:
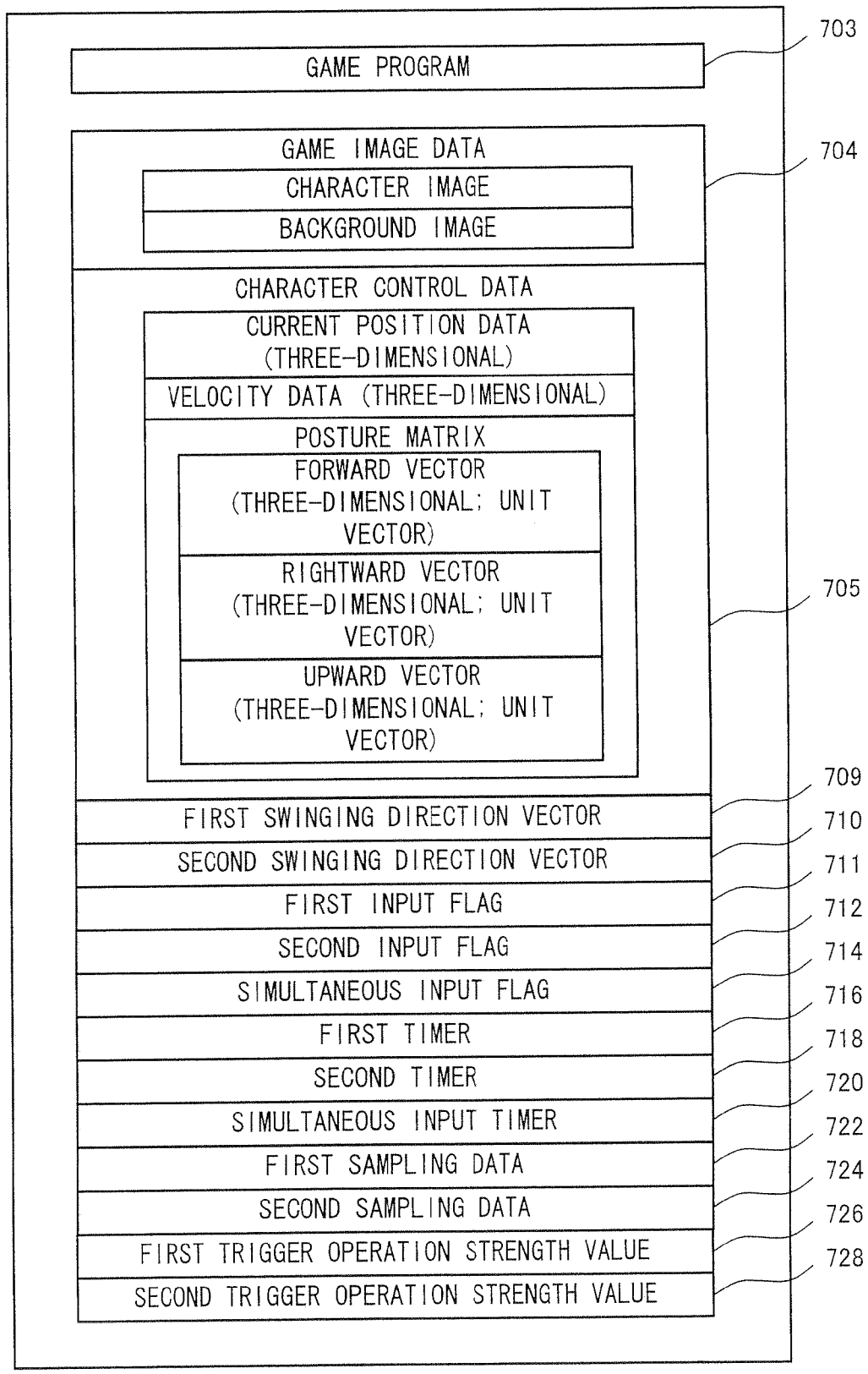
FIG. 48 a memory map of the main memory in the sixth embodiment.

FIG. 48 shows an exemplary memory map of the main memory 33 in the sixth embodiment. The main memory 33 stores a game program 703, game image data 704, character control data 705, a first swinging directional vector 709, a second swinging directional vector 710, a first input flag 711, a second input flag 712, a simultaneous input flag 714, a first timer 716, a second timer 718, a simultaneous input timer 720, first sampling data 722, second sampling data 724, a first trigger operation strength value 726, and a second trigger operation strength value 728.

The game image data 704, the character control data 705, the first swinging directional vector 709, the second swinging directional vector 710, the first input flag 711, the second input flag 712, the simultaneous input flag 714, the first timer 716, the second timer 718, the simultaneous input timer 720, first sampling data 722, and second sampling data 724 are substantially the same as those in the fifth embodiment and will not be described here.

The first trigger operation strength value 726 represents a swinging strength when a trigger operation is made on the first unit. The second trigger operation strength value 728 represents a swinging strength when a trigger operation is made on the second unit.

With reference to the flowcharts in FIG. 49 through FIG. 53, a flow of processing executed by the CPU 30 based on the game program 703 will be described.

Figure 49:
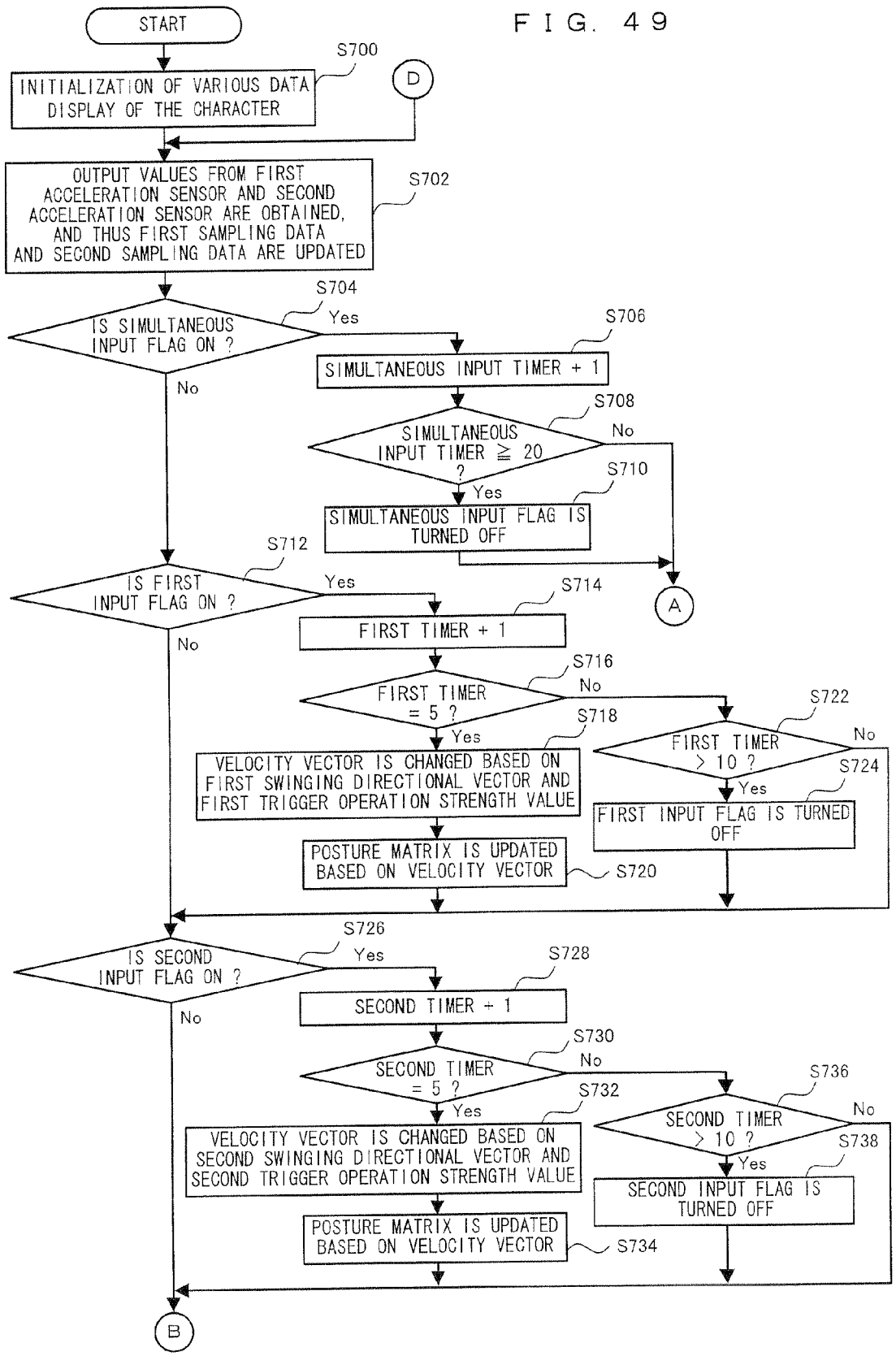
FIG. 49 is a part of a flowchart illustrating a flow of processing executed by the CPU in the sixth embodiment.

Referring to FIG. 49, the processing in steps S700, S702, S704, S706, S708, S710, S712, S714 and S716 is substantially the same as that described in the fifth embodiment and will not be described here.

Figure 54:
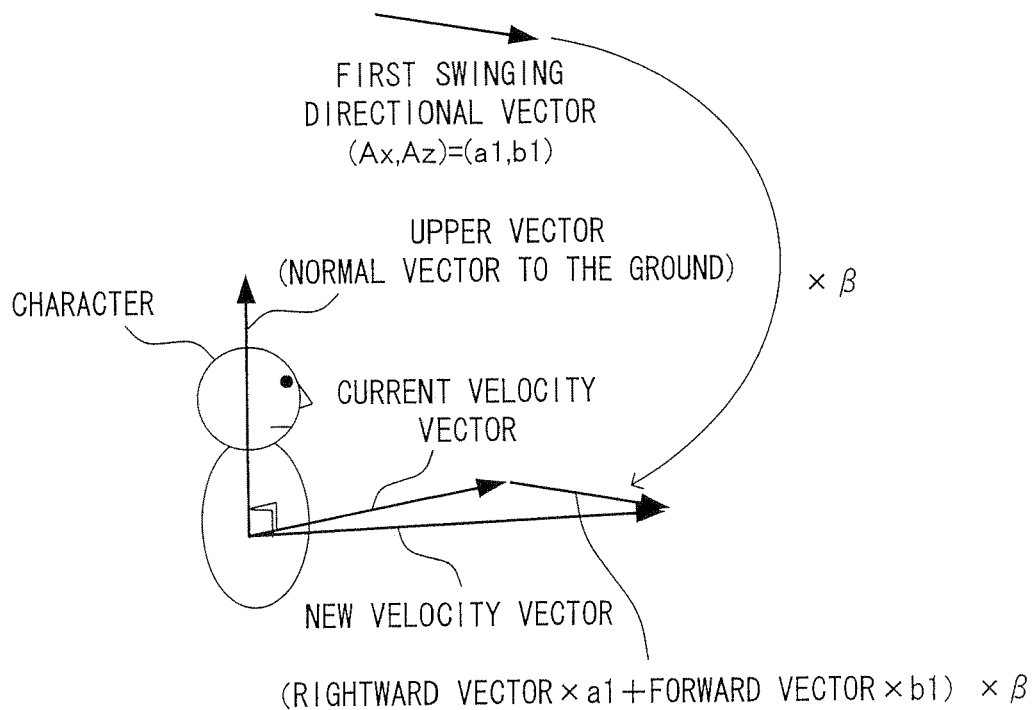
FIG. 54 shows an exemplary method for changing a velocity vector in the sixth embodiment.
Figure 55:
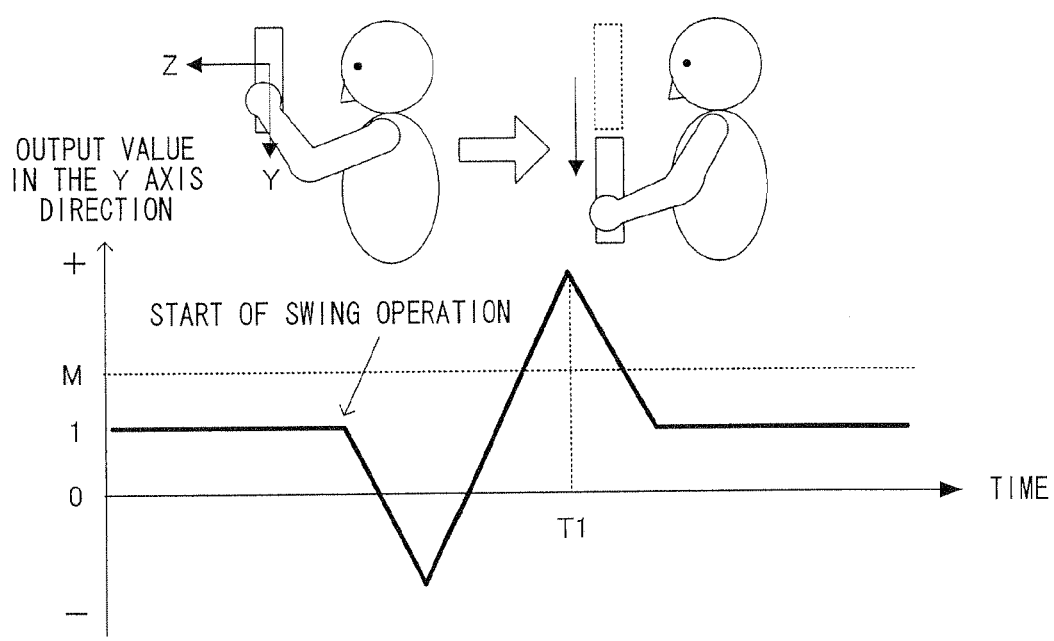
FIG. 55 shows another exemplary method for changing a velocity vector in the sixth embodiment.

In step S718, the velocity vector is changed based on the first swinging directional vector 709 which is calculated in step S748 described later based on the first sampling data 722 (i.e., a vector representing the direction in which the first unit was swung by the player for making a direction instruction operation) and the first trigger operation strength value 726 which is set in accordance with the detection result of the swinging strength of the first unit obtained in step S742 described later (i.e., a vector representing the strength at which the first unit was swung by the player for making a trigger operation). The velocity vector can be changed by various methods. In this embodiment, for example, the method shown in FIG. 54 is used. Where an X axis value of the first swinging directional vector 709 is a1, a Z axis value thereof is b1, and the first trigger operation strength value 726 is β1, the current vector is synthesized with a vector represented by (rightward vector×a1+forward vector×b1)×β. The resultant vector is determined as a new velocity vector. Therefore, as the first trigger operation strength value 726 is larger, the character is accelerated more largely.

The processing in steps S720, S722, S724, S726, S728 and S730 is substantially the same as that described in the fifth embodiment and will not be described here.

In step S732, the velocity vector is changed based on the second swinging directional vector 710 which is calculated in step S782 described later based on the second sampling data 724 (i.e., a vector representing the direction in which the second unit was swung by the player for making a direction instruction operation) and the second trigger operation strength value 728 which is set in accordance with the detection result of the swinging strength of the second unit obtained in step S776 described later (i.e., a vector representing the strength at which the second unit was swung by the player for making a trigger operation). The velocity vector is changed as follows, for example. Where an X axis value of the second swinging directional vector 710 is a2, a Z axis value thereof is b2, and the second trigger operation strength value 728 is β2, the current vector is synthesized with a vector represented by (rightward vector×a2+forward vector×b2)×β. The resultant vector is determined as a new velocity vector. Therefore, as the second trigger operation strength value 728 is larger, the character is accelerated more largely.

The processing in steps S734, S736, S738 and S740 (FIG. 50) is substantially the same as that described in the fifth embodiment and will not be described here.

Figure 50:
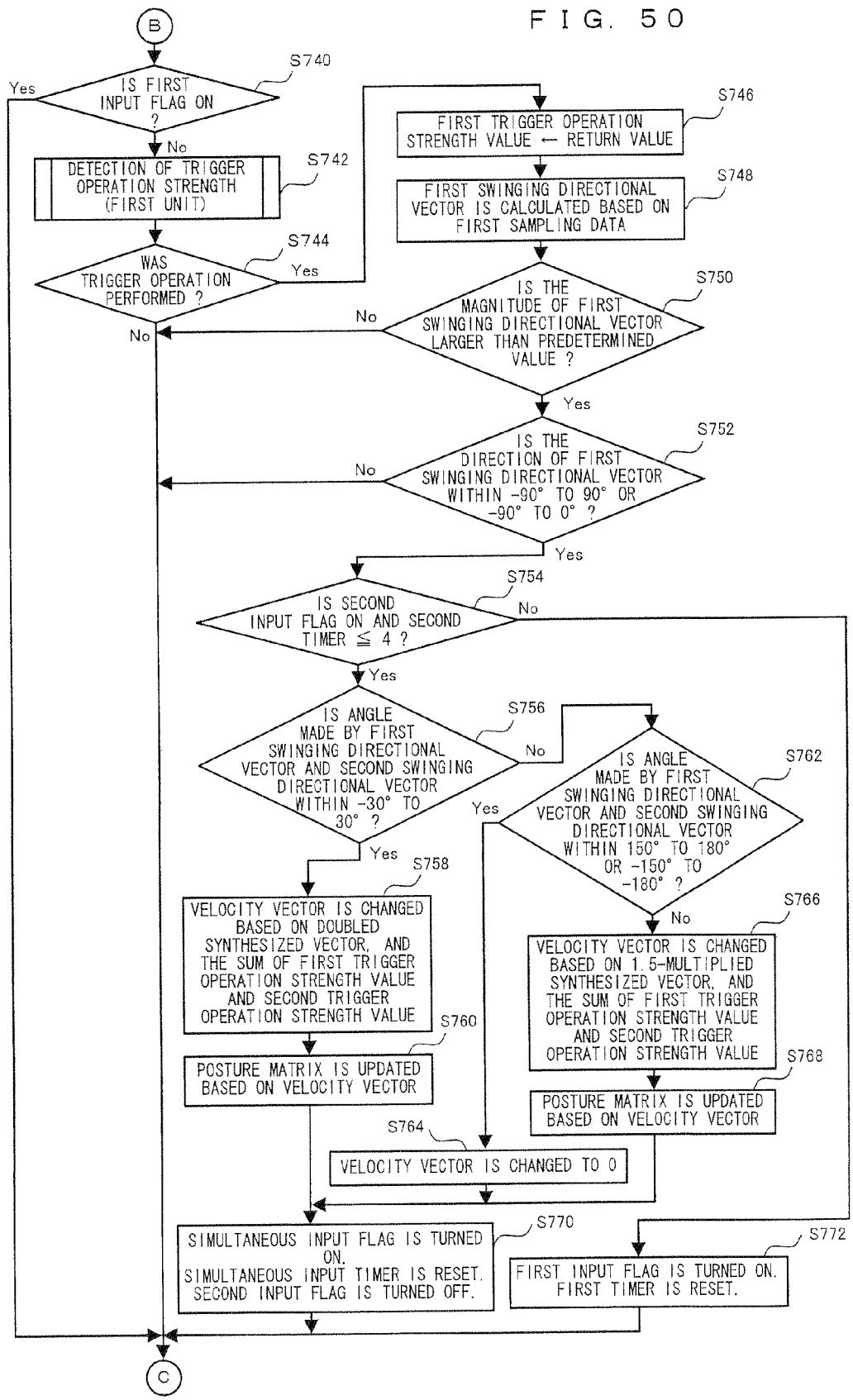
FIG. 50 is a part of the flowchart illustrating the flow of processing executed by the CPU in the sixth embodiment.

Referring to FIG. 50, in step S742, the trigger operation strength of the first unit is detected. Hereinafter, the detection of the trigger operation strength of the first unit will be described in detail with reference to FIG. 53.

Figure 53:
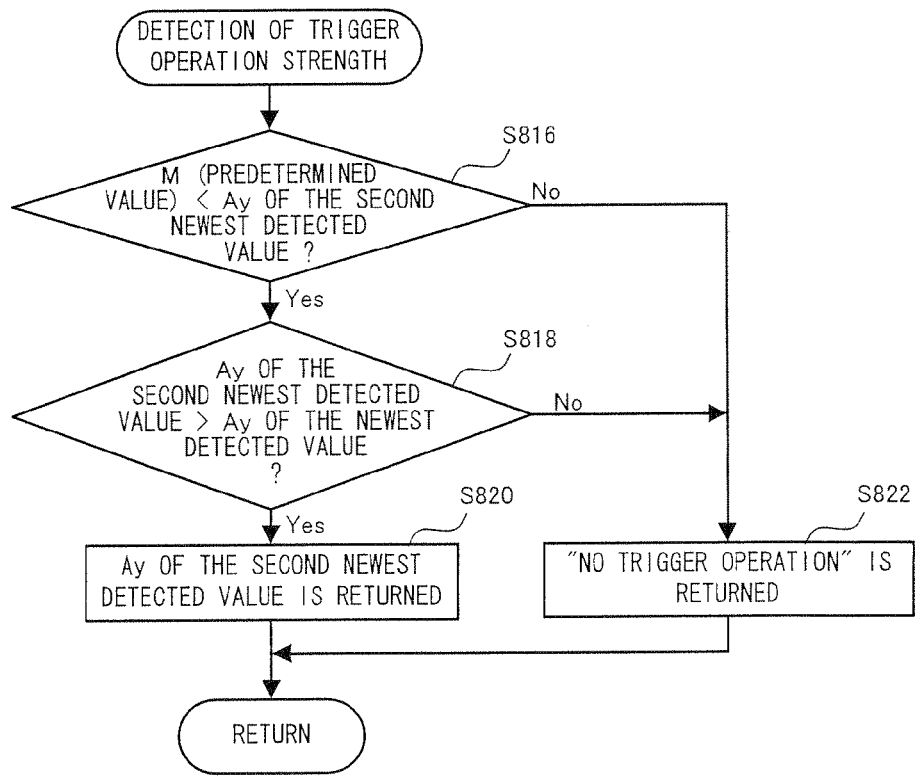
FIG. 53 is a flowchart illustrating trigger operation strength detection in the sixth embodiment in detail.

Referring to FIG. 53, in step S816, the first sampling data 722 is referred to. It is determined whether or not the magnitude of a Y axis value Ay of the second newest detected value from the first acceleration sensor (Ax, Ay, Az) is larger than M (M is a predetermined value and is larger than 1). When the magnitude of the Y axis value Ay of the second newest detected value from the first acceleration sensor is larger than M (i.e., when a trigger operation is determined to have been made on the first unit), the processing is advanced to step S818. When the magnitude of the Y axis value Ay of the second newest detected value from the first acceleration sensor is not larger than M (i.e., when no trigger operation is determined to have been made on the first unit), the processing is advanced to step S822.

In step S818, the first sampling data 722 is referred to. It is determined whether or not the magnitude of the Y axis value of the second newest detected value from the first acceleration sensor is larger than the magnitude of the Y axis value of the newest detected value from the first acceleration sensor. This is performed in order to detect the timing at which the maximum force was applied to the first acceleration sensor in a direction of the Y axis. When the player swings the first unit in a direction of the Y axis, as shown in FIG. 54, the Y axis value of the detected value regarding the first acceleration sensor is minimum immediately after the start of the swing and maximum immediately before the end of the swing. Therefore, the determination result in step S818 is positive at time T1 in FIG. 56. When the magnitude of the Y axis value of the second newest detected value from the first acceleration sensor is larger than the magnitude of the Y axis value of the newest detected value from the first acceleration sensor (i.e., immediately after the magnitude of the Y axis value of the detected value regarding the first acceleration sensor is maximized), the processing is advanced to step S820. Otherwise, the processing is advanced to step S822.

In step S820, the Y axis value Ay of the second newest detected value from the first acceleration sensor is returned as a return value for the detection of the trigging operation strength. The Y axis value Ay represents the magnitude of the force applied to the first unit when the player made a trigger operation on the first unit (i.e., the strength at which the first unit was swung). Then, the processing is advanced to step S744 in FIG. 50.

In step S822, a value representing "no trigger operation" is returned as the detection result of the trigger operation strength. Then, the processing is advanced to step S744 in FIG. 50.

In step S744, it is determined whether or not a trigger operation was made on the first unit based on the detection result of the trigger operation strength in step S742. When a trigger operation was made on the first unit, the processing is advanced to step S746. When no trigger operation was made on the first unit, the processing is advanced to step S774.

In step S746, a return value for the first trigger operation strength value (i.e., a value representing the strength at which the first unit was swung by the trigger operation made thereon) is set.

Figure 56:
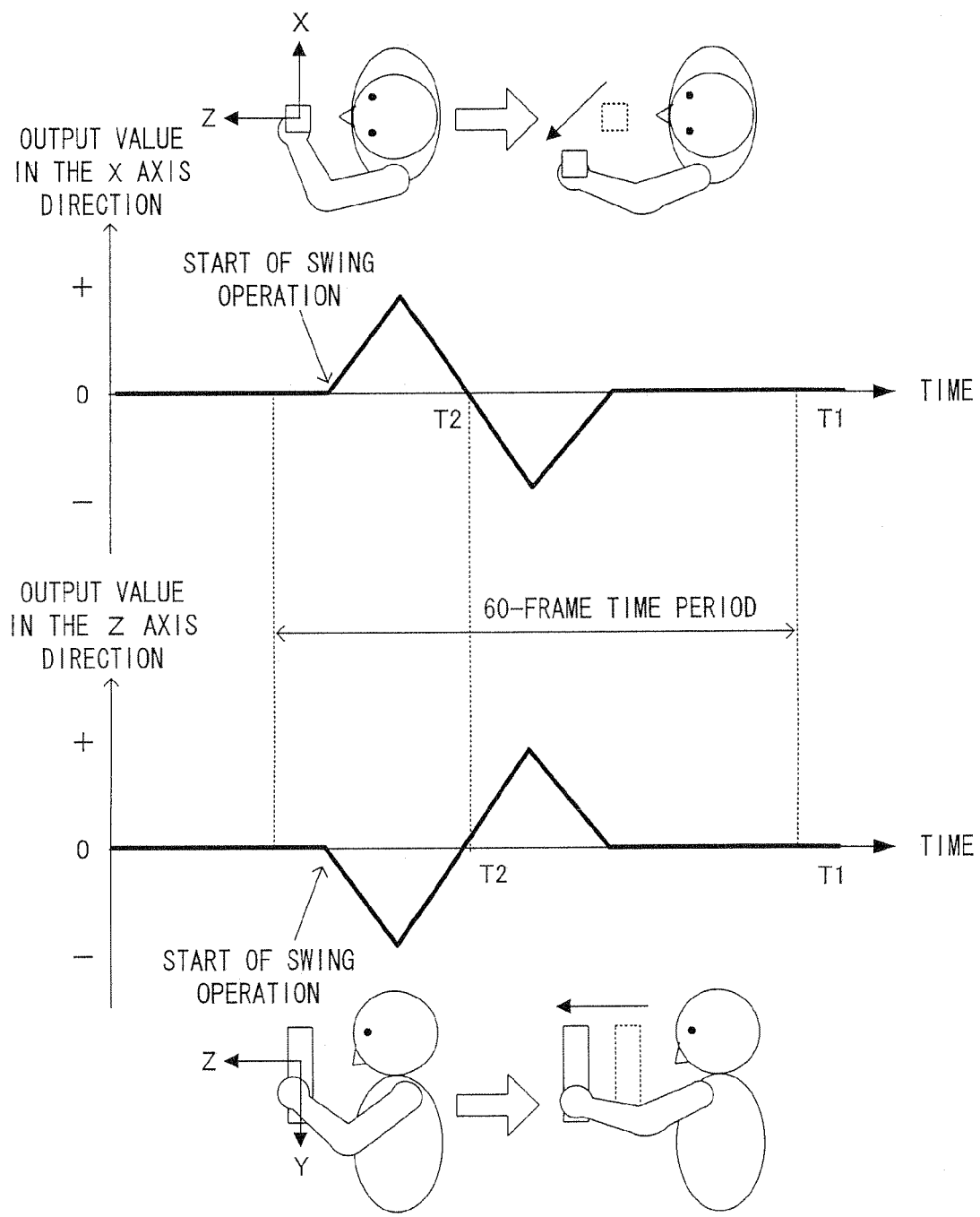
FIG. 56 shows a correspondence between the operation performed by the player and the output from the acceleration sensor in the sixth embodiment.

In step S748, a direction in which the first unit was swung for making a direction instruction operation is calculated based on the first sampling data 722, and the calculation result is set as the first swinging directional vector 709. Such a direction can be detected by various methods. FIG. 56 shows a change in the output value from the acceleration sensor in the X axis direction and the Z axis direction when the player swings the operation unit left-forward for making a direction instruction operation.

In this embodiment, the direction in which the operation unit was swung is detected by, for example, referring to the sampling data for the immediately previous 60 frames when a trigger operation is detected (T1 in FIG. 56). Specifically, the sampling data is referred to, to detect the time at which the signs of the X axis value and the Z axis value are inverted (T2 in FIG. 56). The XZ vectors represented by the X axis values and the Z axis values in the frames after time T2 are averaged. Thus, the direction in which the operation unit was swung is detected. In the example of FIG. 56, the average of the X axis values after time T2 is negative (which means that the operation unit was swung in the negative X axis direction), and the average of the Z axis values after time T2 is positive (which means that the operation unit was swung in the positive Z axis direction). The absolute values of these averages are substantially equal to each other. Therefore, it is found that the operation unit was swung in a direction which is 45° offset from the forward direction with respect to the player. In the case where the sampling data for the immediately previous 60 frames is not sufficient to detect time T2, the sampling data may be stored for a longer time period. However, even when the sampling data is stored for a sufficiently long time period, if no Ax or Az output representing a direction instruction operation is obtained for a predetermined time period (tolerable time period) before the time point when the trigger operation was detected (T1) (for example, when there is no output changing as shown in FIG. 56, or when the output value of Ax or Ay is simply 0), it can be determined that the direction instruction operation and the trigger operation are not continuously performed. In this case, it is preferable to make such operations invalid. The start of the swing operation, the end of the swing operation, or a time point in the middle of the swing operation may be the reference point of the tolerable time period, instead of the time point when the trigger operation was detected.

According to another method for detecting the direction in which the operation unit was swung for making a direction instruction operation, an average value of each of the X axis values and the Z axis values from the start of the swing operation until time T2 at which the signs are inverted in FIG. 56 may be obtained. In this case, the direction represented by the finally obtained XZ vector is opposite to the moving direction of the operation unit which was swung.

According to still another method for detecting the direction in which the operation unit was swung for making the direction instruction operation, the X axis value or the Z axis value from the acceleration sensor are not used as they are. A differential vector of the XZ vector from the acceleration sensor between the frames (the direction of the differential vector represents the moving direction of the operation unit) is calculated. The direction represented by a differential vector having the maximum magnitude may be determined as the direction in which the operation unit was swung for making the direction instruction operation.

When the operation unit is swung, as shown in FIG. 56, the value of each axis is changed from 0→positive value→0→negative value→0 or 0→negative value→0→positive value→0. Therefore, in the case where such a pattern is found during the immediately previous 60 frames based on the sampling data, it can be recognized that the direction instruction operation was performed before the trigger operation. Thus, the direction in which the operation unit was swung at the time of the direction instruction operation is detected. In this manner, more accurate detection is made possible.

In a modification to the processing in step S748, the following processing may be executed. When the direction in which the first unit was swung for making the direction instruction operation is detected, it is also determined based on the second sampling data 724 whether or not the second unit was also swung at the time of the direction instruction operation. When the second unit was also swung, the setting of the first swinging directional vector 709 is cancelled. In this case, a new operation requirement that "the first unit and the second unit should not be swung simultaneously at the time of a direction instruction operation" is imposed on the player.

In step S750, it is determined whether or not the magnitude of the first swinging directional vector 709 which was set in step S748 is larger than a predetermined value. When the magnitude of the first swinging directional vector 709 is larger than the predetermined value, the processing is advanced to step S752. Otherwise, the processing is advanced to step S774 in FIG. 51.

In step S752, it is determined whether or not the direction of the first swinging directional vector 709 is either within the range of 0° to 90° or within the range of −90° to 0°. Where an X axis value of the first swinging directional vector 709 is Ax and a Z axis value thereof is Az, the direction of the first swinging directional vector 709 is represented by arctan (Ax/Az). When the first swinging directional vector 709 is either within the range of 0° to 90° or within the range of −90° to 0°, the processing is advanced to step S754. When the first swinging directional vector 709 is neither within the range of 0° to 90° nor within the range of −90° to 0°, the processing is advanced to step S774 in FIG. 51. Owing to such an arrangement, the range of directions in which the player can instruct by a direction instruction operation made on the first unit can be limit to the range of 0° to 90° (i.e., between the positive X axis direction and the positive Z axis direction) or the range of −90° to 0° (i.e., between the positive X axis direction and the negative Z axis direction). Namely, where the player holds the first unit with his/her right hand and holds the second unit with his/her left hand, the range in which the first unit is swung can be limited to a right area. As described later, the range in which the second unit is swung is limited to a left area. In this manner, the first unit and the second unit are assigned different roles, so that the first unit and the second unit are prevented from colliding against each other.

The processing in step S754 and S756 are the same as that described in the fifth embodiment and will not be described here.

Figure 57:
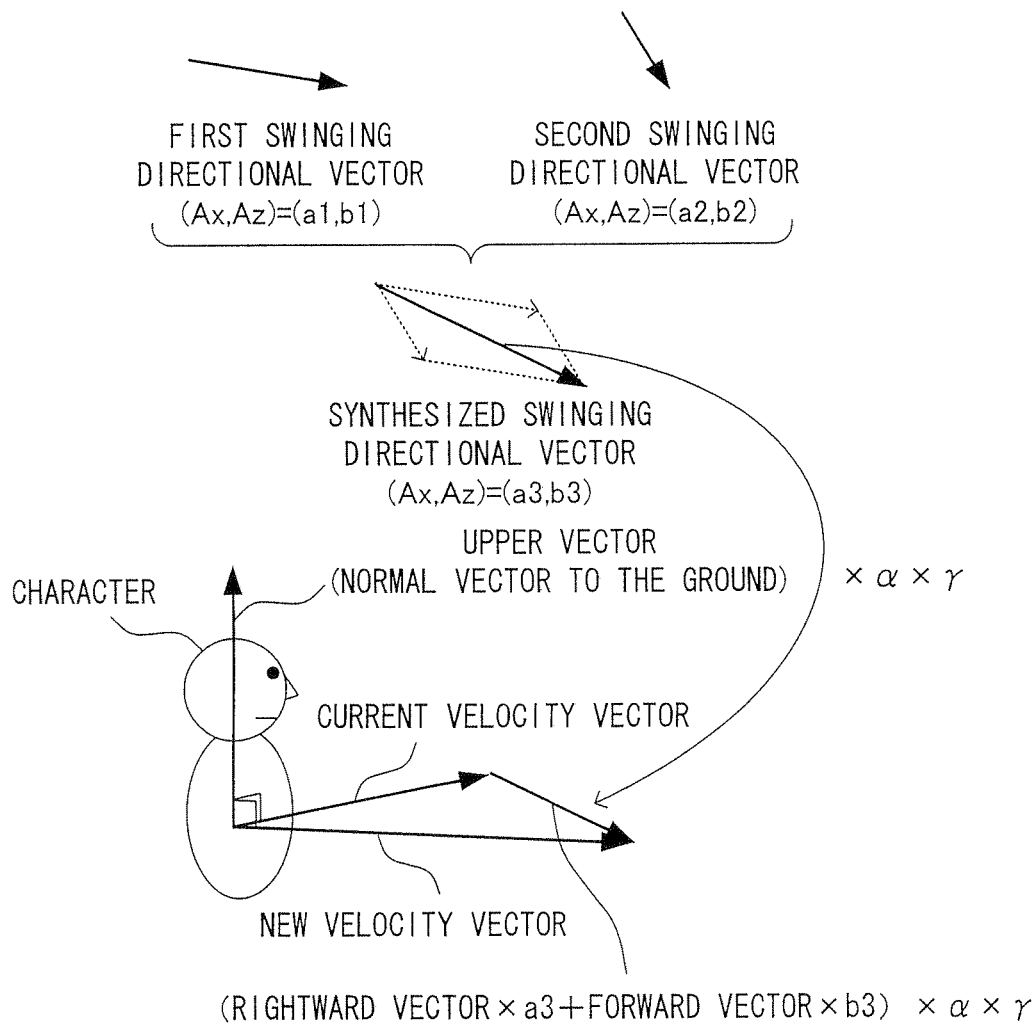
FIG. 57 shows another exemplary method for changing a velocity vector in the sixth embodiment.

In step S758, the velocity vector is changed based on the first swinging directional vector 709, the second swinging directional vector 710, the first trigger operation strength value 726, and the second trigger operation strength value 728. Specifically, as shown in FIG. 57, the first swinging directional vector 709 and the second swinging directional vector 710 are synthesized to obtain a synthesized swinging directional vector. Where the X axis value of the synthesized swinging directional vector is a3 and the Z axis value thereof is b3, the current vector is synthesized with a vector represented by (rightward vector×a3+forward vector×b3)×α (predetermined constant)×β (predetermined constant). The resultant vector is determined as a new velocity vector. α is a constant, and in step S758, α=2. β is a value in proportion to the sum of the first trigger operation strength value 726 and the second trigger operation strength value 728. Therefore, as the sum of the first trigger operation strength value 726 and the second trigger operation strength value 728 is larger, the acceleration of the character is larger.

In step S758, a vector obtained by doubling the first swinging directional vector 709 or the second swinging directional vector 710 may be used as the synthesized vector. Either one the first trigger operation strength value 726 or the second trigger operation strength value 728 may be used.

The processing in steps S760, S762 and S764 is substantially the same as that described in the fifth embodiment and will not be described here.

In step S766, the velocity vector is changed in substantially the same manner as in step S758. It should be noted that in step S760, α=1.5.

The processing in steps S768, S770 and S772 is substantially the same as that described in the fifth embodiment and will not be described here.

Figure 51:
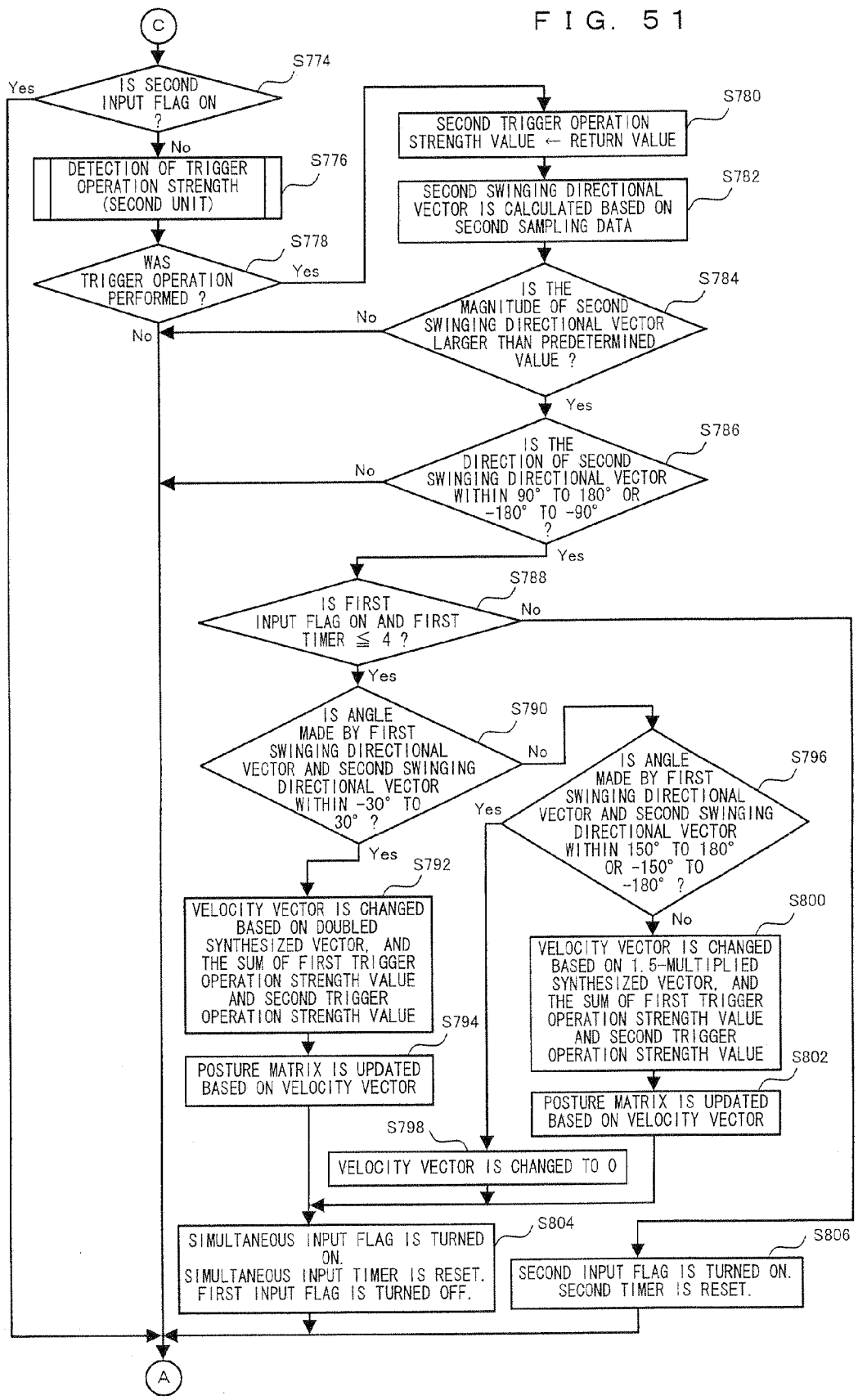
FIG. 51 is a part of the flowchart illustrating the flow of processing executed by the CPU in the sixth embodiment.
Figure 52:
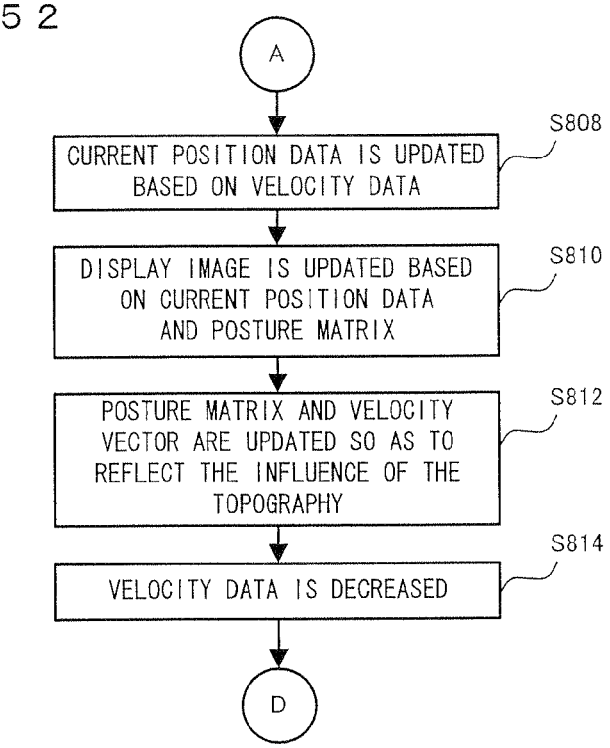
FIG. 52 is a part of the flowchart illustrating the flow of processing executed by the CPU in the sixth embodiment.

The processing in FIG. 51 and FIG. 52 is apparent to those skilled in the art based on the description regarding the flowchart in FIG. 50 and the fifth embodiment, and will not be described here.

As described above, according to this embodiment, the player can freely move both of his/her hands. Owing to a high degree of freedom of motion realized by such an arrangement, a dynamic play is made possible. Since the player can control the character by swinging the operation units, the player can play intuitively and thus obtain a high operability. As the swing directions of two operation units swung simultaneously are closer to each other, the acceleration of the character is larger. Therefore, a more intuitive operation is realized.

In this embodiment, three-axial acceleration sensors are used. Even when two-axial acceleration sensors are used, a direction instruction operation is detected based on the acceleration along one of the two axes, and a trigger operation is detected by the acceleration along the other axis. Therefore, substantially the same effects as those of this embodiment are provided.

In this embodiment, the motion of the character is controlled by two operation units of the first unit and the second unit. Alternatively, the motion of the character may be controlled by performing a direction instruction operation and a trigger operation using only one operation unit.

In this embodiment, a trigger operation is performed after a direction instruction operation. Alternatively, a direction instruction operation may be performed after a trigger operation. In this case, the game processing may be executed as follows. When a direction instruction operation is detected (i.e., when the outputs of Ax and Az represent a direction instruction operation), it is determined whether or not Ay representing a trigger operation is found during a predetermined time period before that time point, by referring to the sampling data. When such Ay is found, the game processing is executed using a swinging directional vector provided by the direction instruction operation. Alternatively, the direction instruction operation and the trigger operation may be performed substantially. In this case, the game processing may be executed as follows. When either the direction instruction operation or the trigger operation is detected, it may be determined whether or not an output representing the other operation is found during a predetermined time period before and after that time point, by referring to the sampling data. When there is such an output, the game processing is executed using the swinging directional vector provided by the direction instruction operation.

In this embodiment, when a trigger operation is detected, it is determined whether or not a direction instruction operation was performed during a predetermined time period before that time point, by referring to the sampling data. Alternatively, when a direction instruction operation is detected, it may be monitored whether or not a trigger operation is performed during a predetermined time period after that time point.

In the above embodiments, the player controls the game object. The present technology is not limited to this. For example, the inclination of a virtual camera which is set in the virtual game world may be changed in accordance with the output from the first acceleration sensor (inclination, etc.), and the motion of the game object may be changed in accordance with the output from the second acceleration sensor (swinging strength, swinging direction, etc.).

While the embodiments presented herein have been described in detail, the foregoing description is in all aspects illustrative and not restrictive. It is understood that numerous other modifications and variations can be devised without departing from the scope of the disclosed embodiments.

The invention claimed is:

1. A non-transitory computer-readable storage medium having stored thereon a game program for executing game control using an output from a sensor at least capable of detecting a motion in at least two axial directions of a first axis direction and a second axis direction, the game program causing a computer of a game apparatus to perform:
   motion detection for detecting a motion in the first axis direction of the sensor;
   game control for, when the motion detection detects a motion in the first axis direction, executing game processing based on an output from the sensor in the second axis direction and a magnitude of an output from the sensor in the first axis direction during a predetermined time period immediately before but not after the detection of the motion.

2. The non-transitory computer-readable storage medium according to claim 1, wherein
   when the motion detection detects a motion in the first axis direction, the game control detects whether or not there is a motion in the second axis direction at a time point or during a time period which is determined based on the time point when the motion in the first axis direction was detected; and when the motion in the second axis direction is detected, game control is executed using an output in the second axis direction.

3. A non-transitory computer-readable storage medium having stored thereon a game program for executing game control using an output from a sensor at least capable of detecting a motion in three axial directions of a first axis direction, a second axis direction and a third axis direction, the game program causing a computer of a game apparatus to perform:

motion detection for detecting a motion in the first axis direction of the sensor; and game control for, when the motion detection detects a motion in the first axis direction, executing game control using a vector represented by an output from the sensor in the second axis direction and an output from the sensor in the third axis direction during a predetermined time period immediately before but not after the detection of the motion.

4. A method for executing game control using an output from a sensor at least capable of detecting a motion in at least two axial directions of a first axis direction and a second axis direction, the method comprising:

detecting a motion in the first axis direction of the sensor;

game control for, when the detecting a motion detects a motion in the first axis direction, executing game processing based on an output from the sensor in the second axis direction and a magnitude of an output from the sensor in the first axis direction during a predetermined time period immediately before but not after the detection of the motion.

5. The method according to claim 4, wherein when the detecting a motion detects a motion in the first axis direction, the game control detects whether or not there is a motion in the second axis direction at a time point or during a time period which is determined based on the time point when the motion in the first axis direction was detected; and when the motion in the second axis direction is detected, game control is executed using an output in the second axis direction.

6. A method for executing game control using an output from a sensor at least capable of detecting a motion in three axial directions of a first axis direction, a second axis direction and a third axis direction, the method comprising:

detecting a motion in the first axis direction of the sensor; and game control for, when the detecting a motion detects a motion in the first axis direction, executing game control using a vector represented by an output from the sensor in the second axis direction and an output from the sensor in the third axis direction during a predetermined time period immediately before but not after the detection of the motion.

7. A game apparatus configured to execute game control using an output from a sensor at least capable of detecting a motion in at least two axial directions of a first axis direction and a second axis direction, the game apparatus comprising:

a computer processor configured to:

detect a motion in the first axis direction of the sensor;

control a game by, when a motion is detected in the first axis direction, executing game processing based on an output from the sensor in the second axis direction and a magnitude of an output from the sensor in the first axis direction during a predetermined time period immediately before but not after the detection of the motion.

8. The game apparatus according to claim 7, wherein when the motion is detected in the first axis direction, a detection is made whether or not there is a motion in the second axis direction at a time point or during a time period which is determined based on the time point when the motion in the first axis direction was detected; and when the motion in the second axis direction is detected, game control is executed using an output in the second axis direction.

9. A game apparatus configured to execute game control using an output from a sensor at least capable of detecting a motion in three axial directions of a first axis direction, a second axis direction and a third axis direction, the game apparatus comprising:

a computer processor configured to:

detect a motion in the first axis direction of the sensor; and when the motion in the first axis direction is detected, execute game control using a vector represented by an output from the sensor in the second axis direction and an output from the sensor in the third axis direction during a predetermined time period immediately before but not after the detection of the motion.

* * * * *